(12) United States Patent
Shkolnik et al.

(10) Patent No.: US 8,666,142 B2
(45) Date of Patent: Mar. 4, 2014

(54) SYSTEM AND METHOD FOR MANUFACTURING

(75) Inventors: Alexandr Shkolnik, Los Angeles, CA (US); Ali El-Siblani, Dearborn Heights, MI (US)

(73) Assignee: Global Filtration Systems, Dearborn Heights, MI (US)

( * ) Notice: Subject to any disclaimer, the term of this patent is extended or adjusted under 35 U.S.C. 154(b) by 1266 days.

(21) Appl. No.: 12/273,428

(22) Filed: Nov. 18, 2008

(65) Prior Publication Data

US 2010/0125356 A1     May 20, 2010

(51) Int. Cl.
| | |
|---|---|
| *G06K 9/00* | (2006.01) |
| *G06T 1/00* | (2006.01) |
| G06T 7/00 | (2006.01) |
| H04N 1/00 | (2006.01) |

(52) U.S. Cl.
CPC ............. *G06T 1/00* (2013.01); *G06T 7/0075* (2013.01); *H04N 1/00* (2013.01)
USPC ........................................................ 382/154

(58) Field of Classification Search
USPC ................................................. 382/154, 190
See application file for complete search history.

(56) References Cited

U.S. PATENT DOCUMENTS

| | | | |
|---|---|---|---|
| 5,049,901 A | 9/1991 | Gelbart et al. | |
| 5,447,822 A | 9/1995 | Hull et al. | |
| 5,876,550 A | 3/1999 | Feygin et al. | |
| 6,051,179 A | 4/2000 | Hagenau | |
| 6,369,814 B1 | 4/2002 | Dorbie | |
| 6,544,698 B1 * | 4/2003 | Fries | 430/22 |
| 6,633,664 B1 * | 10/2003 | Minamida et al. | 382/154 |
| 6,665,048 B2 | 12/2003 | Gelbart et al. | |
| 6,922,483 B2 * | 7/2005 | Doane | 382/149 |
| 6,942,830 B2 | 9/2005 | Mulhaupt et al. | |
| 6,998,219 B2 | 2/2006 | Fries | |
| 7,013,040 B2 * | 3/2006 | Shiratani | 382/154 |
| 7,052,263 B2 | 5/2006 | John et al. | |
| 7,138,645 B2 * | 11/2006 | Arai et al. | 250/559.1 |
| 7,162,323 B2 | 1/2007 | Brumback et al. | |
| 7,195,472 B2 | 3/2007 | John et al. | |
| 7,328,425 B2 * | 2/2008 | Olsson et al. | 716/53 |

(Continued)

FOREIGN PATENT DOCUMENTS

| | | |
|---|---|---|
| DE | 19929199 A1 | 1/2001 |
| DE | 10256672 A1 | 6/2004 |

(Continued)

OTHER PUBLICATIONS

"A study of photomask correction method in area-forming rapid prototyping system" Rapid Prototyping Journal, vol. 14, No. 5, pp. 285-292, XP002581655 (Sep. 26, 2008) ISSN: 1335-2546 DOI: 10.1108/13552540810907956 From the Internet: www.emeraldinsight.com.

(Continued)

*Primary Examiner* — Hadi Akhavannik
(74) *Attorney, Agent, or Firm* — Hansen IP Law PLLC

(57) ABSTRACT

A method includes receiving a predetermined object pattern representing a portion of a three-dimensional object, modifying the predetermined object pattern to correct for geometric distortion of a pattern generator, and generating the modified pattern using the pattern generator. The generated pattern interacts with a reactive material to form the portion of the three-dimensional object defined by the predetermined object pattern.

14 Claims, 59 Drawing Sheets

(56) References Cited

U.S. PATENT DOCUMENTS

| | | | |
|---|---|---|---|
| 7,362,355 | B1 | 4/2008 | Yang et al. |
| 7,626,691 | B2 * | 12/2009 | Do ..................... 356/237.1 |
| 7,706,910 | B2 | 4/2010 | Hull et al. |
| 2001/0048184 | A1 | 12/2001 | Ueno |
| 2002/0153640 | A1 | 10/2002 | John |
| 2004/0118309 | A1 | 6/2004 | Fedor et al. |
| 2005/0186692 | A1 * | 8/2005 | Olsson et al. ............ 438/16 |
| 2005/0208168 | A1 | 9/2005 | Hickerson et al. |
| 2005/0248062 | A1 | 11/2005 | Shkolnik et al. |
| 2006/0239588 | A1 | 10/2006 | Hull et al. |
| 2007/0064994 | A1 * | 3/2007 | Oaki et al. ............... 382/144 |
| 2007/0260349 | A1 | 11/2007 | John et al. |
| 2008/0038396 | A1 | 2/2008 | John et al. |
| 2008/0113293 | A1 | 5/2008 | Shkolnik et al. |
| 2008/0169586 | A1 | 7/2008 | Hull |
| 2008/0169589 | A1 | 7/2008 | Sperry et al. |
| 2008/0170122 | A1 | 7/2008 | Hongo et al. |
| 2008/0179785 | A1 | 7/2008 | Hammond et al. |
| 2008/0179787 | A1 | 7/2008 | Sperry et al. |
| 2008/0181977 | A1 | 7/2008 | Sperry et al. |
| 2008/0206383 | A1 | 8/2008 | Hull et al. |
| 2008/0217818 | A1 | 9/2008 | Holmboe et al. |
| 2008/0226346 | A1 | 9/2008 | Hull et al. |

FOREIGN PATENT DOCUMENTS

| | | | |
|---|---|---|---|
| EP | 1674243 | A2 | 6/2006 |
| EP | 1876012 | A1 | 1/2008 |
| EP | 2011631 | B1 | 4/2012 |
| JP | 08150662 | | 6/1996 |
| WO | 0151993 | A1 | 7/2001 |

OTHER PUBLICATIONS

European Search Report for EP 09 15 0961, Jun. 7, 2010.

Opposition to EP 2 011 631, dated Jan. 14, 2013.

European Patent Office (EPO) Notice of Opposition, dated Feb. 25, 2013.

Huang, et al., "Computer Supported Force Analysis and Layer Imagine for Masked Rapid Prototyping System" Department of Mechanical Engineering, National Taiwan University of Science and technology, Taipei, Taiwan, 2001.

Huang, et al., "On-line force monitoring of platform ascending rapid prototyping system" Journal of Materials Processing Technology 159 (2005) 257-264.

English translation of JP 08150662 from: http://www19.ipdl.inpit.go.jp/PA1/result/main/woYeaMaDA408150662P1.htm Jul. 15, 2011.

English translation of DE 10256672 from Lexis Nexis Total Patent, Jun. 2004.

English translation of DE 19929199 from Lexis Nexis Total Patent, Jan. 2001.

* cited by examiner

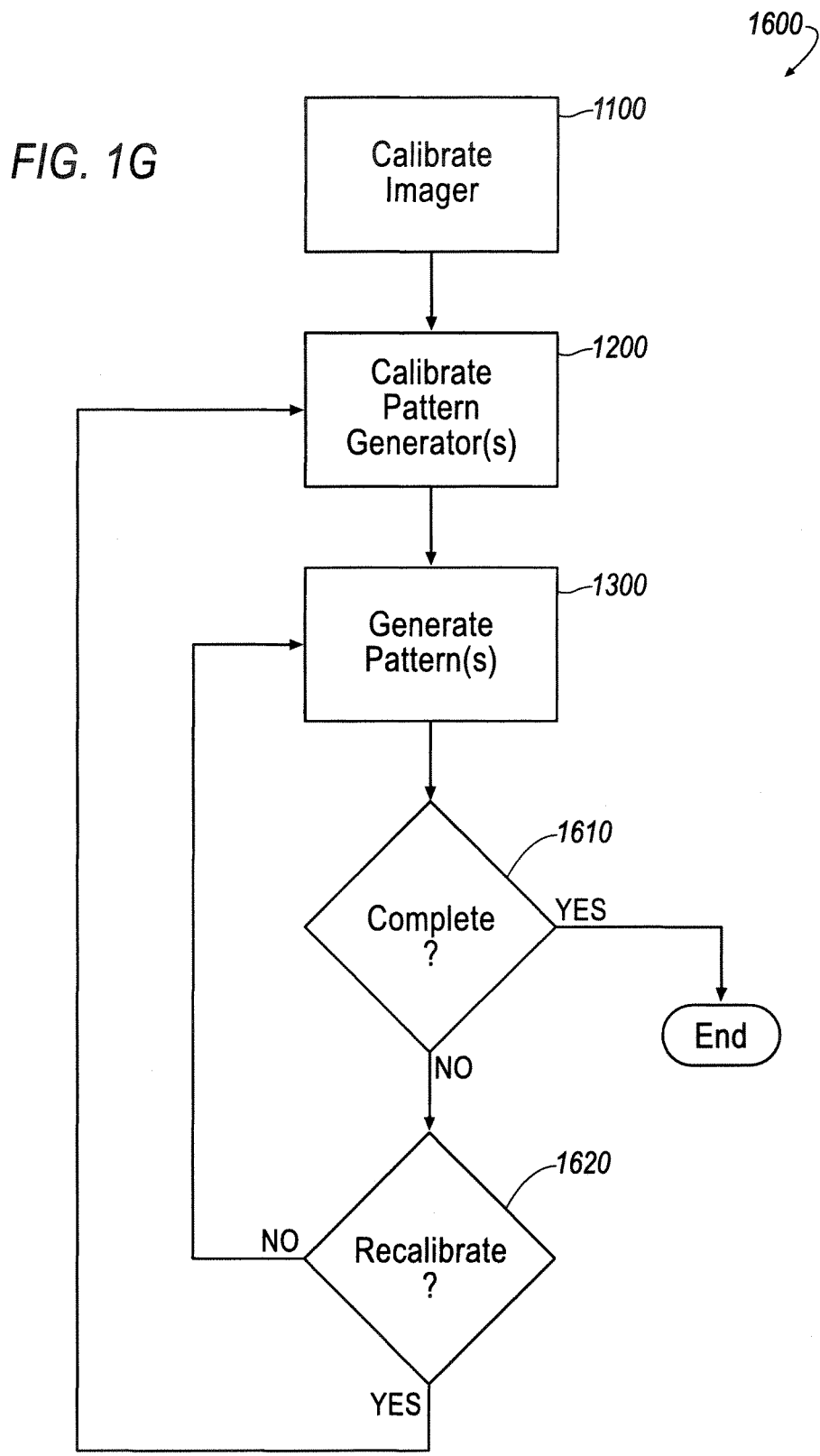

Original Bitmap
*(180')*
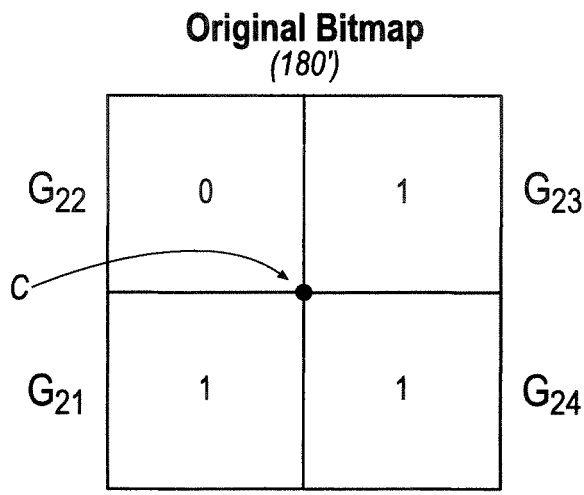
*FIG. 1MAB*
Boundary Determined
*(181')*
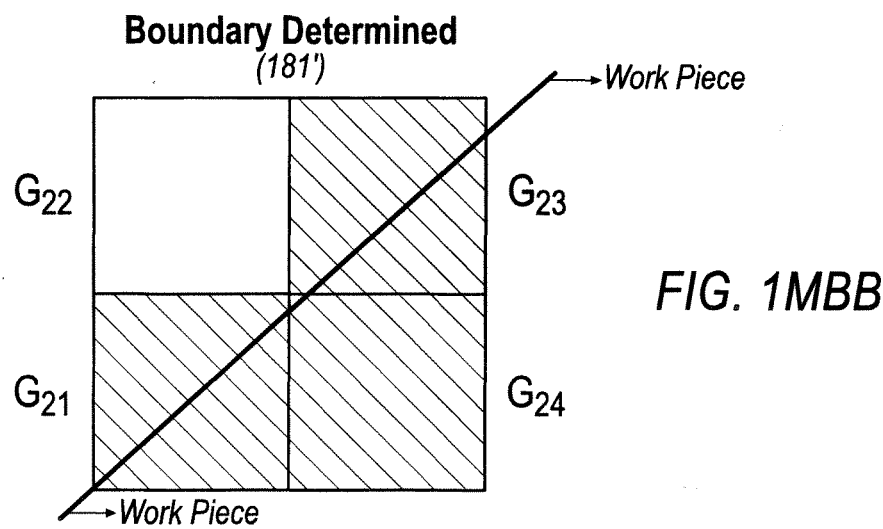
*FIG. 1MBB*
Boundary Offset Determined
*(182')*
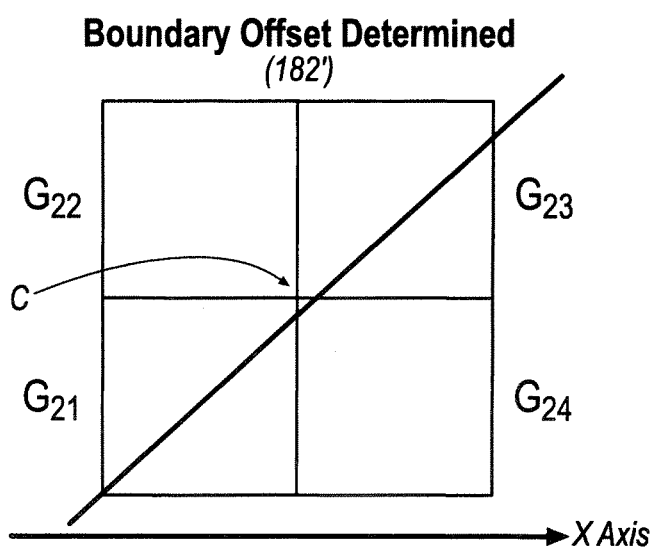
*FIG. 1MCB*

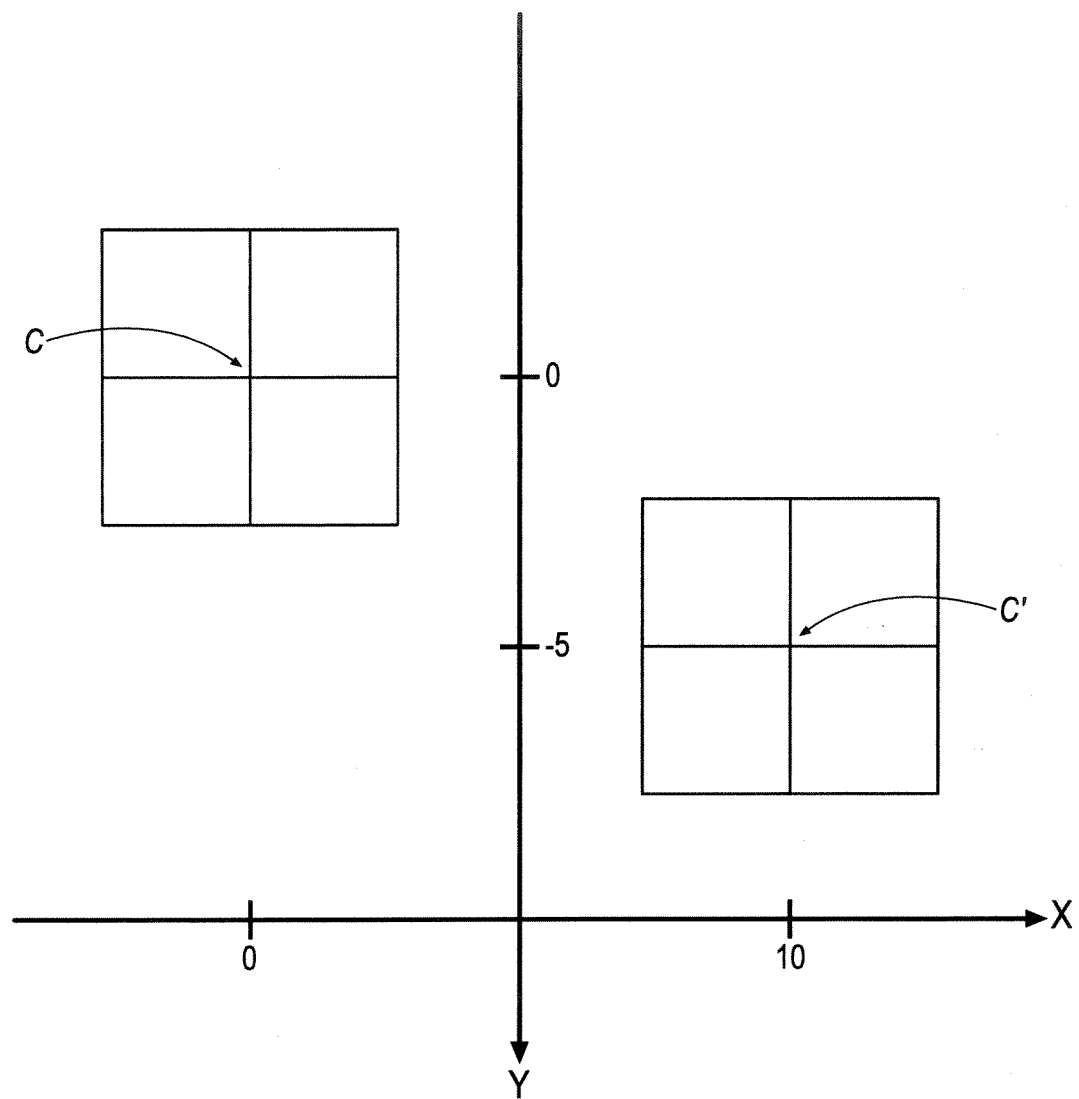
FIG. 1MDB

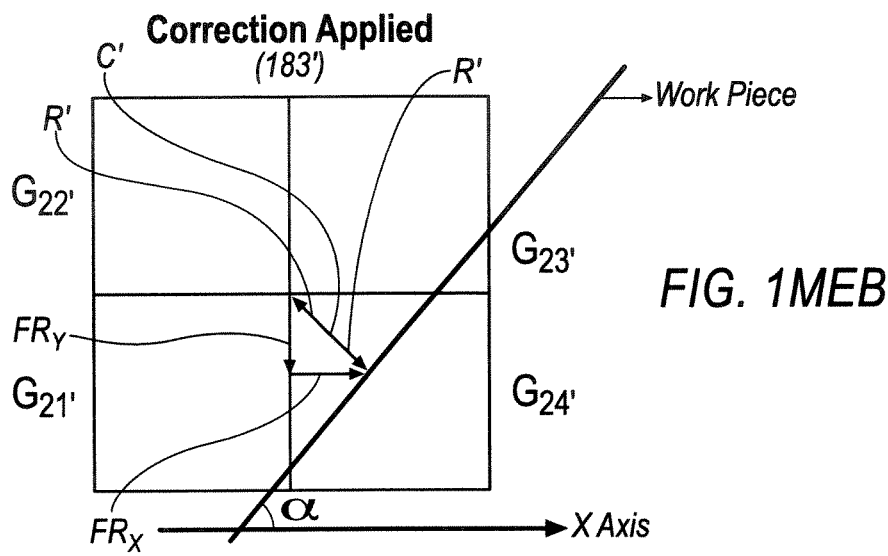
FIG. 1MEB
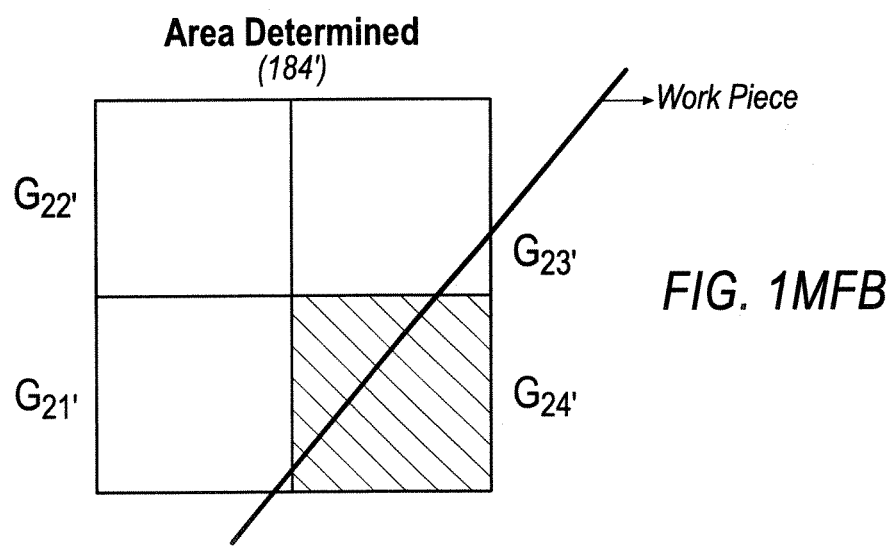
FIG. 1MFB
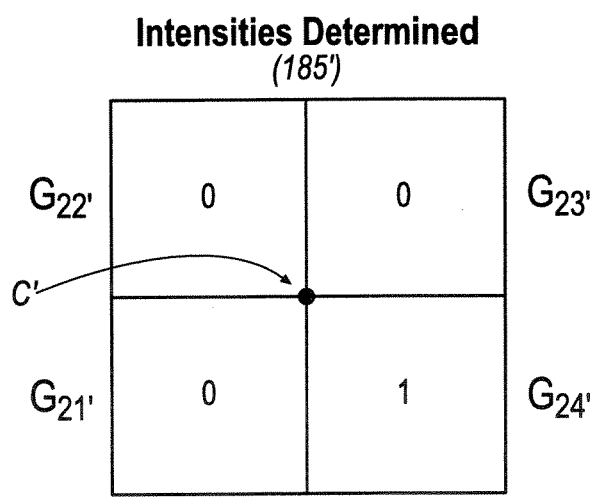
FIG. 1MGB

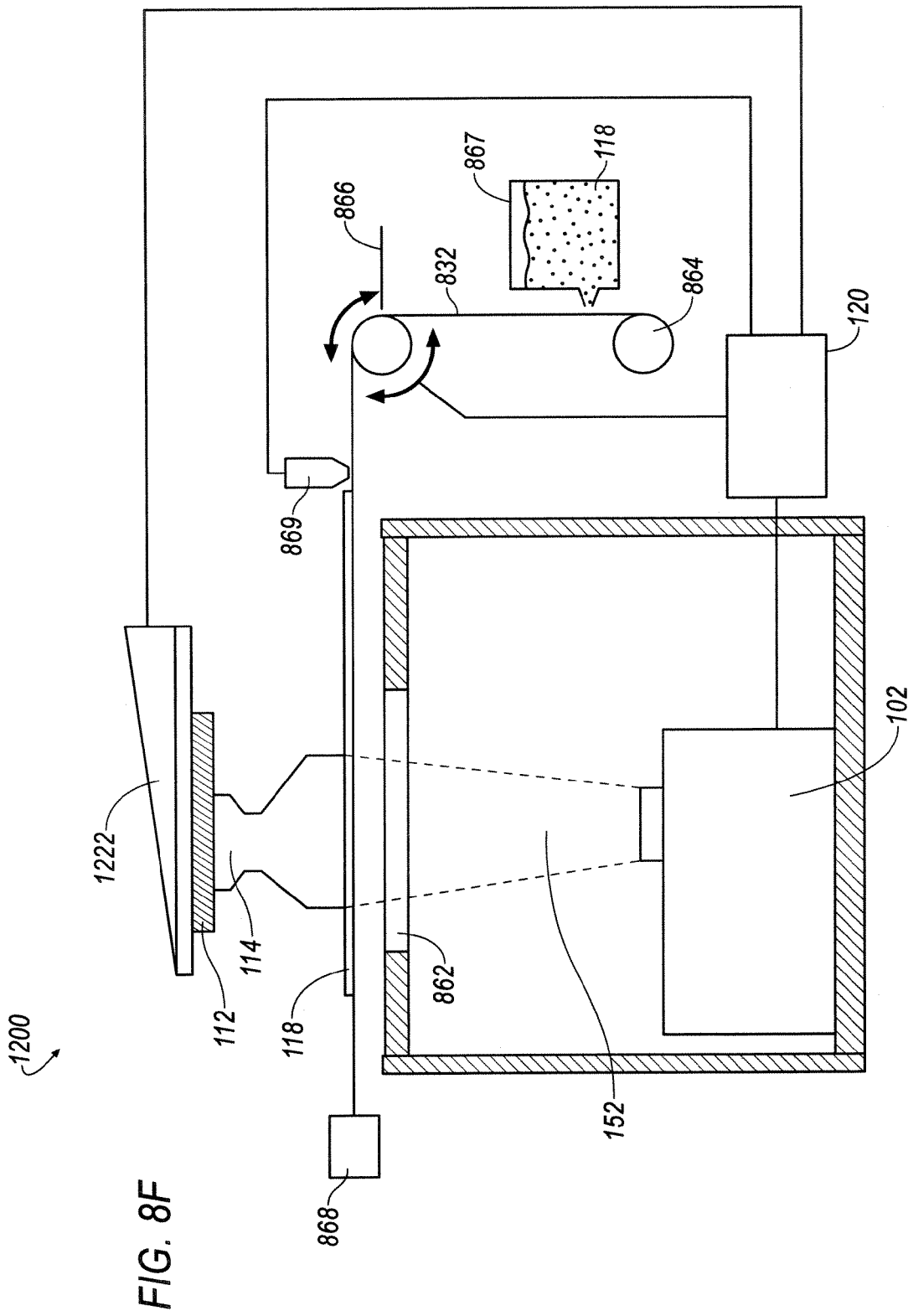

SYSTEM AND METHOD FOR MANUFACTURING

FIELD

The disclosure relates to a system and method for manufacturing.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

The accuracy of the component may at least in part be related to the accuracy of the pattern generator used to build the component. Thus, it is desirable to increase the accuracy of the pattern generator so that components may be properly constructed, within tolerances. Moreover, large components may require equipment that may include multiple pattern generators to access a wider field for construction of the component, allowing for larger components to be constructed. The pattern generators may be aligned to reduce gaps, voids, or excessive overlap of pattern generation. Where gaps or voids exist, the component may be weak and prone to cracking, losing mechanical strength and/or be cosmetically defective.

BRIEF DESCRIPTION OF THE DRAWINGS

The disclosure will now be described, by way of example, with reference to the accompanying drawings, in which:

FIG. 1AA is an example of a self-calibrating/self-correcting rapid manufacture machine where the pattern generators are mounted downwardly for direct projection and the imager is mounted to the side.

FIG. 1G is an example of an on-the-fly calibration/correction method.

FIG. 1MB is an example of a boundary determination for a component using the intensity information from each voxel.

FIG. 1MC is an example of a boundary offset determination from a central point to the voxels.

FIG. 1MD a position shift is applied to determine a corrected central point.

FIG. 1ME is an example of applying a correction offset to the boundary of the component to a corrected voxel location.

FIGS. 1MF and 1MG are an example of a corrected intensity determination for the corrected voxel location using the component boundary.

FIG. 1MAB is an example of an original bitmap.

FIG. 1MBB is an example of a boundary determination for a work piece using the pixels from the bitmap.

FIG. 1MCB is an example of a boundary offset determination from a central point to the pixels.

FIG. 1MDB a position shift is applied to determine a corrected central point.

FIG. 1MEB is an example of applying a correction offset to the boundary of the component to a corrected pixel location.

FIG. 1MFB and 1MGB are an example of a corrected bit value determination for the corrected pixel location using the component boundary.

FIG. 1O is an example of a bitmap geometric correction and manufacturing method including component geometry modification/correction and creating slice-type data.

FIG. 1TB is an example of a first subdivided pattern of the example component of FIG. 1TA.

FIG. 1TC is an example of a second subdivided pattern of the example component of FIG. 1TA.

FIG. 8F is another example of an alternative rapid manufacture machine that includes a movable film to provide a reactive material.

FIG. 10CA is an example of an alternative slatted support plate system for use with the pattern generator systems described herein.

FIG. 10CB is an example of an alternative support plate system having a substantially unbroken surface for use with the pattern generator systems described herein.

DETAILED DESCRIPTION

Figure 1A:
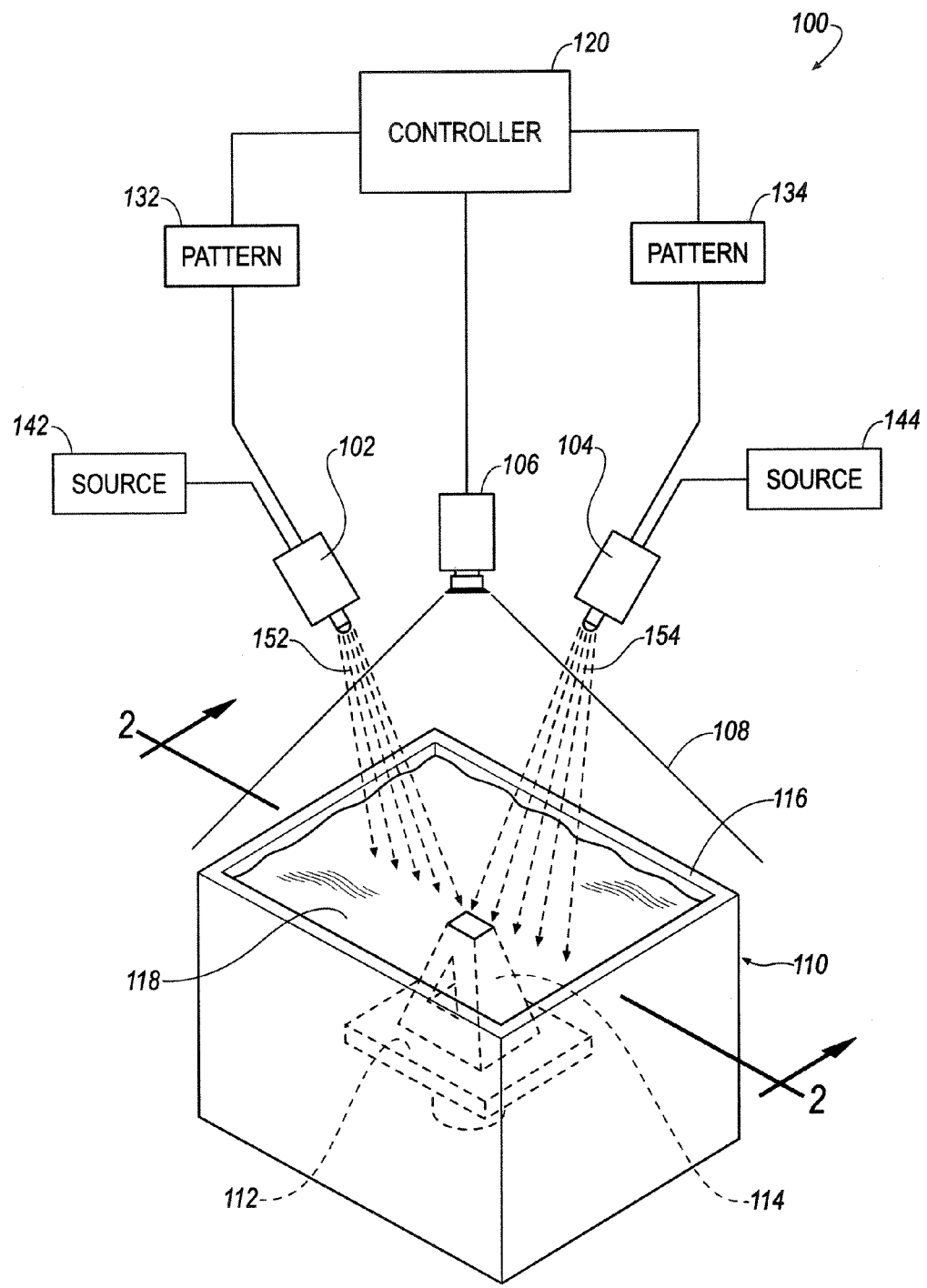
FIG. 1A is an example of a self-calibrating/self-correcting rapid manufacture machine.
Figure 1A:
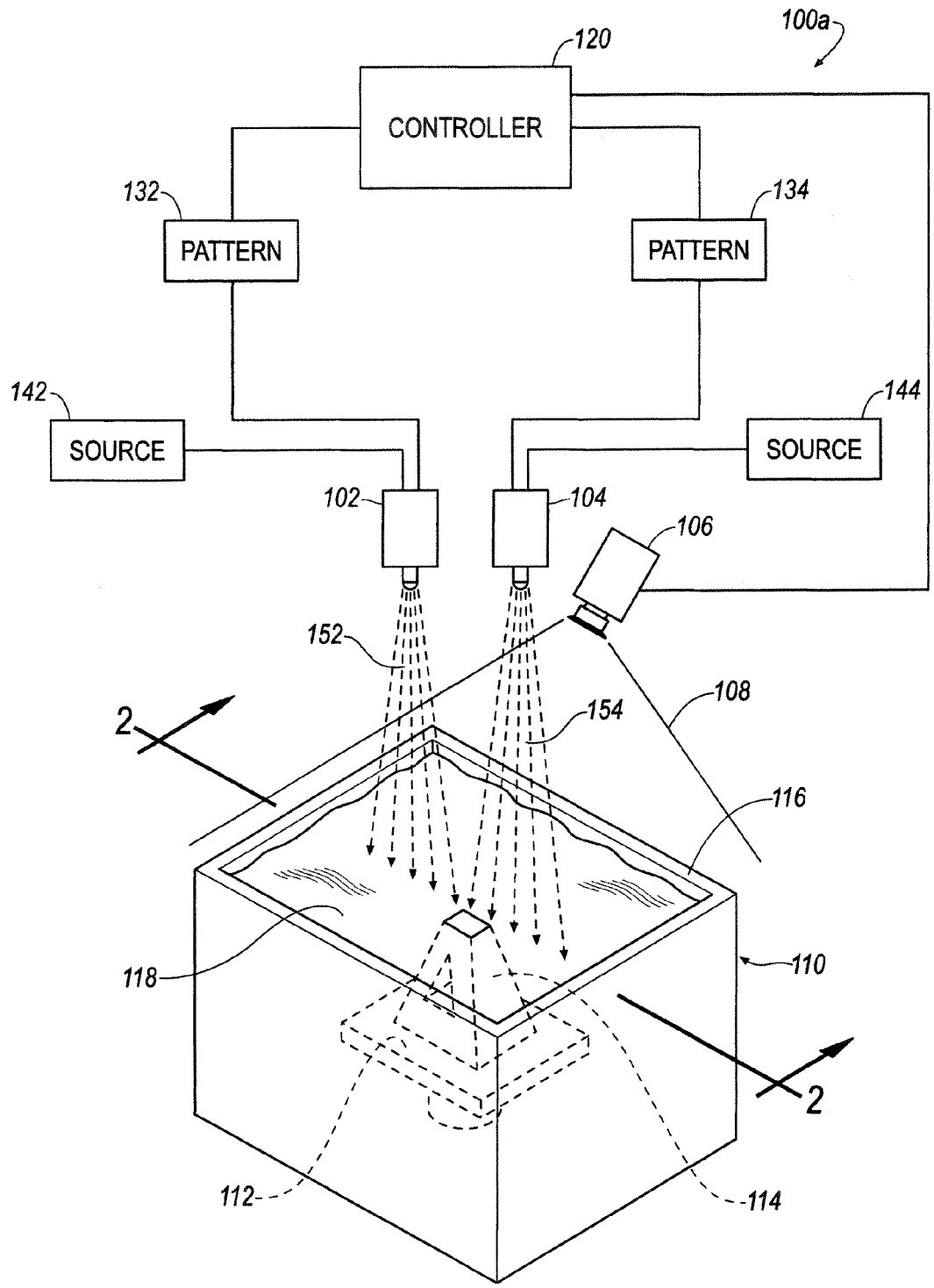

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art.

The system and methods described herein are generally applicable to additive manufacturing of components or parts (discussed herein generally as components or work pieces), but may be used beyond that scope for alternative applications. As shown the system may be used for increased accuracy in making components or parts, and may be used with single pattern generator (such as a DLP device) or multiple pattern generators. Moreover, the system allows for the manufacture of large components because multiple pattern generators may be used without the need for aligning the work piece with respect to the pattern generators, and also that geometric correction allows for consistent build quality over the entire build surface, including the extreme corners. The method and system generally includes geometric correction to yield the desired physical representation of the component or work piece that is representative of the actual data in the original three-dimensional CAD model, or any approximation thereof.

The system is generally described as being used for manufacturing and rapid prototyping, where a pattern generator (such as a DLP device) provides an image to a reactive material for selective hardening. The system may use single or multiple pattern generators. However, the pattern generators typically have linear and nonlinear distortions that cause inaccuracies in the resulting part. The inaccuracies may be surface defects or more serious flaws that may cause the part to be structurally defective. In general, an application of the system and method described herein may use a pattern generator to build a three-dimensional object by exposing a reactive material (discussed below as e.g., a polymerizable material) to electromagnetic radiation. The depth of hardening of the reactive material may be controlled by the intensity of electromagnetic radiation from the pattern generator at a specific point on a building surface (e.g., a specific point on the surface where the reactive material is exposed to the electromagnetic radiation) and the speed at which a support plate moving away from the building surface.

As discussed herein, a reactive material may be discussed in the general sense as a material that reacts with the electromagnetic radiation from a pattern generator. The reaction may typically be expressed as a solidification or partial solidification of the reactive material. This reaction to solidification or partial solidification may be used as the basis for constructing the component or work piece. Examples of a reactive material may include a polymerizable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The reactive material may further include fillers. Moreover, the reactive material my take on a final form (e.g., after exposure to the electromagnetic radiation) that may vary from semi-solids, solids, waxes, and crystalline solids.

When discussing a photopolymerizable or solidifiable material, any material is meant, possibly comprising a resin and optionally further components, which is solidifiable by means of supply of stimulating energy such as electromagnetic radiation. Suitably, a material polymerizable by electromagnetic radiation (common wavelength in use to day include UV radiation and/or visible light) can be used as such material. In an example, a material comprising a resin containing at least one ethylenically unsaturated compound (including but nor limited to (meth)acrylate monomers and polymers) and/or at least one epoxy group may be used. Suitable other components of the solidifiable material include, for example, inorganic and/or organic fillers, coloring substances, viscose-controlling agents, etc., but are not limited thereto.

The pattern generator(s) may be configured in a number of ways. Many may be defined as controlling electromagnetic radiation to provide a desired pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

To provide precise and consistent manufacturing processes, the pattern generator uses methods to compensate for the inaccuracies. These methods generally include manipulating the pattern to compensate for the inaccuracy prior to generation of the pattern. A calibrated imager (e.g., a camera) may be used to view an uncompensated test pattern to determine the inaccuracies for a pattern generator. The uncompensated test pattern may then be compared with the ideal (or expected) test pattern to generate a pattern correction map. This pattern correction map may include positional compensation (e.g., to adjust linear and nonlinear distortions) and may also provide for intensity compensation. In general, the compensation may include X and Y positional offsets for each pixel associated with a bitmap. The positional offsets are added to the original bitmap coordinates to generate the corrected bitmap pattern.

During operation, the system and methods described herein provide for monitoring and adjustment of the pattern generator(s) to provide an accurate output. Such monitoring and adjustment allows for continual compensation due to changes in the system alignment or components. The calibration/correction system and methods discussed herein may be applied to manufacturing systems that include voxel data which include an intensity for each pixel or they may be applied to slice-data files or bitmaps that may be derived from slice-data files. Typical file types used to generate bitmaps include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any input type may be used and converted internally to create the patterns used by the pattern generators.

Voxel data may be considered a collection or set of data that represents volumetric pixels. The voxel data may be organized into a voxelized bitmap pattern that includes a grayscale value for each pixel and/or an exposure time. The voxelized bitmap may be considered an organized collection of individual voxels, each voxel having its own depth that is independent of the other voxels. Although the voxels may be organized into a bitmap, each voxel is generally treated individually and has its own curing depth (which can be determined by the exposure time and/or intensity value assigned to each voxel) to determine each voxel's geometry independent of any other voxel data. The work piece may be formed using the voxel data where each voxel may be created in the reactive material by exposure to the build surface with a particular depth of cure (typically determined by the grayscale value and/or exposure time) to create the three-dimensional voxel in the reactive material. Each voxel may be generated individually, in a group or subset (e.g., more than one voxel), or as a whole of the voxel data (e.g., all voxels at once).

The bitmap two-dimensional information may be a typical x/y location for a pixel (whether inherent to the file format or having specified locations). The grayscale value may be used to control the pattern generator's output to provide full intensity, no output, or variations in between. Where an exposure time per pixel is provided, the pattern generator may reduce the amount of electromagnetic radiation that the reactive material is exposed to for each pixel according to the exposure time. For example, where a DLP® type pattern generator is used, the DLP® micro-mirror for a particular pixel or group of pixels may be positioned to direct the electromagnetic radiation away from the reactive material. Thus, the electromagnetic radiation is reflected away, but not necessarily completely, from the reactive material using the micro-mirror to reduce or eliminate exposure after the elapsed time. Alternatively, the pattern generator may "turn off" the light entirely for that pixel after the exposure time has elapsed. When using a voxelized construction process, each voxel may have its own thickness (e.g., depth of cure) which is controlled by the grayscale value and/or the exposure time.

In an example where a grayscale value is assigned to a pixel and a DLP® type pattern generator is used, the DLP® micromirror may be moved so as to expose the pixel at the build surface in an alternating manner to provide an overall grayscale value. Where a 50% grayscale is desired, the micromirror may be moved so that the reactive material is exposed for 50% of the time, and the other 50% of the time the micro-mirror may be moved so as to reflect light away from the reactive material.

An imager (e.g., a camera) may be used to correct the pattern generator(s) output and to provide feedback to the system. In some configurations, the imager may provide closed-loop control of compensation for the pattern generator(s). The imager itself may also be calibrated/corrected for linear and non-linear inaccuracies and for the imager's position (e.g., off axis placement). A calibration template may be used initially to calibrate the imager so that subsequent images are compensated to provide their true location. The focal distance of the imager may be chosen to be the same as the imager(s) so that scaling and/or other translations and transformations may not be required.

During operation, the imager may send images of the pattern generator(s) output to a controller. The controller may then compensate the received image based on the imager's correction map (as discussed herein). The compensated image may then be compared to the ideal output of the pattern generator (e.g., a test pattern with known position and features) to determine a pattern generator correction mapping. The pattern generator correction mapping may then be used to adjust the patterns before generation to compensate for the pattern generator(s) linear and nonlinear inaccuracies. Such continued correction mapping may be performed before and/or during manufacture of a part to improve and/or validate the precision and accuracy of pattern generators 102, 104.

In general, as is discussed below with respect to image correction mapping and pattern correction mapping generally includes the use of a software x/y coordinate mapping system to modify an image or bitmap for positional inaccuracies from imager 106 and/or pattern generators 102, 104. The correction mapping may be a table of x/y coordinates that correspond to another pair of x'/y' coordinates that will adjust for the linear and nonlinear components of imager 106 and/or pattern generators 102, 104. Note that while the image correction mapping is generally shown and described herein as being external to the pattern generators, the systems and methods, in whole or in part, may also be integrated with the pattern generators.

Typical sources of error in the imager and/or pattern generator may include mechanical misalignment of the components or supporting structure, misaligned lenses or mirrors, and malformed lenses or mirrors. Also, during operation, heating and/or cooling may cause components to move or expand, changing their position. In the case of optical components, the position, shape, and size may change with heating and/or cooling. Such changes may impart geometric distortion (e.g., where an expected straight line may be curved), such as distortion of a rectangular grid, barrel distortion, pincushion (pillow) distortion, etc. It is also possible that mirrors (or micro-mirrors as may be the case with DLP pattern generators) may change shape or position to cause both linear and nonlinear distortions, which may be compensated for.

As discussed below, the systems and methods described herein may be used with "downward", "upward" and "side" projecting systems in continuous or non-continuous exposure modes (e.g., pattern generating modes), any of which may include additional optical elements such as a mirror or lenses. They may be used in a layer, slice, or voxelized production process, among others, where the pattern generating system provides the electromagnetic radiation to react with (e.g., solidify or partially solidify) a reactive material or other material to create the three-dimensional object. However, the systems and methods may be utilized with numerous types of general technologies including voxelization processes, slicing and layering processes. Moreover, the systems and methods described herein may also apply to layered construction processes using "upward" or "downward" methods that may use lithography (generally), FTI (Film Transfer Imaging), three-dimensional Printing technologies, SLS (Selective Laser Sintering) or SLA (Stereolithography Apparatus). Examples of pattern generators may include Digital Light Processing technology (DLP) from Texas Instruments® or SXRD™ or LCD or LCOS or J-ILA from JVC, or LVT (Light Valve Technology), DMD (digital mirror device), or GLV (Grating Light Valve) technology, SLM (Spatial light modulator), or any type of selective electromagnetic radiation or light modulation system, in addition to a scanned and/or vector pattern generators (e.g., using a laser).

The matching of technologies between the pattern generator and reactive material may be determined based on the compatibility of the respective technologies used (e.g., a reactive UV photopolymer material and a UV pattern generator). Typical reactive materials include photo-reactive (or photo curable) resins that may be in liquid, past, powder, or other form. Moreover, the systems and methods described herein are not tied to a particular pattern generator or imager technologies.

FIG. 1A is an example of a self-calibrating/self-correcting rapid manufacture machine 100. A controller 120 interfaces with pattern generators 102, 104 and an imager 106 for self-calibration at any time before, during, or after manufacture of a work piece 114. During regular operation, controller 120 receives and sends patterns 132, 134 to pattern generators 102, 104 that selectively produce patterns 132, 134 to produce a work piece 114 in a voxelized construction process. A support plate 112 may be controlled to continuously move downwardly during the construction process, working in concert with controller 120 and pattern generators 102, 104 to produce a solid uninterrupted component. Alternatively, support plate 112 may be moved in steps to build a layered component where each layer is constructed of a predetermined thickness determined by the distance of movement of support plate 112 or amount of material applied (e.g., using an applicator) or deposited (e.g., using jetting) onto the surface of the previously exposed (e.g., solidified or partially solidified) layer.

Controller 120 may be constructed as part of machine 100, portions with the machine 100, without direct connection the machine 100, or distributed elsewhere, connected via a communication medium, such as a network. Controller 120 may be, for example, a computing device (that may be an embedded resource, external, or a distributed resource) and may be configured as a computer, a programmable logic device, a specialized processor, etc.

A pair of pattern generators 102, 104 are used to configure a building surface of a container of reactive material 118 into solid form. Although a container may be shown in the drawings as an example of how to hold reactive material 118 in a convenient manner, other forms of reactive material may also be used that may not require a container, and may be applied as a film or layer, or may be jetted to form a film or layer. The reactive material may be in any form, including a liquid, a powder in a suspension, a paste, or other forms.

A building surface may be considered the surface of reactive material 118 onto which pattern generator 102, 104 may project the voxel data (e.g., the voxel data may include each independent voxel having an individual intensity value and/or individual exposure time). However, the building surface may also be characterized as the upper surface of reactive material and a depth determined by the penetration of radiation from image generators 102, 104 into reactive material 118. Thus, as discussed herein, the building surface may include the surface and/or the surface including a thickness therethrough that may be a predetermined thickness or dynamic. Where there is a dynamic thickness to the building surface, the thickness may be determined by the voxel location as to the thickness. For example, where a pattern generator outputs a pixel at a maximum intensity, the penetration through the surface of reactive material 118 may be to a greater depth than another pixel at half of maximum intensity. Thus, at any given time, the building surface may be the surface only, or a thickness determined location by location depending on the desired pixel depth (e.g., a cuboid-shaped voxel having a particular depth of cure).

In this example, pattern generators 102, 104 may be configured as Digital Light Projector (DLP) devices that include micro-mirrors to create patterns 132, 134. However, pattern generators 102, 104 are not limited to DLP devices and may be configured as electromagnetic devices, electron beam, laser, or other generators capable of solidifying or partially solidifying a solidifiable material (e.g., producing an effect on a reactive material). The solidifiable material may be chosen based on the material properties for solidification, durability, resistance to environmental conditions, as well as construction performance parameters such as the responsiveness to solidify or partially solidify when exposed to a particular wavelength of electromagnetic radiation. For example, when reactive material 118 is chosen as a photopolymer, the photopolymer may come in many forms including a photo powder, paste or a photosensitive composite. Moreover, a composite may include any kind of ceramic based powder such as aluminum oxide or zirconium oxide or ytteria stabilized zirconium oxide. The choice of reactive material may be based on the pattern generator technology and other factors. Generally, as discussed herein, the reactive material may be chosen as a photopolymer capable of solidification or partial solidification when exposed to electromagnetic radiation. However, other reactive materials are known and will be know to those of skill in the art.

For example, the electromagnetic radiation may have an intensity range scaled from zero (the minimum) to 255 (maximum). As discussed herein, the pattern generators may receive bitmaps having intensity values for each individual pixel (e.g., each pixel with intensity and/or exposure time may describe a voxel). However, bitmaps with intensity may not need to be used since each voxel may be addressed individually by the pattern generator. The bitmaps include "bits" or regions that collectively determine the pattern. These "bits" or regions (e.g., that make up the voxelized bitmap) are typically defined as rectangular or square regions, but when each "bit" is treated as a voxel, the depth of cure (which determined the depth of the voxel) may be determined for each voxel independently of the other.

Each bit may also have an intensity value associated with it. Thus, the voxelized bitmap may cover a wide range of depths through the use of the independent grayscale value associated with each bit. Although the intensity may be used to determine the strength of the electromagnetic radiation (e.g., brightness or intensity when discussing visible or UV light, for example), the intensity may also be used to determine the length of time (e.g., exposure time) that the electromagnetic radiation is turned "on" for the pixel. Moreover, the intensity may also determine the intensity and "on" time for the pixel, where the intensity may remain constant over the "on" time, or the intensity may vary.

While the intensity is typically expressed as an integer number (e.g., 0 . . . 255), the intensity value may be compensated or adjusted before being sent to the pattern generator, or may be compensated or adjusted at the pattern generator, or both. For example, where reactive material 118 has a minimum intensity threshold for polymerization or partial-polymerization, the "off" or zero (0) value intensity (e.g., brightness and/or "on" time) may be determined based on the reactive material threshold. In a typical case, a low level of brightness may correspond to a zero (0) intensity (see FIG. 7D where the background field is illuminated but below the polymerization threshold of reactive material 118).

The examples shown herein with respect to intensities are not to be limiting in scope. For example, intensity ranges of 0 to 255 are convenient for examples when an 8-bit system is used to determine intensity. However, systems having more or less resolution for intensity may be used. Examples may include a 4 bit system or a 16 bit system. Further, the time the electromagnetic radiation may have a wide range, for example, 1 millisecond to 100 seconds. Note that the time range is merely an example and is not limiting as the "on time" for the electromagnetic radiation may be dependent on the minimum switching time of the pattern generator, the intensity of the electromagnetic radiation, the reactive material's minimum effective time & intensity of electromagnetic radiation, the speed of movement of support plate 112, and other factors.

The intensity and exposure time may be parameters for the bitmap, together or separately. For example, when a source 142, 144 has a fixed intensity (such as a laser), the time the source is "on" may be modulated to produce a total exposure value. Alternatively, where the time of exposure is a predetermined value, the intensity of source 142, 144 may be modified produce the desired total exposure value.

As discussed herein, the term "total exposure" may be considered the intensity of the electromagnetic radiation multiplied by the time that the electromagnetic radiation is allowed to interact with the reactive material. When performing voxelized construction, the total exposure determines the depth of cure for each voxel separately and independently of any other voxel. In an example, where the intensity is 250 and the time is 1 second, the exposure will be 250 times 1 second to effectuate a desired depth of cure for a specific voxel. The time and intensity to achieve a particular depth of cure is material dependent. Thus, the time and intensity determined to provide a particular curing depth for a first reactive material may not be usable for a second reactive material. Thus, the depth of cure can be a function of at least the exposure time, the intensity of the electromagnetic radiation, and the properties of the reactive material. The combination of intensity and exposure time can be expressed independently (e.g., in data file or data structure) or they may be combined and expressed for each voxel as a grayscale value where the exposure time is predetermined.

However, reactive material 118 may behave differently based on the intensity of electromagnetic radiation and/or the time. For example, a low level intensity may not be above a minimum threshold of the reactive material to become solidified or partially solidified. In this case, the amount of time (e.g., an infinite time) may not have the effect to make the reactive material solidified or partially solidified because the intensity is below the threshold. Alternatively, a higher intensity may cause reactive material 118 to become solidified or partially solidified non-linearly faster.

In general, sources 142, 144 provide electromagnetic radiation to pattern generators 102, 104, where the pattern is determined by patterns 132, 134. Sources 142, 144 may be separate or integrated with pattern generators 102, 104. Moreover, sources 142, 144 may be integrated with pattern generators 102, 104 where pattern generators 102, 104 include emissive elements (e.g., LED, OLED, plasma, etc.) that include the source itself.

Moreover, as discussed herein, sources 142, 144 and pattern generators 102, 104 may include electromagnetic radiation generating devices. However, as each technology is discussed the disclosure is not limited to such a technology, as one skilled in the art will know that the systems and methods discussed herein are applicable to numerous variations of pattern generator technology. For example, "light" or "electromagnetic radiation" may refer to visible or invisible light, and includes the use of actinic light (e.g., 420 nm) that may be efficient for the particular reactive material. Alternatively, actinic light need not be centered around 420 nm, and the frequency/wavelength of the actinic light may be selected (e.g., using UV or visible light) to be compatible with the chosen particular reactive material. In general, the discussions related to "light" may be considered electromagnetic radiation having a wavelength of around 100 µm to around 1000 µm. However, as discussed herein, the electromagnetic radiation may also go beyond this general range and include the entire electromagnetic spectrum.

Patterns 132, 134 may be bitmaps (digital information), physical masks (physical patterns), electronic masks (e.g., LCD or transmissive active masks), or other types of information, media, or device(s) that define a pattern when used in conjunction with a pattern generator. Examples of pattern generators may include ultra violet ("UV") light pattern generators, liquid crystal display ("LCD") pattern generators, liquid crystal on silicon ("LCoS"), SXRD technology, J-ILA pattern generators, light emitting diode ("LED") pattern generators, and digital light processing ("DLP") pattern generators. When patterns 132, 134 are configured as digital bitmap information and pattern generators 102, 104 are configured as DLP devices, the pattern is projected as electromagnetic radiation (e.g., light) from sources 142, 144 that are selectively reflected by micro-mirrors in pattern generators 102, 104. Note that pattern generators 102, 104 may directly or indirectly generate the patterns to reactive material 118, e.g., using mirrors and/or lenses or other optical elements to modify the output path.

An imager 106 may be used for initial alignment and adjustment of pattern generators 102, 104 or for real-time, or near real-time, adjustment. The methods of alignment and adjustment are described below in detail with respect to FIGS. 1B-1G. Imager 106 may also be used to verify alignment during a process run (as explained in detail below with respect to FIG. 1F). In general, imager 106 may be configured to sense the output of pattern generators 102, 104. For example, when pattern generators 102, 104 are configured as optical devices, imager 106 may be configured as an optical sensor able to view the optical outputs of generators 102, 104. Imager 106 is also a capturing device that provides controller 120 with images.

Imager 106 may be configured as a camera, such as a CCD camera, with an adjustable or fixed focal length. As discussed below, the focal length of imager 106 may be the same as the focal length of pattern generators 102, 104 where focal length is appropriate (for example, where optical elements are part of the output of pattern generators 102, 104). Where focal lengths are used, the distance from the camera to the building surface may be chosen as the focal length for the camera, and the distance from pattern generators 102, 104 to the building surface may be chosen as the focal length for generators 102, 104.

In general, imager 106 may have a resolution twice that of pattern generators 102, 104 to provide precise measurements. Accuracy may be necessary along the boundaries of pattern generators 102, 104 where sub-pixel measurements may be desirable to verify the pixel positioning of pattern generators 102, 104. Where less accuracy is desired, an imager having a lower resolution may be used. However, lower resolution imagers may not allow for minimizing overlap of patterns where multi-pattern generator systems are employed.

Imager 106 senses emissions from pattern generators 102, 104 that are reflected from the build surface. Although the word "imager" is used, other types of sensing devices may also be used, such as detectors. When imager 106 is configured as a camera, the image taken may correspond to the sensitivity of the imaging element to certain wavelengths, visible or invisible. The imaging element may, for example, be configured as a CCD, CMOS or other photo-detector. When pattern generators 102, 104 are configured as non-light type devices, for example an electron beam pattern generator, imager 106 may be configured as an electron beam detector. Alternatively, imager 106 may be configured as a camera and a photo-paper (or an electron-sensitive substance) may be used to detect the pattern developed from the electron or laser beam. Other components for pattern generators 102, 104 and imager 106 may be configured to operate as laser systems and detectors. Alternatively, PSD (Position Sensing Detectors) may be used not only for imaging, but may be used to measure the response time of pattern generators 102, 104. Such information may be relevant, for example, to determining or optimizing the motion of support plate 112 and the timing of pattern generators 102, 104 for exposure time.

When a laser is used for pattern generators 102, 104, the image "traced" by the laser(s) (e.g., in a raster or vector approach) and may be detected by imager 106 by placing photo-paper at the build surface. The photo-paper may be selected to be sensitive to the laser output and may change color or otherwise present an image detectable by imager 106 when the pattern is generated. Thus, imager 106 may "read" the image from the photo-paper to provide feedback from the pattern generator 102, 104 (e.g., laser or electron beam systems) for the correction methods discussed herein.

Imager 106 generally has a field of vision or detection that is shown as imager region 108 in FIG. 1A. Imager region 108 generally corresponds to the boundaries of a container 110 that holds reactive material 118 and work piece 114. This is generally considered the field of view of imager 106 when imager 106 is configured as an optical camera.

Patterns 152, 154 may be generated by controller 120, transferred to machine 100 from an external source or device (e.g., a network or storage device), or modified to a format suitable for pattern generators 102, 104 (e.g., modification of a compressed file such as a TIFF file using CCIT type 4 compression into a standard bitmap). In general, patterns 152, 154 may be bi-tonal bitmap images, "grayscale" (e.g., although not necessarily "grey" but that the data also include pixel intensity information), color, or color with intensity information. Other pattern formats may be available for use such as JPEG, DXF, BMP, PNG, SVG, etc., or other vector or pixel-defined image files (which may be based on industry standards or custom file types).

Work piece 114 is shown here as an example of a design that is made by machine 100. The size, shape, or any other feature of work piece 114 is a function of patterns 132, 134, pattern generators 102, 104, the interaction of pattern generators 102, 104 with reactive material 118, and the motion of support plate 112. For example, the arbitrary shape shown was produced through movement of support plate 112 downward while pattern generators 102, 104 selectively harden reactive material 118.

However, such a shape could also be constructed through discrete construction of layers by moving support plate 112 a certain distance downward and then exposing reactive material 118 for a predetermined time for using pattern generators 102, 104.

Container 110 holds reactive material 118 and may also provide structure to machine 100. The location of imager 106 and pattern generators 102, 104 may be relative to machine 100 as a rigid connection, or they may be separately mounted to other structures.

In general, movable support plate 112 is within container 110 and may be moved upward and downward within reactive material 118. As movable support plate 112 progresses downward, controller 120 provides patterns 132, 134 to pattern generators 102, 104. Patterns 132, 134 are then presented to reactive material 118 and a solid or semi-solid work piece 114 is created. Movable support plate 112 continues downward and layers are built to construct work piece 114.

It is important to note that while dual pattern generators 102, 104 are shown and describe herein, the processes for pattern adjustment may be applied to a single pattern generator or any number of pattern generators (1 . . . N). For example, a single pattern generator benefits from correction of linear and nonlinear distortion as well as multiple projectors.

Where imager 106 and pattern generators 102, 104 are optical in nature (e.g., imager 106 may be configured as a camera and pattern generators 102, 104 may be configured as electromagnetic projectors), the focal length of imager 106 may be fixed to the focal length of pattern generators 102, 104. However, the focal lengths of both imager 106 is a camera and pattern generators 102, 104 may be adjustable to provide flexibility and fine-tuning adjustments. Where the focal lengths are different or adjustable, scaling operations may be performed to compensate.

FIG. 1AA is an example of a self-calibrating/self-correcting rapid manufacture machine 100a where pattern generators 102, 104 are mounted downwardly for direct projection and the imager 106 is mounted to the side. As discussed above, the geometry and location of pattern generators 102, 104 and imager 106 may be configured in other locations that are shown in the figures herein. The figures are exemplary and are not intended to limit the disclosure to only those configurations shown. One of skill in the art will appreciate that numerous configurations are possible and that this disclosure need not be exhaustive.

Figure 1B:
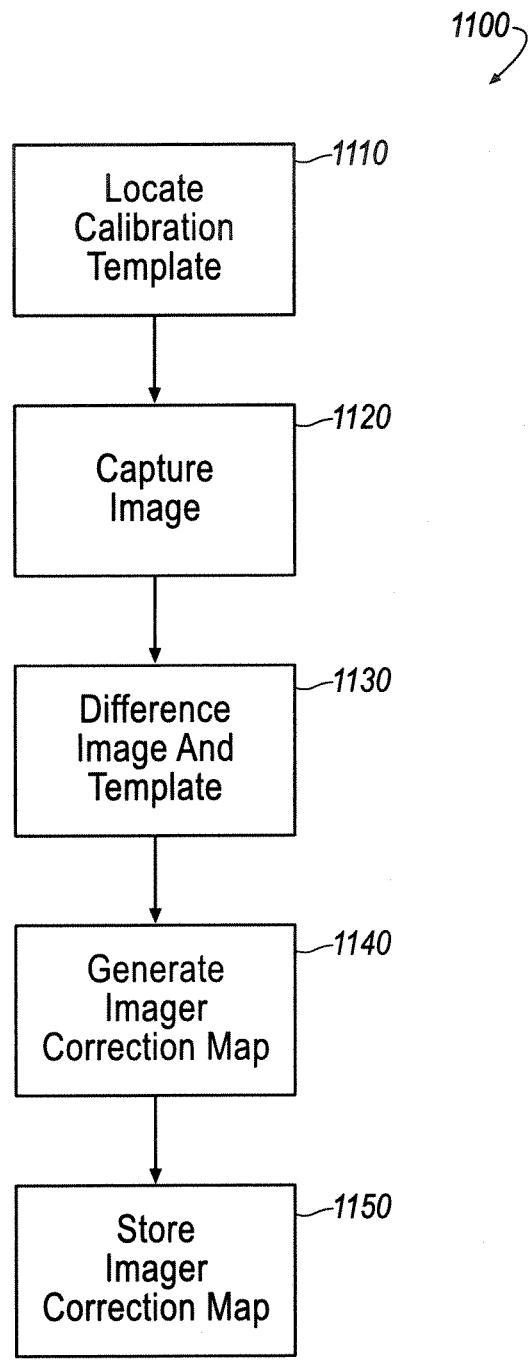
FIG. 1B is an example of an imager calibration/correction method.

FIG. 1B is an example of an imager calibration method 1100. In general, a known calibration template 310 is used to calibrate imager 106. Because the nature of calibration template 310 is known in detail to controller 120, the image received from imager 106 may be adjusted and corrected for linear and non-linear inaccuracies.

In step 1110, calibration template 310 is placed under imager 106. The distance of placement of calibration template 310 is the focal length of imager 106 and of pattern generators 102, 104 (where imager 106 and pattern generators 102, 104 are optically based). As discussed herein, pattern generators 102, 104 and imager 106 may have the same focal distance that matches the distance to calibration template 310 (see FIG. 3). Where focal distances are fixed to the same distance as calibration template 310, there is a reduced need for scaling operations to be performed to compensate, and the reliability of the system may be increased. However, where focal distances are adjustable, scaling operations may be performed to compensate.

Calibration template 310 may be precision printed (e.g., using a laser printer or other high precision printing method) and includes a known pattern. For example, calibration template 310 may be generated from a precisely defined pattern, and then printed using a high-resolution printer, such as a laser printer that has the ability to image to sub-pixel dimensions of imager 106 and/or pattern generator 102, 104.

In step 1120, an image of calibration template 310 is captured using imager 106 and transferred to controller 120. The image may be taken as a bitmap or other format (e.g., TIFF, GIF, JPEG, BMP, PNG, etc.) and may include pixel information as black & white, grayscale, or color. Additional information such as the time and date of the image captured may also be stored as metadata for use by controller 120. The metadata for the current image may be used in relation to stored information to determine drift over time, or to provide real-time performance information relative to established norms based on historical data or a theoretical model of imager 106, and/or pattern generators 102, 104, or the apparatus as a whole.

In step 1130, controller 120 determines the differences between the image taken of calibration template 310 with respect to the known dimensions and pattern of calibration template 310. This process allows controller 120 to determine the variations between calibration template 310 and the image taken of calibration template 310. For example, the determination can be used to generate data regarding the differences in the expected image to the actual image taken by imager 106.

In an example to perform the determination, controller 120 may read a file (e.g., stored in memory, disk, or a network file) that contains the exact dimensions and specification of calibration template 310.

Differencing may be a pixel-by-pixel comparison, or it may take into account feature analysis and comparison. For feature analysis, the corners of black & white squares may be used to generate a 2-dimensional grid for both calibration template 310 and the captured image. In another example, a starting-point may be determined to begin calculating pixel-by-pixel comparisons to detect edges. In either event, comparison of calibration template 310 and the captured image may be performed to detect differences, where the lack thereof may be considered similarities. For example, if a portion of a captured image matches calibration template 310 perfectly, then the difference may be zero.

Prior to differencing, additional steps may occur. For example, rotation (e.g., 90 degrees) and scaling may be applied, if desired. These steps would also be included in calibration/correction of imaging device 106 so that future images captured would have the same rotation and scaling applied prior to mapping.

In step 1140, an imager correction map is generated by mapping the differences of calibration template 310 and the captured image of step 1130. The mapping may provide a mesh mapping (e.g., particular data-points that represent the 2-dimensional surface) or a pixel-by-pixel mapping. Choice of the mapping method (e.g., mesh or pixel-by-pixel) may depend on the level of inaccuracy or distortion between the ideal calibration template and the captured image. Where large inaccuracies are determined in the differencing, a pixel-by-pixel mapping approach may be appropriate. Where more acceptable differences are determined, a mesh mapping approach may be more appropriate.

In general, calibration template 310 may include a printed checker board with a large number of black and white squares (e.g., over 500 squares). The corner of each square may be detected and captured for image processing where the coordinates of each corner are related to real dimensions and locations (e.g., the printed location). The size and shape of each square may also be used as an input for the mapping procedure. The correction mapping may then be considered a reference map, where the ideal location and the actual location are used to correct or "fix" the image. The correction mapping may then be used as a reference map to provide real coordinates (e.g., inches or millimeter) dimensions and locations for every pixel of the device (e.g., imager 106).

In either event, a method for generating a mapping may be to create lookup tables for each x/y pair. Each particular "x" table entry may include an x ordinate for the ideal calibration template 310 mapping and a corresponding x' ordinate corresponding to the same pixel in the captured image. Similarly, each particular "y" table entry may include a "y" ordinate for the ideal calibration template 310 mapping and a corresponding y' ordinate corresponding to the same pixel in the captured image. Thus, the tables provide a mapping of the ideal calibration template to the captured image. When a pixel-by-pixel mapping is chosen, each pixel in the imager is mapped to an ideal set of coordinates (x/y) of the ideal calibration template 310. Where a mesh mapping is chosen, only a predetermined number coordinates 320, 322 (e.g., at the corners of each square; see FIG. 3) may be used to generate a lookup table having a predetermined number of mapping points. Where a greater accuracy mesh is desired, intermediate points 330, 332 (see FIG. 3) may also be taken to improve the mesh's accuracy. A determination of mapping type and accuracy may be determined using worst-case conditions and normal drift that may occur during operation (e.g., by thermal means) and/or other outside influences such as shock imparted to the device that may cause movement of components.

For example, where the corner of a calibration box (e.g., the corner of the example checkerboard pattern discussed herein) is ideally located at pixel coordinates X=50 and Y=50, and where the imager locates the same corner at imager pixel coordinates X=55 and Y=40, the difference for the X ordinate is 5 and the difference for the Y ordinate is −10. When the correction mapping uses X and Y offset values assigned to each pixel, an entry in the imager correction map for pixel (50, 50) is offset (5, −10) based on the differences in the expected pixel location and actual pixel location. In practice, each time an image is used from imager 106, each pixel may be adjusted for position by the offsets contained in the imager correction map.

In step 1150, the imager correction map may be stored to controller 120, imager 106 (where persistent storage is available), or another device that communicates with machine 100 or controller 106. In general, a correction map may be stored as a binary file, XML file, or other proprietary format that includes absolute coordinate mapping or the differences for each mapped point. The imager correction map is used below in further examples and may be recalled at machine startup, generated at startup, and/or updated during operation and stored if desired.

Figure 1C:
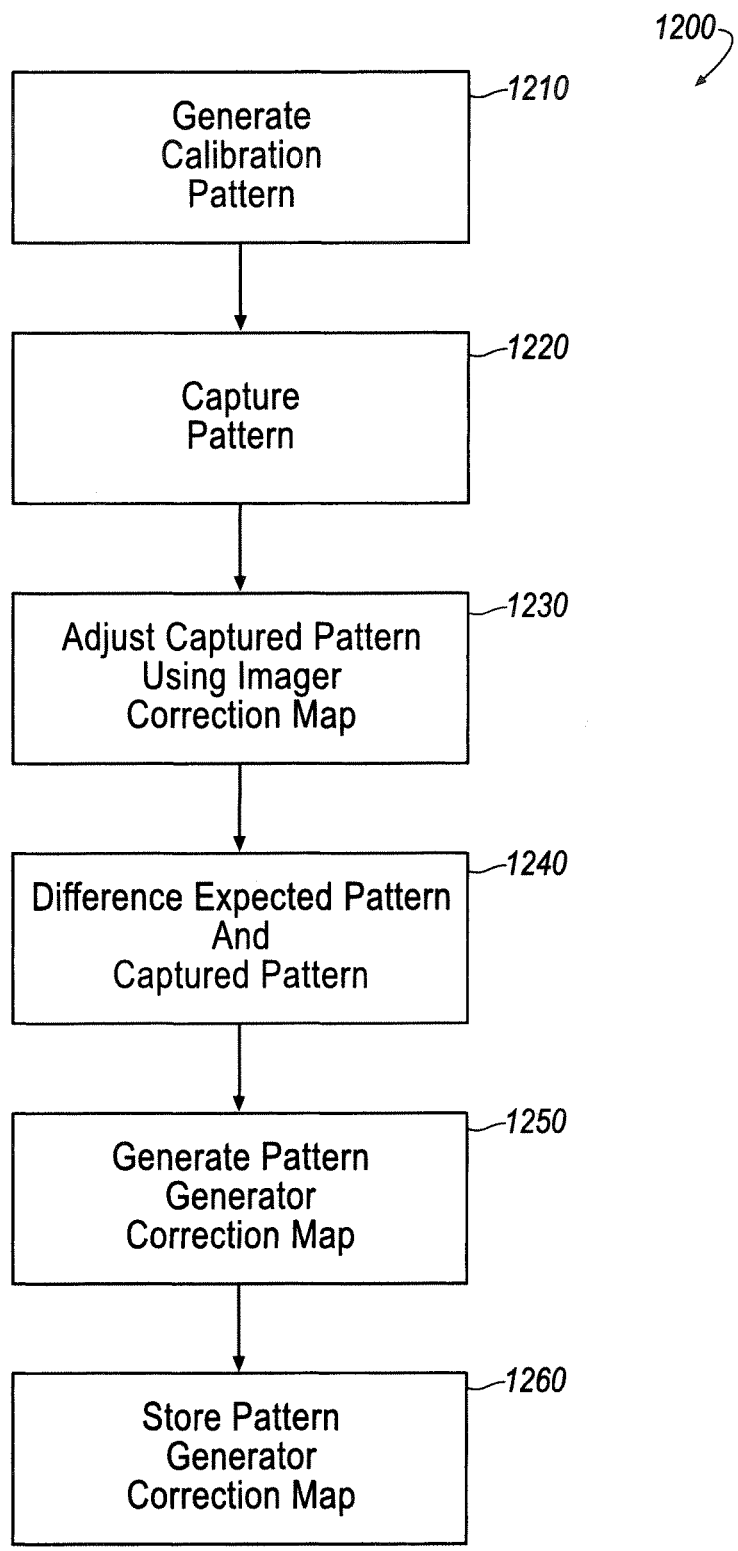
FIG. 1C is an example of a pattern generator calibration/correction method.

FIG. 1C is an example of a pattern generator calibration/correction method 1200. A calibration pattern is provided by controller 120 (or another source) and pattern generator 102, 104 (separately) generate the pattern. Imager 106 is then used to determine the accuracy of the generated pattern, and thus, a precise image after calibration/correction in method 1100 is used to take images of generated patterns to avoid inaccuracies resulting from linear and nonlinear distortion of imager 106. The generated pattern is then differenced with the ideal pattern to determine a pattern generator correction mapping for each pattern generator 102, 104. The pattern generator correction mapping may then be used to correct each bitmap or the voxel data so that the pattern generators provide an undistorted pattern. The undistorted pattern may be considered a pattern that yields the desired physical representation of the component or work piece that is representative of the actual data in the original three-dimensional CAD model, or any approximation thereof. Pattern generator calibration/correction method 1200 may be performed for each pattern generator 102, 104 independently so that calibration images do not interfere with determining the correction mapping based on a captured image by imager 106.

Figure 4A:
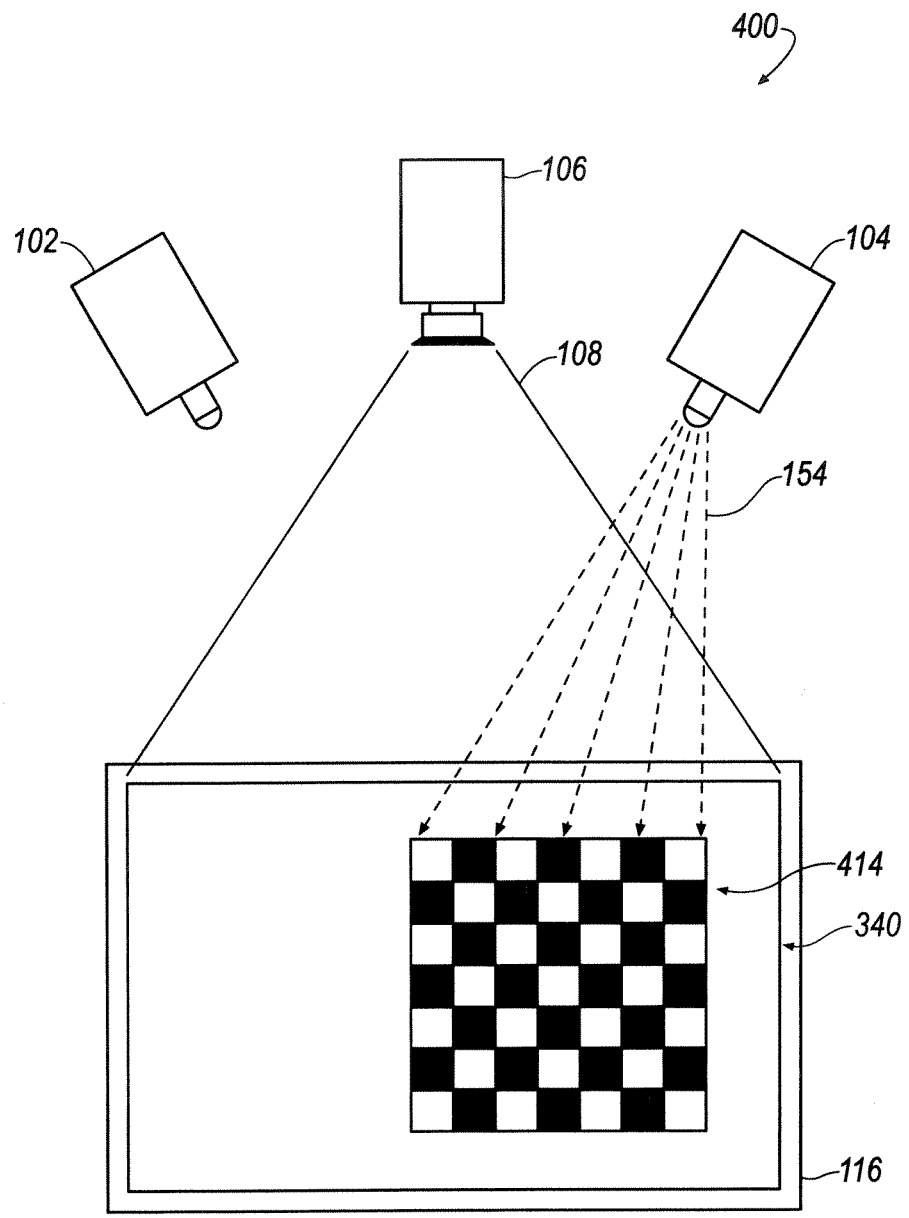
FIG. 4A shows calibration/correction of a pattern generator.

In step 1210, a pattern generator calibration pattern 412 or 414 (see FIGS. 4A, 4B) may be provided as pattern 132 (see FIG. 4B where pattern generator 102 is to be calibrated/corrected) or pattern 134 (see FIG. 4A where pattern generator 104 is to be calibrated/corrected). Calibration pattern 412 (see FIG. 4B) may be provided as a checkerboard pattern similar to imager calibration pattern 310, but defining a smaller area. Pattern generator 102 then generates the pattern to be displayed on the surface of reactive material 118, or on a blank surface placed over reactive material 118. The focal distance of pattern generator 102 to reactive material 118 (or the blank surface) should be about the same, or equal to, the focal distance used to calibrate/correct imager 106 with calibration template 310.

In step 1220, imager 106 captures the pattern generator calibration pattern 412, 414 and the image may be communicated to controller 120. However, other systems may be involved in the calibration/correction methods and compensation methods, and as discussed herein, controller 120 is used to indicate a processor having processing methods that may be distributed to other components within or outside of machine 100.

In step 1230, the image taken by imager 106 is adjusted using the imager correction mapping (discussed above with respect to FIG. 1B). The imager correction map adjusts for inaccuracies in the imaging device (e.g., optics or sensors) and the mechanical placement of imager 106. The resulting captured after imager calibration/correction represents a true image of the generated pattern.

In step 1240, the adjusted image of the calibration pattern is differenced with the ideal calibration pattern to determine the differences in the expected image (based on the ideal pattern) to the actual image. Similar to the method used above in step 1130 (see FIG. 1B), the differencing may use a mesh approach or a pixel-by-pixel approach. Differencing may be a pixel-by-pixel comparison, or it may take into account feature analysis and comparison. For feature analysis, the corners of black & white squares may be used to generate a 2-dimensional grid for both pattern generator calibration pattern 412 or 414 and the captured image. In another example, a starting-point may be determined to begin calculating pixel-by-pixel comparisons to detect edges. In either event, comparison of pattern generator calibration pattern 412 or 414 and the captured image may be performed to detect differences, where the lack thereof may be considered similarities. For example, if a portion of a captured image matches pattern generator calibration pattern 412 or 414, then the difference may be zero. Prior to differencing, additional steps may occur. For example, rotation and scaling may be applied prior to mapping.

In step 1250, a pattern generator correction map is generated using the differences determined in step 1240 by mapping the differences of pattern generator calibration pattern 412, 414 and the captured image of step 1240. The mapping may provide a mesh mapping (e.g., particular data-points that represent the 2-dimensional surface) or a pixel-by-pixel mapping. Choice of the mapping method (e.g., mesh or pixel-by-pixel) may depend on the level of inaccuracy or distortion between the ideal calibration template and the captured image. Where large inaccuracies are determined in the differencing, a pixel-by-pixel mapping approach may be appropriate. Where more acceptable differences are determined, a mesh approach may be more appropriate.

Mesh-type Correction Map:

| Original Location (X/Y) | Correction (ΔX/ΔY) |
|---|---|
| (0, 0) | (1, 2) |
| (0, 100) | (2, −5) |
| (100, 0) | (0, 2) |
| (100, 100) | (−2, −4) |

In the example of a mesh-type correction map above, the original bitmap location (0, 0) are one and two, respectively. Thus, the pixel located in the original bitmap at position (0, 0)

is shifted by one on the x axis, and two on the y axis. At point (0, 100) in the original bitmap, the point is shifted by two and minus five (x, y) respectively. At point (100, 0) in the original bitmap, the point is shifted by zero and two (x, y) respectively. Finally, in the simplified correction map, the point (100, 100) in the original bitmap is shifted by minus two and minus four (x, y) respectively.

The mesh-type correction map does not usually define an offset or correction value for each and every pixel. Typically, the mesh-type correction map allows for more points in areas that need tighter control over correction and less points where correction is stable, linear, or not necessary. The spacing of correction coordinates in the original bitmap does not need to be on a perfect "grid" pattern, nor does it require consistent spacing between mesh points. In general, the mesh-type correction map may use a fixed set of points or it may be dynamic based on the correction needs.

Similar to the imager correction map above, the pattern generator correction map may use the corner of each square of the checker board for position detection. The coordinates of each corner are related to real dimensions and locations (e.g., what is considered the ideal location if there were no linear or nonlinear distortions). The size and shape of each square may also be used as an input for the mapping procedure. The correction mapping may then be considered a reference map, where the ideal location and the actual location are used to correct or "fix" the image. The correction mapping may then be used as a reference map to provide real coordinates (e.g., inches or millimeter) dimensions and locations for every pixel of the device (e.g., pattern generators 102, 104).

In either event, a method for generating a mapping may be to create lookup tables for each x/y pair. Each particular x-axis table entry may include an x ordinate for the ideal pattern generator calibration pattern 412, 414 mapping and a corresponding x'-ordinate corresponding to the same pixel in the captured image. Similarly, each particular y-axis table entry may include a y-ordinate for the ideal pattern generator calibration pattern 412, 414 mapping and a corresponding y'-ordinate corresponding to the same pixel in the captured image. Thus, the tables provide a mapping of the ideal calibration template to the captured image. When a pixel-by-pixel mapping is chosen, each pixel in the imager is mapped to an ideal set of coordinates (x/y) of the ideal pattern generator calibration pattern 412, 414. Where a mesh mapping is chosen, only some of the coordinates (e.g., at the corners of each square; see FIGS. 4A 4B) may be input to a lookup table for mapping. Where a greater accuracy mesh is desired, intermediate points may also be taken to improve the mesh's accuracy. A determination of mapping type and accuracy may be determined using worst-case conditions and normal drift that may occur during operation (e.g., by thermal means) and/or other outside influences such as shock imparted to the device that may cause movement of components.

In an example, where the corner of a calibration box (e.g., the corner of the example ideal pattern generator calibration patterns 412, 414 discussed herein) is ideally located at pixel coordinates X=150 and Y=200, and where the imager locates the same corner at imager pixel coordinates X=140 and Y=208, the difference for the X ordinate is −10 and the difference for the Y ordinate is 8. When the correction mapping uses X and Y offset values assigned to each pixel, an entry in the pattern generator correction map for pixel (150, 200) is offset (−10, 8) based on the differences in the expected pixel location and actual pixel location. In practice, each time a bitmap is corrected for the pattern generator 102, 104, each pixel may be adjusted for position by the offsets contained in the imager correction map.

In an example where a voxelized construction process is used, both the position and the intensity (e.g., a grayscale value) may be adjusted to correct for linear and nonlinear distortions. Such intensity compensation is also useful for achieving sub-pixel features during the build process. For example, in voxelized construction, grayscale values may be used where facets of the design (e.g., the component or part to be constructed as described for example by an STL file) volumetrically intersect with a voxel volume. Typically, a build envelope for voxelized construction may be determined to be a collection of voxels which may be cuboid shaped. The dimension of the voxel cuboid to make up the build envelope may first be determined by the largest volume a voxel may occupy. The largest voxel volume may be determined to be a volume described by a number of parameters including the area of the pattern generator's single pixel size at the build plane, the reactive material's properties (e.g., related to depth of cure per time and intensity), the predetermined exposure time, and the full intensity of electromagnetic radiation from a pattern generator, and the type of electromagnetic radiation. The maximum voxel depth may be considered the maximum depth of cure in the reactive material given the aforementioned parameters. The build envelope may then be considered an arrangement of voxels having the maximum voxel depth. Each voxel's intensity in the build envelope may then be determined as the volume intersection of the work piece (e.g., using the STL file) within each voxel cuboid. For example, where the work piece occupies 50% of the voxel, the intensity value for that voxel may be determined to be 50%. Where the work piece occupies 100% of the voxel, the intensity value for that voxel may be determined to be 100%. Note, however, that the percent intensity value assigned to a voxel is material dependent, and that there may not be a linear relation between them (e.g., the intensity values for 50% depth of cure may be different for each reactive material). A detailed example of voxelized correction including intensity modification is shown below with respect to FIGS. 1MA-1MG. As discussed herein a voxel data may be expressed as a bitmap with intensities assigned for each pixel in the bitmap, the intensity providing variable depth of cure for each voxel.

The partial-pixel locations can be used in the construction process to achieve sub-pixel features, particularly on edges or outer boundaries. To accomplish this, the intensity (e.g., grayscale) of a border pixel may be adjusted based on the sub-pixel position. When manipulating sub-pixel positions using the image generator correction map, the grayscale of the pixel may be adjusted accordingly.

In step 1260, the pattern generator calibration/correction map may be stored to controller 120, pattern generator 102, 104 (where persistent storage is available), or another device that communicates with machine 100 or controller 106. In general, a calibration map may be stored as a binary file, XML file, or other proprietary format that includes absolute coordinate mapping or the differences for each mapped point. The imager correction map is used below in further examples and may be recalled at machine startup, generated at startup, and/or updated during operation and stored if desired.

Figure 1D:
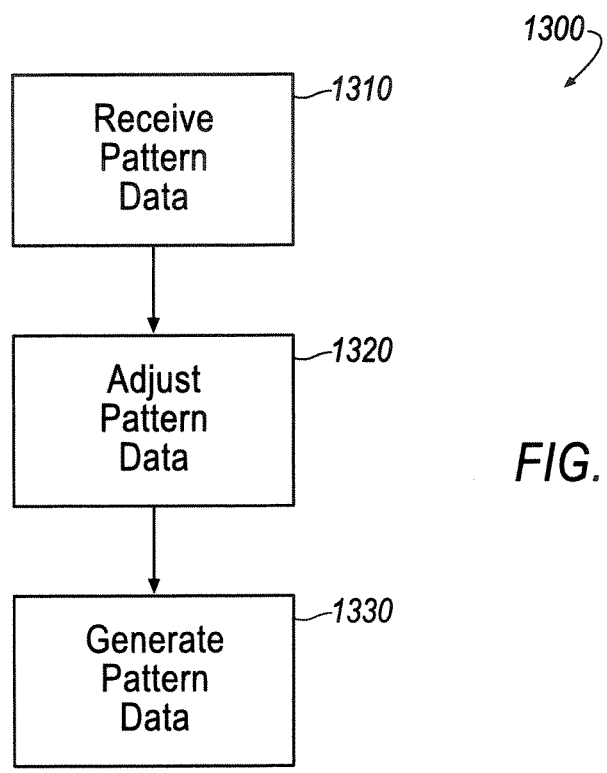
FIG. 1D is an example of a pattern adjustment method.

FIG. 1D is an example of a pattern adjustment method 1300. In general, machine 100 may be used to form (e.g., create) three-dimensional objects from a set of predetermined patterns that define the shape of the object. The set of predetermined patterns may be generated by a user, automatically (e.g., by computer), or by controller 120 given some other description of the three-dimensional object such as a faceted description.

In step 1310, ideal patterns are received by controller 120. The ideal patterns may be bitmaps, voxelized bitmaps, etc. The ideal patterns describe the three-dimensional object that is to be produced.

In step 1320, the ideal patterns are modified by the pattern generator calibration/correction maps determined in method 1200. Controller 120 outputs corrected patterns 132, 134 to pattern generators 102, 104. The modification may include simple translation or it may include a complete two-dimensional mapping of the image to compensate for geometric distortion of the pattern generator. Examples of geometric distortion are shown below with respect to FIGS. 5A-5C and may include both linear and non-linear distortion. The modification of the ideal patterns removes such distortion when finally output by a pattern generator.

In general, imager calibration pattern 310 is defined over a larger region so that the extents of imager calibration pattern 310 are within the calibrated region. Otherwise, the extremes of imager region 116 may be outside the calibrated region and would be un-calibrated/un-corrected. However, it is also possible to define a smaller calibration/correction region than the imager region 116 and use extrapolation to provide calibration/correction of pattern generator region beyond the imager calibration region.

In step 1330, pattern generators 102, 104 generate the corrected patterns to reactive material 118. When method 1300 is successively performed, each pattern 132, 134 is modified to correct for geometric distortion of pattern generators 102, 104.

Figure 1E:
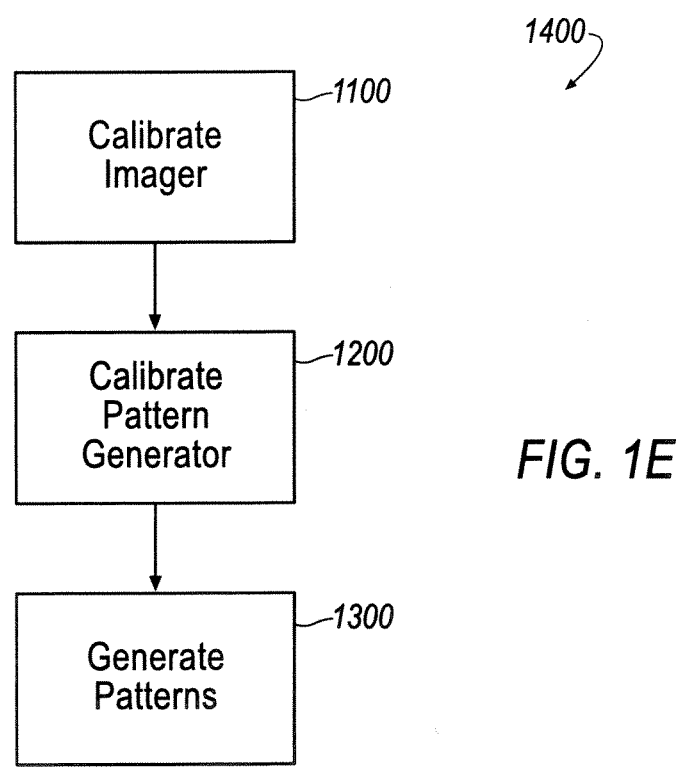
FIG. 1E is an example of a work piece construction method.

FIG. 1E is an example of a work piece construction method 1400. In step 1100, imager calibration/correction method 1100 is performed to calibrate/correct imager 106 (see FIG. 1B). In step 1200, pattern generator calibration/correction method 1200 is performed to calibrate/correction pattern generators 102, 104 (see FIG. 1C). In step 1300, pattern adjustment method 1300 is performed with each pattern 132, 134 to generate the work piece 114 (see FIG. 1A).

Figure 1F:
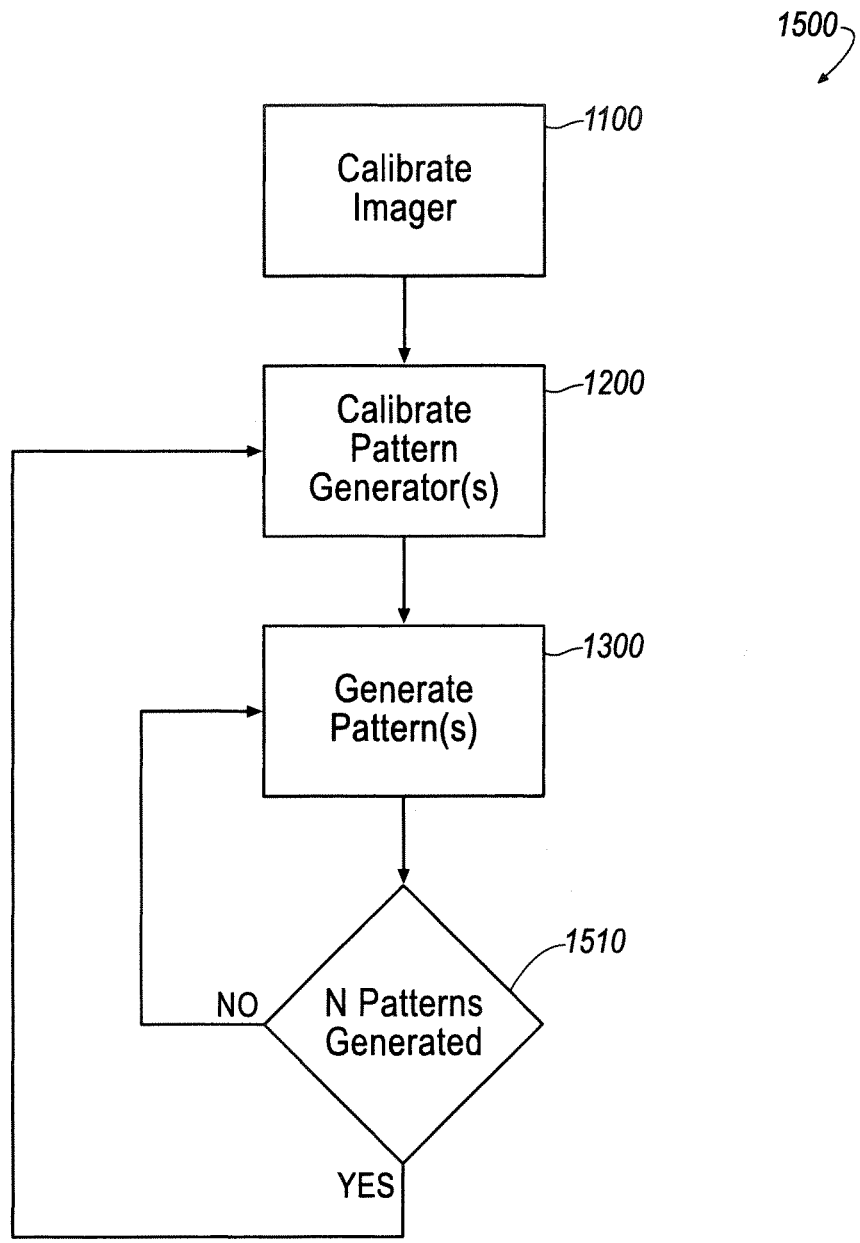
FIG. 1F is an example of a work piece construction method having an on-the-fly calibration/correction of the pattern generators.

FIG. 1F is an example of a work piece construction method 1500 showing an on-the-fly calibration/correction method to generate a work piece 114. Here, at certain times, the pattern generator calibration/correction method 1300 may be performed to adjust for run-time changes in the system, for example heating, that may change the pattern generator's 102, 104 output. In general a first plurality of patterns is modified and generated, then a calibration/correction of pattern generator 102, 104 is performed, and a second plurality of patterns is modified and generated. The periodic or predetermined re-calibration/correction of pattern generator 102, 104 allows machine 100 to maintain calibration and accuracy during operation.

In step 1100, imager calibration/correction method 1100 is performed to calibrate/correct imager 106 (see FIG. 1B).

In step 1200, pattern generator calibration/correction method 1200 is performed to calibrate/correct pattern generators 102, 104 (see FIG. 1C).

In step 1300, pattern adjustment method 1300 is performed with each pattern 132, 134 to generate a portion of the work piece 114 (see FIG. 1A).

In step 1510, controller 120 determines if a predetermined number of patterns (N) have been generated. If so, control proceeds to step 1300 where pattern generators 102, 104 are re-calibrated. To perform the re-calibration without affecting work piece 114, a wavelength of electromagnetic radiation may be used (e.g., a "red" light in the electromagnetic spectrum) that does not cause reactive material 118 to change state or polymerize. In this way, pattern generators 102, 104 may be maintained as calibrated over the course of operation.

FIG. 1G is an example of an on-the-fly calibration/correction method 1600 with an end-loop function. Calibration/correction method 1600 may be used with the examples shown herein, including but not limited to, those shown in FIGS. 1A, 1H, and 8A-11. When used, for example, during a continuous build process (described in detail below with respect to FIGS. 1H-1J) the pattern generator(s) may be re-calibrated and corrected during the build process. Such re-calibration of the correction maps may be useful where heating or other variables during use may cause changes that may require an updated correction map.

In step 1100, imager calibration/correction method 1100 is performed to calibrate imager 106 (see FIG. 1B).

In step 1200, pattern generator calibration/correction method 1200 is performed to calibrate pattern generators 102, 104 (see FIG. 1C).

In step 1300, pattern adjustment method 1300 is performed with each pattern 132, 134 to generate a portion of the work piece 114 (see FIG. 1A).

In step 1610, controller 120 determines if all patterns 132, 134 have been performed. If so, method 1600 ends.

In step 1620, controller 120 determines if a predetermined number of patterns (N) have been generated. If so, control proceeds to step 1300 where pattern generators 102, 104 are re-calibrated. To perform the re-calibration without affecting work piece 114, a wavelength of electromagnetic radiation may be used (e.g., a "red" light in the electromagnetic spectrum) that does not cause reactive material 118 to change state or polymerize. In this way, pattern generators 102, 104 may be maintained as calibrated/corrected over the course of operation.

Figure 1H:
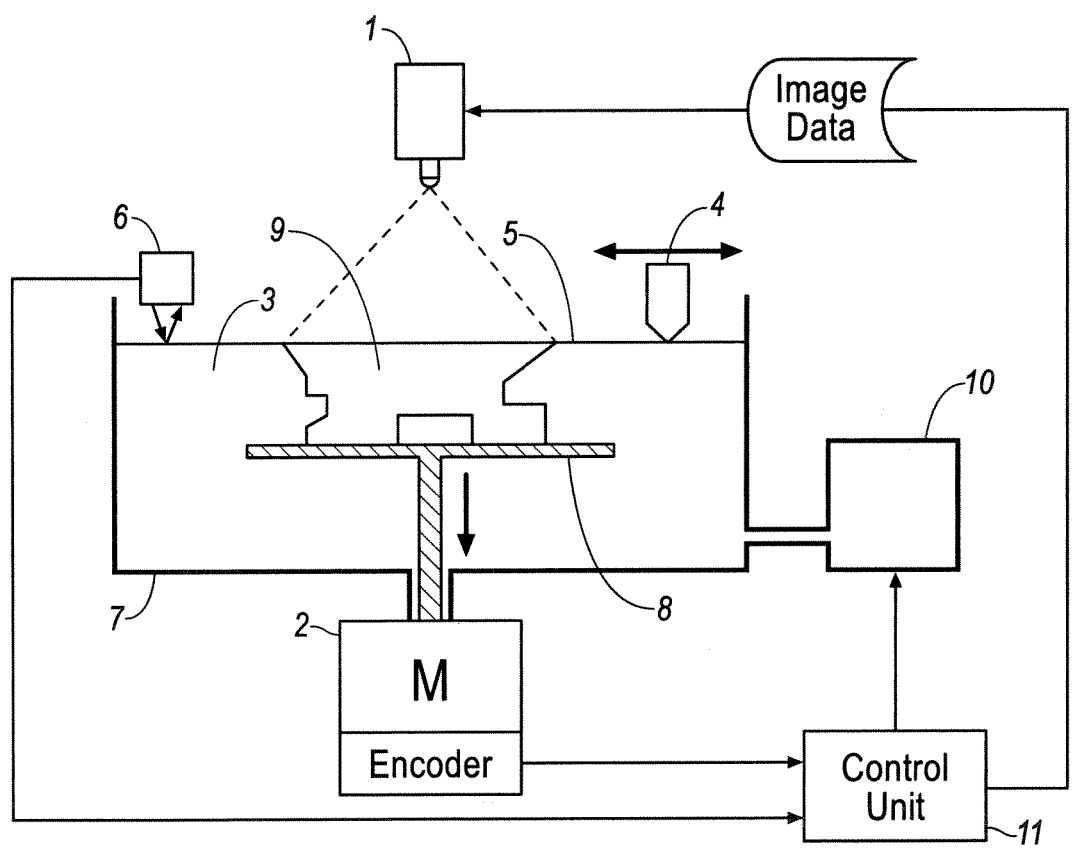
FIG. 1H shows an example schematic basic scheme of a process or a device (in cross-section), where radiation is carried out from the top.

The structure in FIG. 1H schematically shows, in cross-section, an example of the device of the invention for a rapid prototyping process on the basis of photo-solidification by means of electromagnetic pattern exposure using a pattern generator 1, wherein below the pattern generator 1, an active material 3 is provided in a container 7 with a level of the surface 5 of the active material 3. Here, the surface 5 of the active material 3 forms the surface of the projected image and thus defines the building surface. A support plate 8 moveable in vertical direction is provided in the container and thus within the liquid material. The position of support plate 8 in the Z direction is known at any time (e.g., by open-loop or closed-loop control) and may be controlled via the control unit 11, by an encoder, and/or by the use of a motor (M) 2. In this example, the fill level of the material during the building process is kept constant. The fill level and thus the position of surface 5 in the Z direction can be determined by a fill level sensor 6 and may be re-adjusted via a reservoir 10 containing additional reactive material 3, or a volume compensator (not shown) may be used to adjust the position of surface 5. The volume compensator may be a bar or other object that is moved in and out of the reactive material to displace volume, and thus, adjust the position of surface 5.

The support plate 8 (with the object generated) is continuously moved down from the material surface, wherein the hardening depth of the selectively electromagnetically radiated reactive material can be controlled by the moving speed of support plate 8 and/or the intensity of the electromagnetic radiation provided. A cooling element 4 can be moved horizontally across or above the surface 5 to displace heated reactive material 3. Because electromagnetic radiation is used to solidify or partially solidify reactive material 3, the exothermic nature of the electromagnetic radiation allows heat to develop at surface 5, which may cause reactive material 3 to expand locally at surface 5. Thus, cooling element 4 may be swept across surface 5 occasionally during a continuous generation process (e.g., a continuous build process) or a layer-based non-continuous generation process. The timing of use for cooling element 4 may be determined by the amount of electromagnetic radiation projected on the build surface 5 during a period of time, including the time since the cooling element 4 was last used.

In this example, the support plate is moved during the whole building process continuously away from the building surface with a constant or a variable speed. Here, the change of the moving speed influences the depth of curing of the reactive material 3 and thus can be specifically controlled/adjusted during the building process, e.g. in order to achieve an over-exposure or sub-exposure in a part of the construction. By lowering the generated object on the support plate away from the building surface below the material surface, new and fresh material which is not yet polymerized onto the object flows from the outside and fills the lowered portion.

Figure 1I:
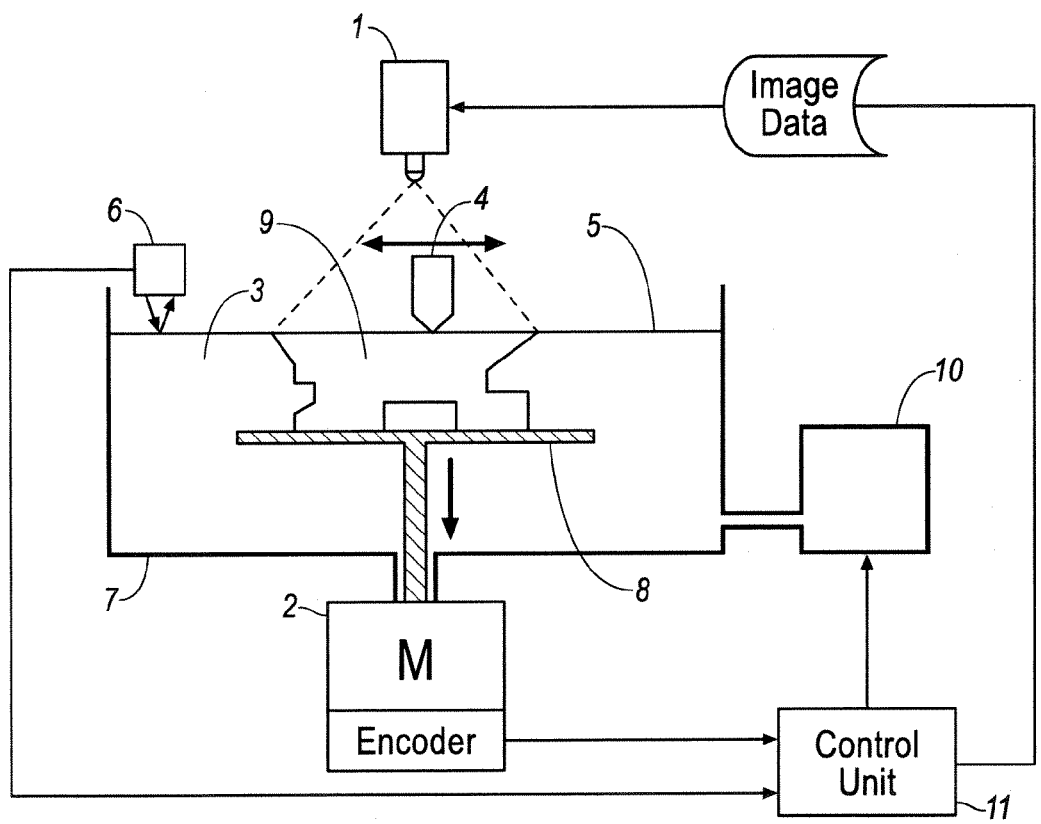
FIG. 1I shows an example schematic basic scheme of a process or a device (in cross-section).
Figure 1J:
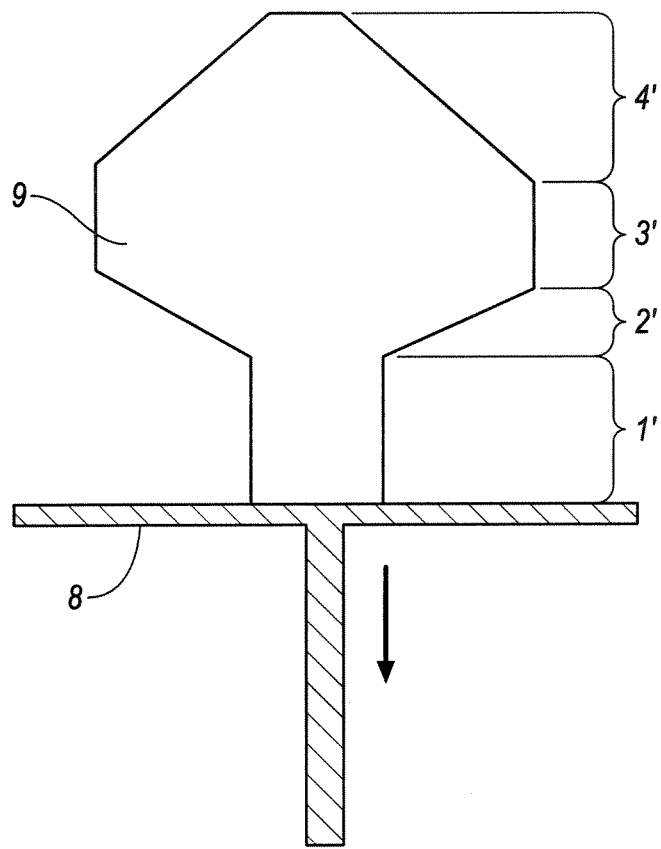
FIG. 1J shows an example schematic scheme of a process or a device (in cross-section on the left; in perspective on the right) in a detailed view.

FIG. 1J illustrates a highly variable, yet very simple technique for producing a three-dimensional object layer-independently or without layers. Analogous to FIGS. 1H and 1I, support plate 8 may be configured to move down (away from the building surface 5) and the three-dimensional object 9 may be continuously generated thereon. Sections 1', 2', 3' and 4' respectively denote particular construction sections of the three-dimensional object 9. Each construction section 2', 3', 4' may comprise a plurality of voxel data sets that determine the geometry of three-dimensional object 9.

As an example, a portion 12 of the three-dimensional object 9 under construction can be seen as voxel data 13 in a side view. Voxel data 13 may comprise a plurality of voxels 14 that have different depths. The depths of each voxel 14 may be dependent on the grayscale value used during generation or the time of exposure. As shown the voxel data may include voxels that are not organized in a flat manner to as to provide stress relief to three-dimensional object 9 as it is being constructed, and to provide increased structural integrity. Where some voxels 14 may appear to protrude upwardly and downwardly, they may actually interleave with other voxels (e.g., below and above) to form the desired geometry for three-dimensional object 9. Such voxelization construction techniques may be superior to layer-based techniques in that the surface regions may be smoother and more accurate, the geometric accuracy of three-dimensional object 9 may be increased (due to reduced internal stresses when using variable depth of cure and interleaving), as well as providing increased structural integrity (e.g., using interleaving). Moreover, as shown in the voxel data 13, the interior voxels (e.g., interior to three-dimensional object 9) may have reduced depth (e.g., reduced intensity) because this may be where the maximum shrinkage of the reactive material occurs (note that shrinkage, if any, is material dependent based on the type of reactive material used with or without fillers etc.).

A relatively low number of voxel data sets may be required for sections 1', 3' of the three-dimensional object 9 where circumferences practically remain unaltered, whereas a relatively higher number of voxel data sets may be required for sections 2', 4' where circumferences do change. The moving speed of the support plate can also be selectively adjusted to the respective sections, in order to generate sections practically free of layers. For example, a relatively high moving speed can be chosen for structurally simple sections 1', 3', whereas however a relatively low moving speed can be chosen for structurally complicated sections 2', 4'.

Referring now to FIGS. 1H-1J, in general, it was surprisingly found that—contrary to the conventional stereolithography technique—a complete layer-wise generation of the three-dimension object can be dispensed with; it was found that a layer-independent operation can be carried out and that a device can be correspondingly arranged. Conventional processes and devices may be improved by the examples shown herein, and the subsequently described features can be provided, or the respectively mentioned advantages can be achieved alone, alternatively or in combination: During a continuous (uninterrupted) exposure operation, i.e. during at least one electromagnetic radiation phase and preferably during the whole building process of the three-dimensional object, the distance between a support plate for the three-dimensional object and the building surface can be varied continuously, i.e. without interruption.

Thereby, it is not required that the reactive material solidifies in a process with multiple discrete steps and respectively with layer-formation to be performed per step. If, due to possible electromagnetic radiation interruptions, some slight interface layer formation would still occur, such an interface formation can be minimized to a low number or even totally eliminated. Further, the building process may be accelerated by performing a continuous build process rather than a layer-based build process. It is further possible to dispense with a generation of sliced image data. The continuous change of the said distance can be realized depending on the desired embodiment, by moving the support plate away from the building surface, and/or by moving the construction surface or the fill level of the photopolymerizable material away from the support plate. The latter can be carried out in the case of an irradiation from above the support plate by lifting the building surface or by raising the fill level of the photopolymerizable material relative to the support plate. A moving away of the support plate from a pre-set building surface is preferred according to the examples shown in FIGS. 1H-1J.

When the said distance is continuously changed during an irradiation operation and preferably during the whole building process of the three-dimensional object, structure steps in the main building direction (typically the vertical Z-direction)—different from the conventional layer-wise process—can be reduced and advantageously minimized, or may even be adjusted to a continuous gradation down to an absence of structure steps. Unlike the conventional layer-wise process, distinct structure steps in Z defined by predetermined layers are not required. Rather, structure steps in the Z-building direction can be flexibly controlled depending on building conditions, and optionally can be variably adjusted or may even be realized in the form of a continuously gradual structure.

The three-dimensional object is allowed to solidify or grow in the main building direction (typically in the Z-direction) without interrupting the supply of electromagnetic radiation respectively during an irradiation phase and optionally during the whole building process. The corresponding continuous growth of solidifiable material in the main building (Z) direction during an irradiation phase may thus proceed at an extent exceeding a usual hardening depth which was applied in the conventional layer-wise solidification and which is predetermined by the used supply of electromagnetic radiation and/or by a used polymerizable material.

By the layer-independent continuous operation, it is even possible to specifically influence and to control a current hardening depth of the photopolymerizable material. An adjustment of the speed of the support plate supporting the object to be generated moving away from the building surface, and an adjustment of the irradiation intensity of pixels (grey value or color value), respectively alone or in combination, are particular means for controlling the hardening depth.

The system according to the examples shown in FIGS. 1H-1J allows the provision of a three-dimensional object, which has been formed by electromagnetic radiation of a reactive material using a continuous construction method, but without separately polymerized structure elements that might be formed from layers, dots or strands of the photopolymerizable material. Unlike the conventional stereolithography or other conventional free-form building techniques such as selective laser sintering, ballistic particle production, fusion deposition modeling, three-dimensional printing, three-dimensional plotting or other rapid prototyping processes, three-dimensional objects having no separate layers or individual material strands or dots can be provided through the uninterrupted continuous build process avoiding formation of layer lines or visible cross-sections in the Z direction. The technique is particularly suitable for providing a three-dimensional object which comprise different sectional areas in the direction of continuous material construction.

Figure 1K:
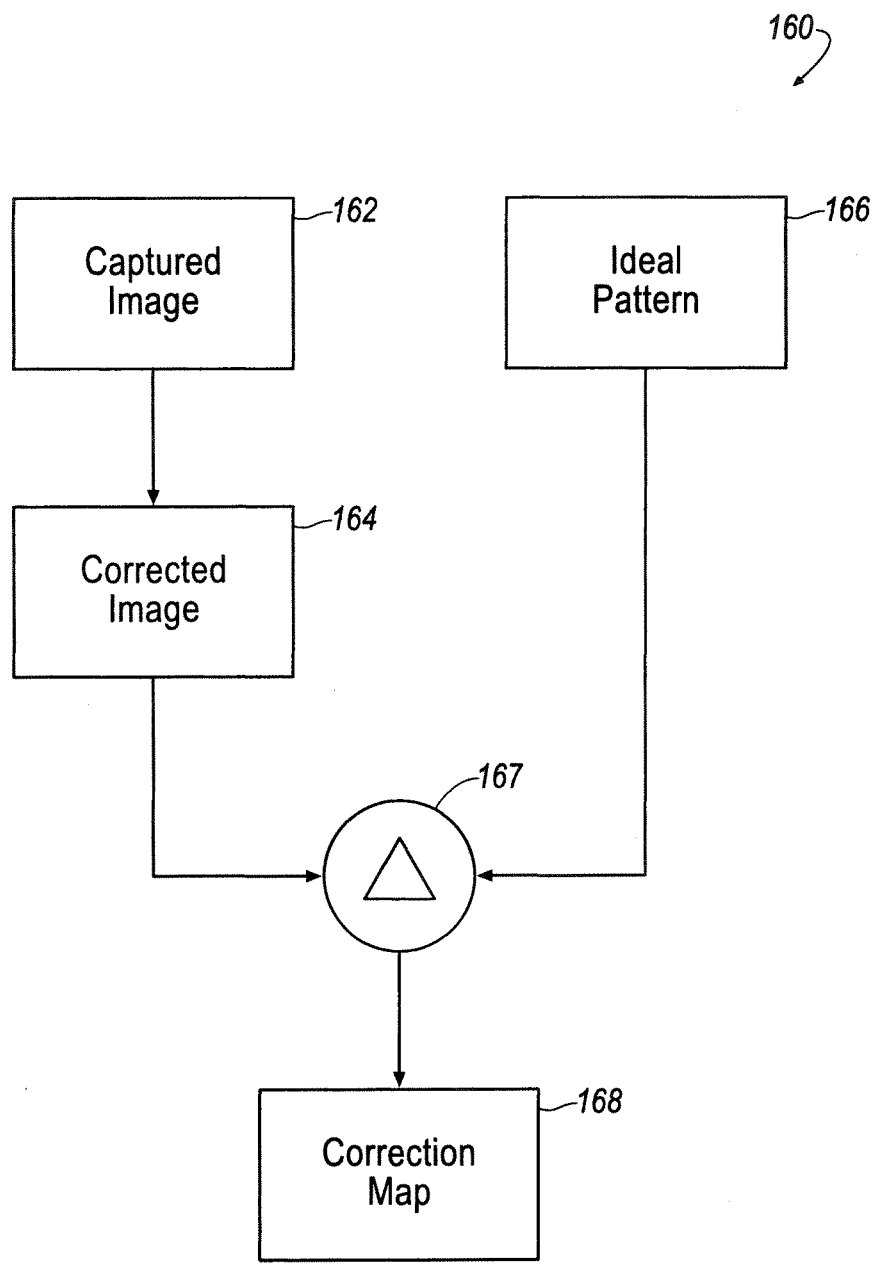
FIG. 1K is an example of a generalized correction map generation system for use with the systems and methods described herein.

FIG. 1K is an example of a generalized correction map generation system 160 for use with the systems and methods described herein. A captured raw image 162 from imager 106 may be provided to controller 120. Raw image 162 may then be corrected using the imager correction map (see FIG. 1B steps 1140, 1150) to produce a corrected image 164. Note that when correction map generation system 160 is used to calibrate imager 106 alone, the imager correction map is not used because the raw picture from imager 106 is differenced with the ideal pattern (e.g., an ideal representation of calibration template 310). A differencing method 167 (e.g., step 1130 of FIG. 1B; Step 1240 of FIG. 1C) may then be used to compare an ideal pattern 166 with corrected image 164. The difference is then stored as a correction map 168.

Figure 1L:
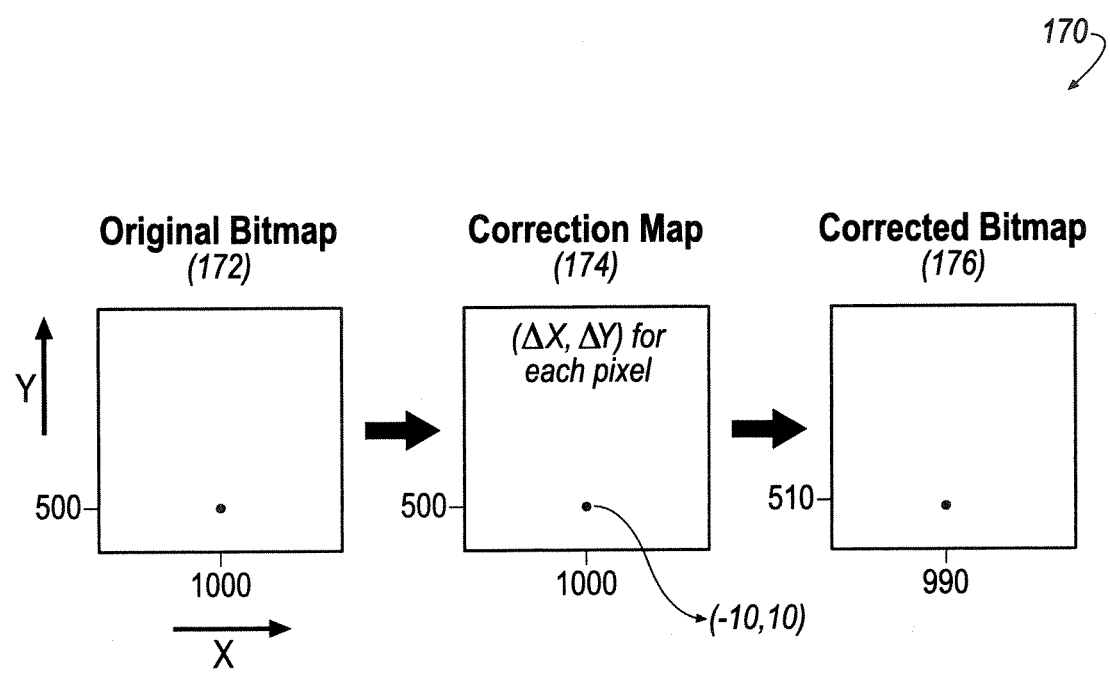
FIG. 1L is an example of pixel-based geometric correction.

FIG. 1L is an example of pixel-based geometric correction. The geometric correction may be applied to voxelized construction methods and/or slice-based construction methods. For example, a pixel (1000, 500) in a coordinate system generally described as (X, Y) coordinates may be referenced in an original bitmap 172. A correction map 174 (e.g., a generalized correction map that may apply to imager 106 or pattern generators 102, 104) may contain offsets or delta values for both X and Y directions. In this example, the correction offsets are (−10, 10). To apply the pixel-based geometric correction, the pixel's original coordinates (from original bitmap 172) are added with the correction offsets from correction map 174 to produce the correction bitmap 176 coordinates. In this example, the corrected X axis ordinate is 1000+(−10)=990. The corrected Y axis ordinate is 500+10. Thus, the corrected bitmap coordinate for the original pixel (1000, 500) is determined to be (990, 510).

Figure 1M:
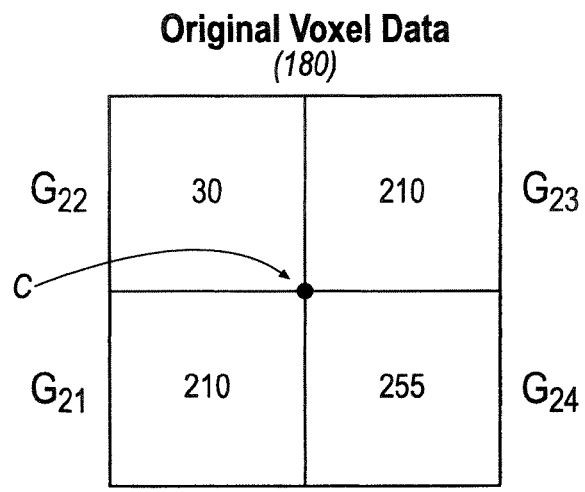
FIG. 1MA is an example of an original voxel data set having intensity information for each voxel.
Figure 1M:
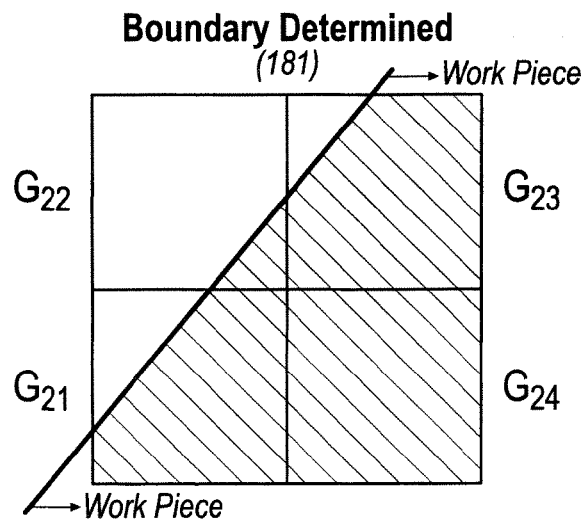
Figure 1M:
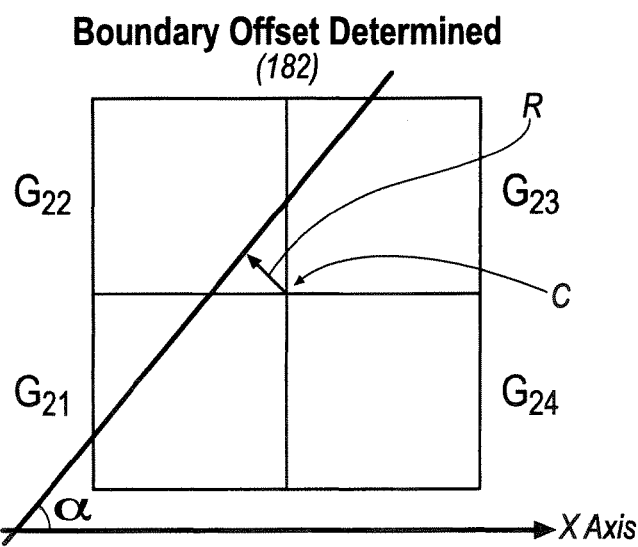
Figure 1M:
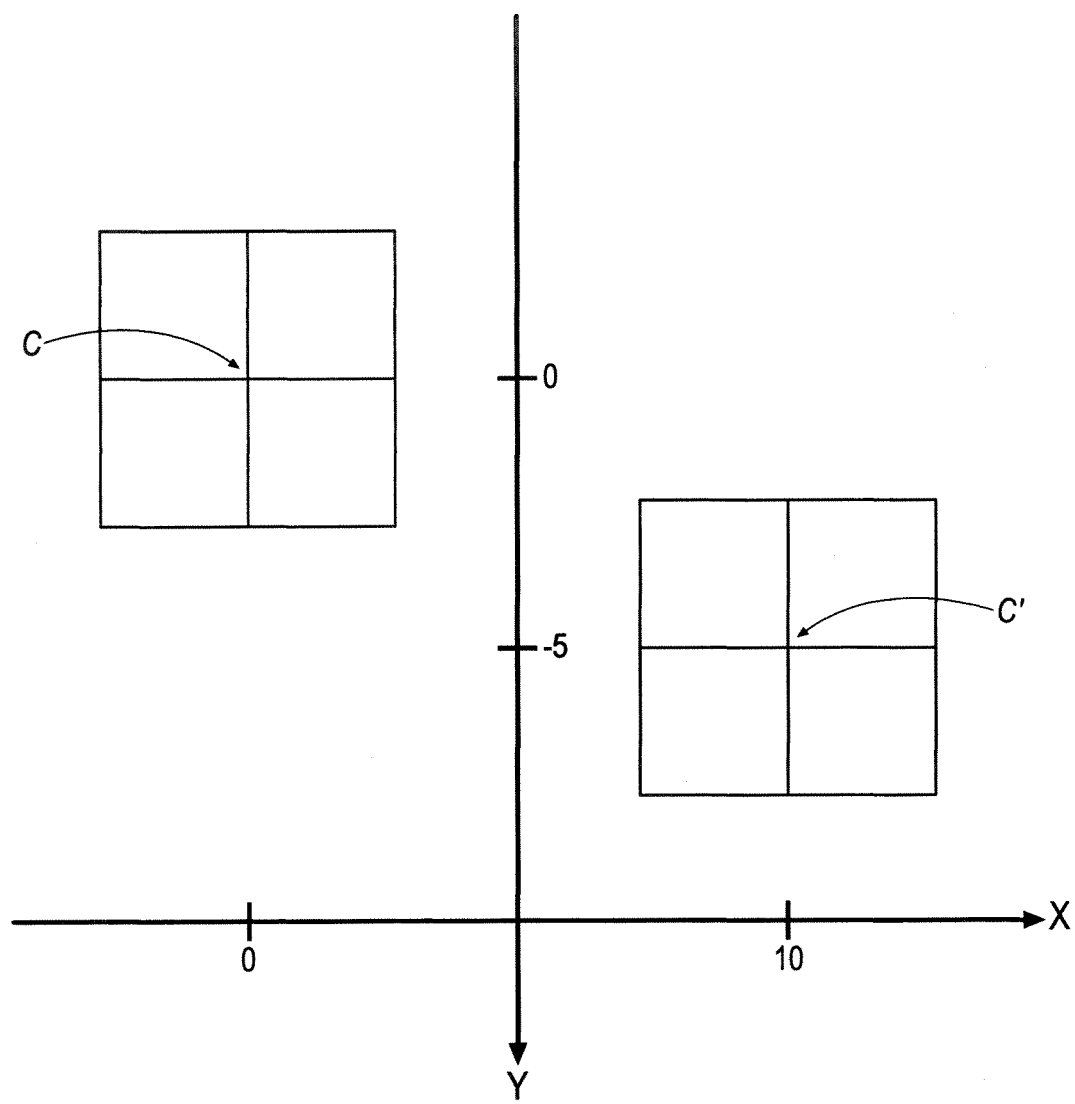
Figure 1M:
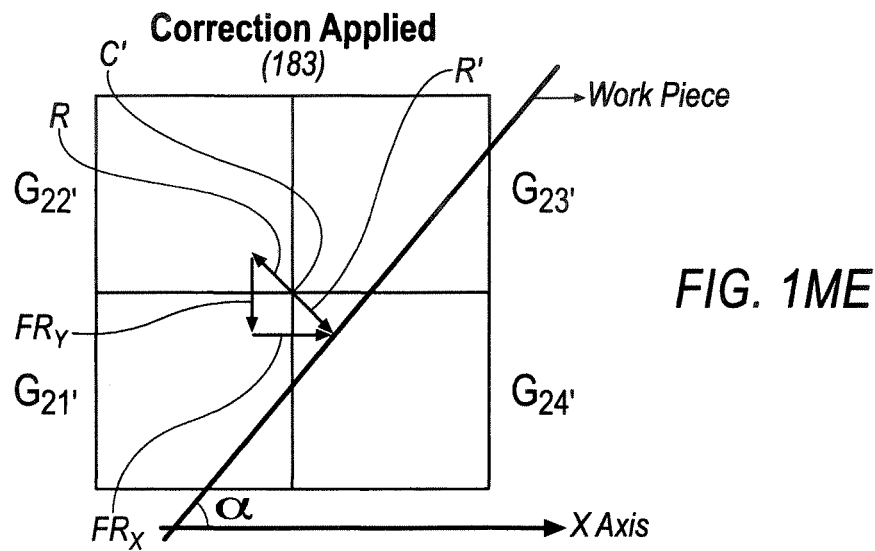
Figure 1M:
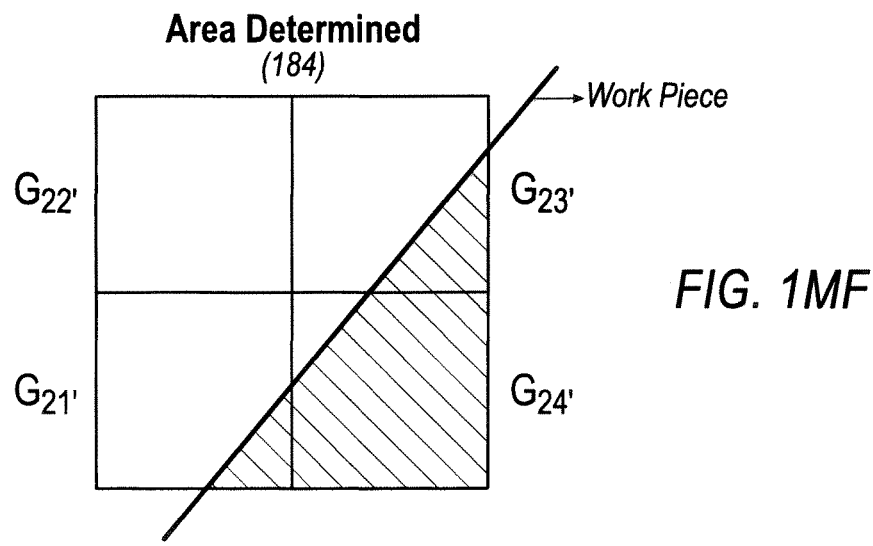
Figure 1M:
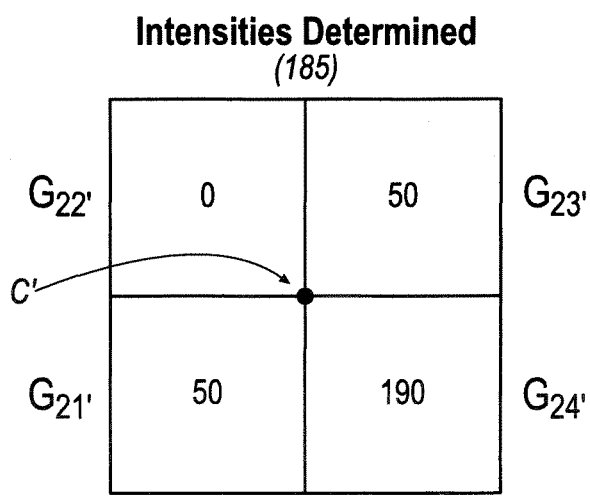

In general, for FIGS. 1MA-1MF a geometric correction may be applied to a voxel data (that includes intensity information) to generate a corrected voxel data. Such correction provides finer detail features than the pixel-based correction of FIG. 1L. The geometric correction may be applied to voxelized construction methods discussed herein.

FIG. 1MA is an example of an original voxel data set 180 having intensity information for each voxel. Four voxels {G21, G22, G23, G24} are shown as having intensities {210, 30, 210, 255} respectively. The voxels have a central point C shown in the diagram at the center of the pixels. Original voxel data set 180 may be provided (as discussed below with respect to FIG. 1N) in numerous formats that may be applied to voxelized construction methods.

FIG. 1MB is an example of a boundary determination for a component using the intensity information from each voxel. Using the voxel intensity information, the direction of the component and the outer boundary can be determined. For example, where there are numerous full intensity voxels (e.g., an intensity of 255 on a 0-255 scale) these sections may be deemed to be part of the inner body portion of the component. Similarly, where there are voxels with less than full intensity, these voxels may be deemed as voxels that may define the boundary of the component (e.g., the inner/outer features or the inner/outer surface of the component). Using the grayscale information from original voxel data set 180, the boundary can be determined. In general, the grayscale may be defined as the depth of cure of an individual voxel that is used to create the component. Where voxel G24 is at full intensity (255) defining the component body (e.g., an inner body portion that is not a boundary voxel), the direction of the part may be determined in relation to the non-full intensity voxels G21, G22, G23.

In general, when using a voxelized construction process, the intensity of a voxel corresponds to the volume that the component will occupy in the voxel volume at a predetermined depth. The intensity of the voxel (corresponding to a curing depth for that voxel) may thus be related to the cuboid-shaped volume (e.g., of the voxel) that the work piece will occupy. Given the direction of the component's inner body (e.g., as indicated and determined for example by full intensity voxels G24), the volume of voxels G21, G22, G23 determine the boundary of the work piece because they have less-than-full volumes (e.g., less than 255 intensity).

The intensity of a component boundary voxel (when using a voxelized construction process) may correspond to the volume that the component will occupy in the voxel's volume. Given the direction of the component (e.g., as indicated and determined for example by full intensity pixel G24) the volume of pixels G21, G22, G23 by their intensities determine the boundary of the component. In this way, the original voxel data set allows for reconstruction of the component within the voxel data set for later use in the geometric correction methods.

FIG. 1MC is an example of a boundary offset determination from a central point C to the voxels. To determine the distance from central point C to the boundary of the component, the angle of the component boundary is found with reference to the ideal X axis. The reference angle α (alpha) is taken from the X axis to the component boundary. An original distance R is the distance normal from the component boundary to the central point C. Original distance R will be used later to provide the origin for correction offset applied for the component boundary position.

FIG. 1MD a position shift is applied to determine a corrected central point C'. Corrected central point C' is determined by the integer portion of a correction offset value for the X and Y axis. For example, where the correction value for the X axis is 10.5, the corrected central point C' will be shifted the integer portion 10 along the X axis, and where the correction value for the Y axis is −5.25 the new central point along the Y axis will be shifted the integer portion −5. Thus, relative to the original central point C, the corrected central point C' will be offset by (10, −5) from the original location.

FIG. 1ME is an example of applying a correction offset to the boundary of the component to a corrected voxel location. As discussed herein, the methods for correction of linear and nonlinear distortions may be integer-based (e.g., full voxel) or real-based (e.g., where voxelized construction is performed).

When using voxelized construction, the grayscale value for each voxel may also be determined to provide the detail, and in particular, the surface detail of the component. The fractional portions of the correction values for X and Y may be used to determine the location of the component boundary and then the grayscale values for the voxels may be determined. For example, once the corrected central point C' is determined based on the integer values of the correction map, the fractional portions of the correction values may be used to determine the location of the component boundary within the corrected voxel region.

Keeping with the prior example, the correction offsets are (10.5, −5.25) along the X and Y axes respectively. The end of original distance R from corrected central point C' is the starting location for voxelized correction of the component boundary. The fractional portion of the Y correction value is −0.25, and is applied as an offset to the end of original distance R. Then the fractional portion of the X axis (0.5) is applied further applied to give a corrected distance R' to the component boundary. The reference angle α (alpha) is the same angle from the X axis as from the original voxel data set boundary determination to the component boundary.

FIGS. 1MF and 1MG are an example of a corrected intensity determination for the corrected voxel location using the component boundary. Since the new component boundary has been corrected with respect to the corrected voxel locations (G21', G22', G23', G24'), the grayscale value for each corrected voxel may be determined. The area covered by the component boundary is shown in FIG. 1MF with respect to the component direction, which remains the same as in the original voxel data set (for example as determined in FIG. 1MB).

FIG. 1MG shows the final grayscale values for the corrected voxels {G21', G22', G23', G24'} as being {50, 0, 50, 190} respectively based on the area covered by the component at the boundary. Thus, the original bitmap may be corrected for each voxel and/or each intersection of voxel (e.g., central point C) and the intensity for the corrected voxels determined. The system may then send the corrected voxel data set to pattern generators 102, 104 at the appropriate time.

In general, for FIGS. 1MAB-1MFB a geometric correction may be applied to a bitmap that has an "on" or "off" value for each pixel, to generate a corrected bitmap. The geometric correction may be applied to bitmaps typically used in slice-based construction methods.

FIG. 1MAB is an example of an original bitmap 180' having an "on" or "off" value for each pixel. Four pixels {G21, G22, G23, G24} are shown as being {on, off, on, on} or {1, 0, 1, 1} respectively. The pixels have a central point C shown in the diagram at the center of the pixels. Original bitmap 180' may be provided (as discussed below with respect to FIG. 1N) in numerous formats that may be applied to slice-based construction methods.

In general, the determination of whether a pixel in the bitmap is "on" or "off" may depend on the area that the component covers (with respect to each pixel of the bitmap) and a threshold value for coverage. The area covered may be determined by the intersection of the component boundary with the pixel area. Where a threshold value is 40% of the pixel, if the two-dimensional area of the component within the pixel is greater than or equal to 40%, then the pixel will be turned "on". If the two-dimensional area of the component within the pixel is less than 40%, then the pixel will be turned "off". Those of skill in the art may also allow for the threshold to be set to any value, including 30%, 50%, 70%, etc. Moreover, the threshold value may change depending on the geometry of the component (e.g., angled regions vs. flat regions vs. vertical regions), or the location of the pixel.

FIG. 1MBB is an example of a boundary determination for a work piece using the pixels from the bitmap. Using the pixel intensity information, the direction of the component and the outer boundary can be determined. For example, where there are numerous pixels in the "on" state, these sections may be deemed to be part of the inner body portion of the component. Similarly, where the pixels are "off", these pixels may be deemed as pixels that are outside the boundary of the component (e.g., the inner/outer features or the inner/outer surface of the component). Using the "on" and "off" information of each pixel from original bitmap 180', the boundary can be determined. Where pixel G24 is at "on" (1) defining the component body (e.g., an inner body portion that is not outside the boundary), the direction of the part may be determined in relation to the "off" pixel(s) G22. Here, using the original bitmap's pixel information, and possibly the bitmap's threshold value (e.g., the area that the component occupies in the slice-date for each bit that causes the bit to be "on") the boundary of the part may be reconstructed for later use in the geometric correction methods.

In an example using the original bitmap's pixel information, the boundary of the part may be reconstructed for later use in the geometric correction method. Moreover, using the bitmaps threshold value (in this example 40%), the boundary of the component may be reconstructed in a relatively accurate manner for later correction. For example, in FIG. 1MBB, the boundary is determined to be a smooth surface, rather than follow the jagged edge that would otherwise be determined by pixels G21 and G23. The component boundary may be estimated as being nearly through the center of each outer boundary pixel (e.g., G21 and G23) and may also be influenced by neighboring pixels to estimate a smooth surface. Here, the component boundary is estimated through nearly the middle of pixels G21, G23 because the "on" threshold for each pixel is 40%. Other methods may be applied, however, using boundary estimation (rather than using the original jagged edge determined by the original bitmap pixels) may provide for improved results using the geometric correction methods.

FIG. 1MCB is an example of a boundary offset determination from a central point to the pixels. To determine the distance from central point C to the boundary of the component, the angle of the component boundary is found with reference to the ideal X axis. The reference angle α (alpha) is taken from the X axis to the component boundary. An original distance R is the distance normal from the component boundary to the central point C. Original distance R will be used later to provide the origin for correction offset applied for the component boundary position.

FIG. 1MDB a position shift is applied to determine a corrected central point. Corrected central point C' is determined by the integer portion of a correction offset value for the X and Y axis. For example, where the correction value for the X axis is 10.5, the corrected central point C' will be shifted the integer portion 10 along the X axis, and where the correction value for the Y axis is −5.25 the new central point along the Y axis will be shifted the integer portion −5. Thus, relative to the original central point C, the corrected central point C' will be offset by (10, −5) from the original location.

FIG. 1MEB is an example of applying a correction offset to the boundary of the component to a corrected pixel location. As discussed herein, the methods for correction of linear and nonlinear distortions may be integer-based (e.g., full pixel) or real-based (e.g., where sub-pixel correction is performed). When using real-based or sub-pixel bitmap correction for slice-based construction methods, the fractional portions of the correction values for X and Y may be used to determine the location of the component boundary and then the "on" or "off" determination for each pixel may be made. For example, once the corrected central point C' is determined based on the integer values of the correction map, the fractional portions of the correction values may be used to determine the location of the component boundary within the corrected pixel region.

Keeping with the prior example, the correction offsets are (10.5, −5.25) along the X and Y axes respectively. The end of original distance R from corrected central point C' is the starting location for sub-pixel correction of the component boundary. The fractional portion of the Y correction value is −0.25, and is applied as an offset to the end of original distance R. Then the fractional portion of the X axis (0.5) is applied further applied to give a corrected distance R' to the component boundary. The reference angle α (alpha) is the same angle from the X axis as from the original bitmap boundary determination to the component boundary.

FIGS. 1MFB and 1MGB are an example of a corrected bit value determination for the corrected pixel location using the estimated component boundary. Since the new estimated component boundary has been corrected with respect to the corrected pixels (G21', G22', G23', G24'), the "on" and "off" determination for each corrected pixel may be done. The area covered by the component boundary is shown in FIG. 1MFB with respect to the component direction, which remains the same as in the original bitmap (for example as determined in FIG. 1MBB).

As discussed earlier, the pixel threshold may be 40%. Thus, the "on" or "off" value may now be determined using the estimated component boundary. As discussed above, where the threshold is 40%, where the two-dimensional area of the component within the pixel is greater than or equal to 40%, then the pixel will be turned "on". If the two-dimensional area of the component within the pixel is less than 40%, then the pixel will be turned "off". As shown, the estimated component boundary does not cover more than the threshold (40%) for pixels G21', G22', G23'. However, the estimated component boundary does cover more than the threshold (40%) for G24'.

FIG. 1MGB shows the final "on" and "off" values for the corrected pixels {G21', G22', G23', G24'} as being {0, 0, 0, 1} respectively based on the area covered by the component at the boundary. Thus, the original bitmap may be corrected for each pixel and/or each intersection of pixels (e.g., central point C) and the value for the corrected pixels determined. The system may then send the corrected bitmap to pattern generators 102, 104 at the appropriate time.

Figure 1N:
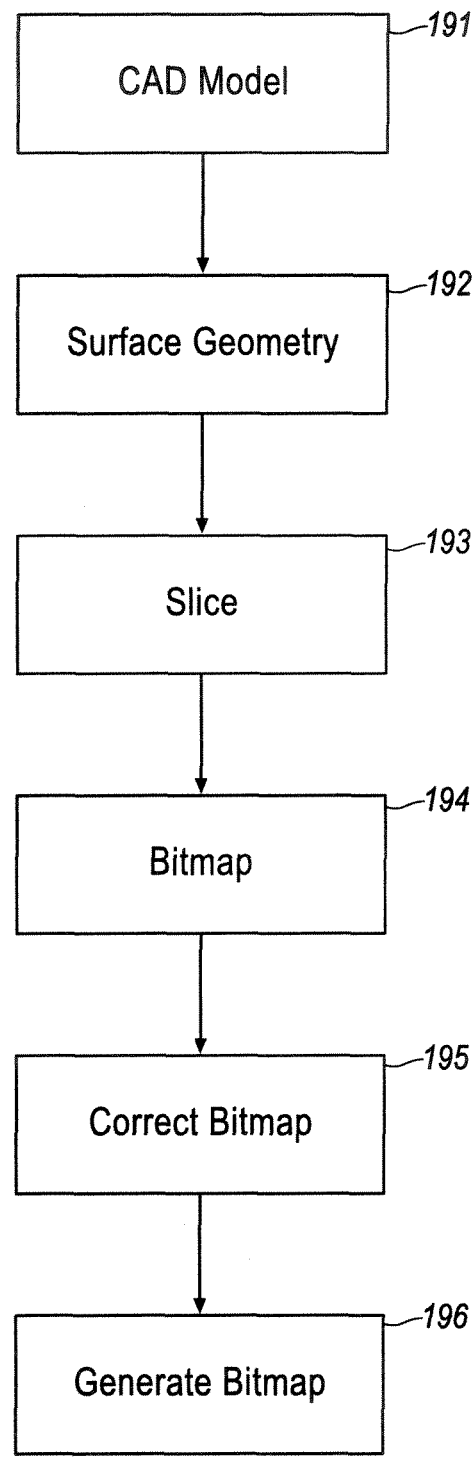
FIG. 1N is an example of a bitmap correction and manufacturing method including processing of raw data defining the component to be manufactured.
Figure 10:
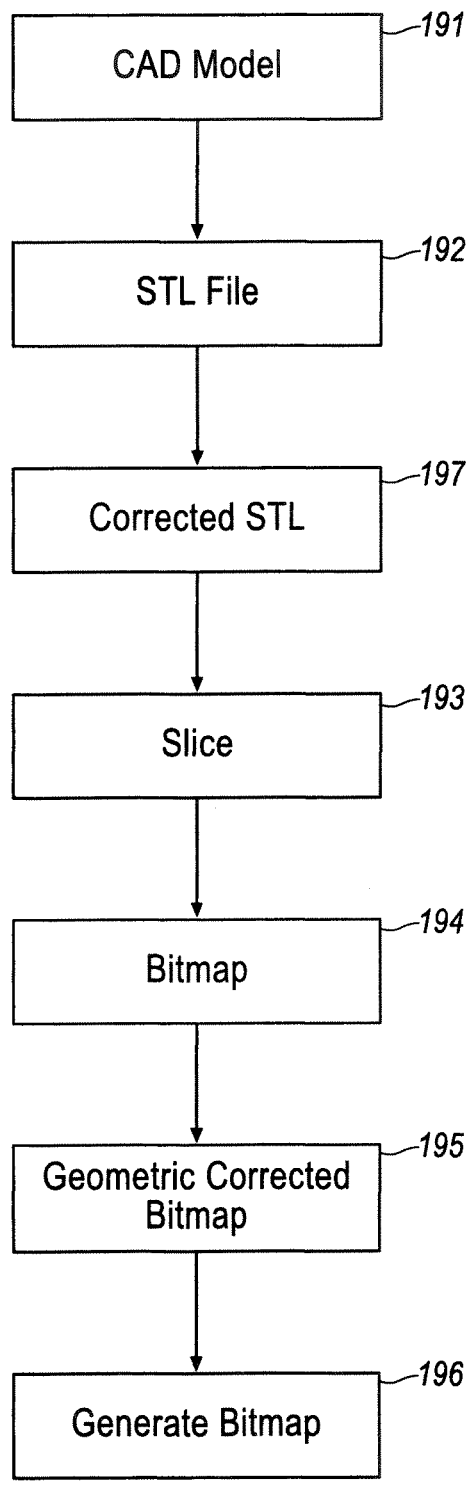
FIG. 10A is an example of a single pattern generator system having a mirror.
FIG. 10B is an exploded view of the single pattern generator system of FIG. 10A.
FIG. 10C is an example of a perforated support plate system for use with the pattern generator systems described herein.

FIG. 1N is an example of a bitmap correction and manufacturing method including processing of raw data defining the component to be manufactured. The method may be performed at controller 120 or on other machines capable of processing the information, or both. Moreover, the timing of each step may be before or during the construction process. For example, the CAD model may be processed into a surface geometry file (e.g., a STL file that approximates the component surface) before any information is sent to the manufacturing machine. Similarly, the correction methods may be applied on or off of the construction mechanism. Moreover, the correction methods may be employed before construction or during construction (e.g., real time, near real time, or periodic update—see FIGS. 1F and 1G).

At step 191, a CAD model or other type of file describing the component to be produced may be defined. The CAD model may be a file (e.g., a DWG, DXF, CATIA, or proprietary format, etc.) that defines the component. The file may store information about the boundaries of the component and may or may not include a definition of the surfaces.

At step 192, the surface geometry of the component may be defined by converting the CAD model into an STL file, or other file, that represents the component surface as an approximation of the CAD model surface. For example with a widely known STL file format, the surface geometry of a three-dimensional object is determined by polygons. Typically the approximation to the CAD model surface may be determined by the size and/or number of polygons used.

At step 193, the surface geometry of the component (e.g., using the STL file) may be sliced into layers to generate slice data representative of the three-dimensional model (or models where multiple three-dimensional models may be fabricated in the same build envelope). The layers may be of a fixed thickness (e.g., when used with the system described below with respect to FIG. 8A) or the thickness may be dynamically determined based on the features of the layer (e.g., such as the boundary angles as described above with respect to FIG. 1J and/or when a voxelized construction process is used).

At step 194, the slices are converted to bitmaps that include "on" and "off" information for each pixel. The bitmaps may be representative of each slice with data for each pixel defining inner and outer contours (boundaries) as well as the interior of the cross section (interior pixels) representative of the three-dimensional model at a specific surface. For example, when the boundaries are determined, the interior pixels may be "filled" with "on" pixels to make up the solid body of the three-dimensional model between the contours. This may be necessary depending upon the three-dimensional model used and surface geometry method used (e.g., STL) because the inner portions may not be defined. In many common surface geometry description files, only the outer boundaries are defined. Thus the inner solid body may need to be filled-in on the bitmap prior to generation. In general, the outer boundary pixels may be determined by the amount of coverage of the surface geometry with the area of the pixel, depending on the location of the slice. For example, where a pixel area threshold is set at 50%, where the surface geometry of the work piece covers 50% or more of a pixel's area, the pixel is turned "on" in the bitmap. Similarly, where the surface geometry of the work piece covers less than 50% of a pixel's area, the pixel is turned "off" in the bitmap.

At step 195, the bitmap is corrected for linear and non-linear distortion, for example based on the correction methods described herein to provide a corrected output to a pattern generator. The position of each pixel may be corrected and the "on"/"off" value for each pixel may be determined to provide an image minimizing any distortions of the construction system.

At step 196, the corrected bitmap is projected using the pattern generator. The corrected bitmap has been adjusted for linear and nonlinear distortion of the pattern generator so that when projected, the ideal pattern is generated on the build surface. Thus, the accuracy, quality, and surface of the component is improved.

FIG. 1O is an example of a bitmap geometric correction and manufacturing method including component geometry modification/correction and creating slice-type data. In general, the steps 191, 192, 193, 194, and 195 are generally as they are described above with respect to FIG. 1N.

At step 197, a geometry modification/correction method may be applied to the STL file (or other file type that approximates the CAD model) prior to slicing in step 193. In general, geometry modification/correction may include determining internal stresses and shrinkage during manufacture that may cause the work piece to curl or distort in an undesired manner. To correct this, the geometry of the work piece may be modified/corrected prior to generation so that the final work piece closely approximates the CAD model. For example, static or dynamic finite element analysis (FEA) or finite element methods (FEM) may be applied to the STL file representation of the work piece (or the original three-dimensional CAD model(s)) to determine where internal stresses and/or shrinkage of the reactive material may cause the work piece(s) to curl or distort. The STL file(s) or three-dimensional CAD model(s) representing the work piece(s) may then be modified to reduce or eliminate internal stresses and/or shrinkage. While the corrected STL file(s) or corrected three-dimensional CAD model(s) file may not approximate the CAD model when viewed directly, the corrected STL file will better approximate the CAD model after construction of the work piece.

Figure 1P:
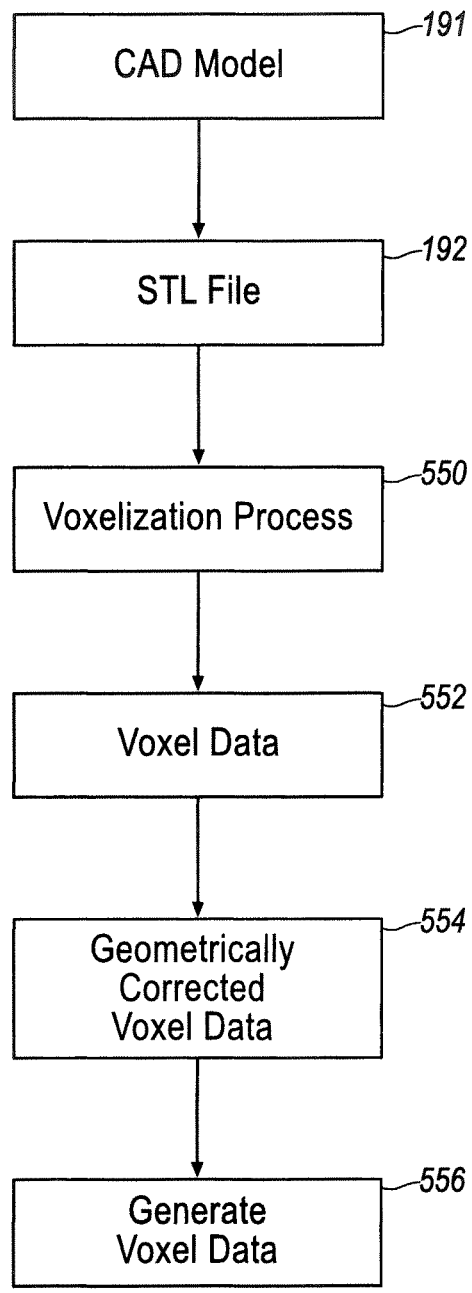
FIG. 1P is an example of a voxelization correction process including geometric correction of voxel data.

FIG. 1P is an example of a voxelization correction process including geometric correction of voxel data. The steps 191 and 192 are generally as they are described above with respect to FIG. 1N.

In step 550, a voxelization process is applied to the STL file data (or other approximation of the CAD model). Voxelization typically includes a four step process which estimates the interference volume of a three-dimensional component for all raster volume elements (voxels) of a rasterized build envelope.

The first step in voxelization includes determining the build envelope as a plurality of voxel data set. Each voxel data set includes a number of cube-shaped or cuboid-shaped volume elements (voxels) to describe the voxel data set. The voxel data set may be considered a set of data where each voxel is a cube-shaped or cuboid-shaped volume that may be individually determined and addressed (e.g., by the pattern generator).

The second step in voxelization is to place the three-dimensional model (in this case an STL file approximation of the CAD model) inside the build envelope raster.

The third step in voxelization is to estimate the interference for every voxel data set and all triangles (e.g., represented in the STL file) which have an interference with the voxel data set. The volume interference may be calculated using a projection approach.

The fourth, and last step, in voxelization is to express the volume interference for each voxel in a range of 0 and 255 (e.g., when 8-bit gray scaling is used) where 0 corresponds to 0% interference, and 255 corresponds to 100% interference.

In step 552, voxel data may be determined by the voxelization process of step 550 and may be stored as grayscale bitmaps. Each voxel data set (e.g., a bitmap including intensity values for each individual pixel relating to depth of cure) represents a voxel data set of the approximated CAD model.

In step 554, the voxel data sets are corrected for geometric distortion of the desired pattern generator(s), as discussed herein, for example with respect to FIGS. 1MA-1MG.

In step 556, the corrected voxel data sets are generated to produce the work piece.

Figure 1Q:
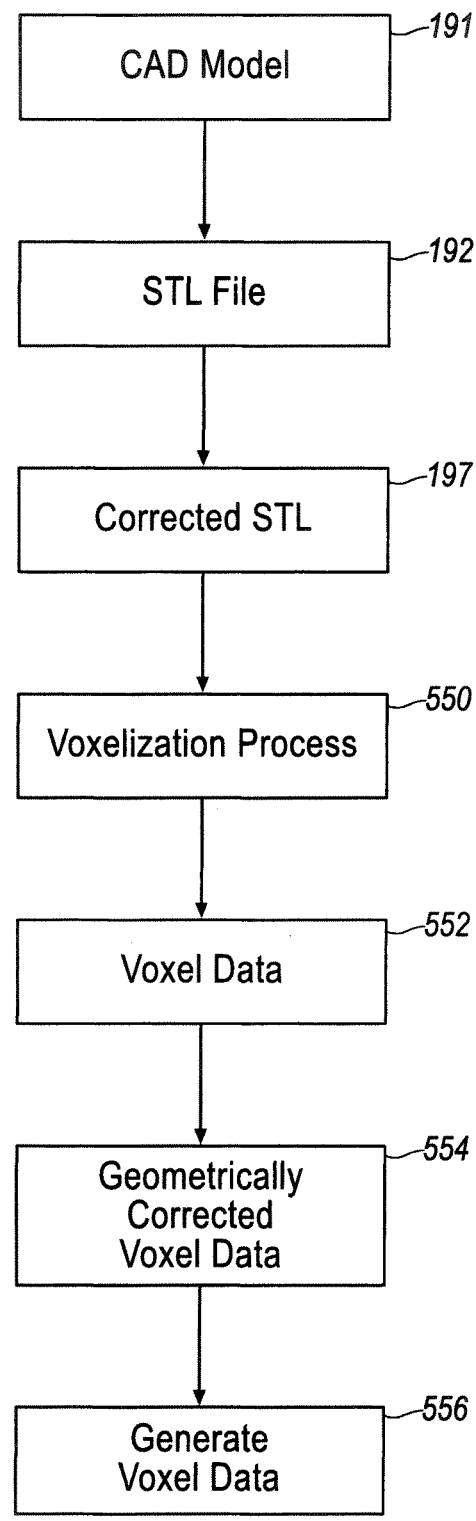
FIG. 1Q is an example of a voxelization correction process including component geometry modification/correction and voxel data geometric correction prior to pattern generation.

FIG. 1Q is an example of a voxelization correction process including component geometry modification/correction and voxel data geometric correction prior to pattern generation. Here, step 197 of correcting the STL file (discussed above with respect to FIG. 1O) is performed before the step 550 (the voxelization process). The remaining steps, 550, 552, 554, 556 are discussed above with respect to FIG. 1P.

Figure 1R:
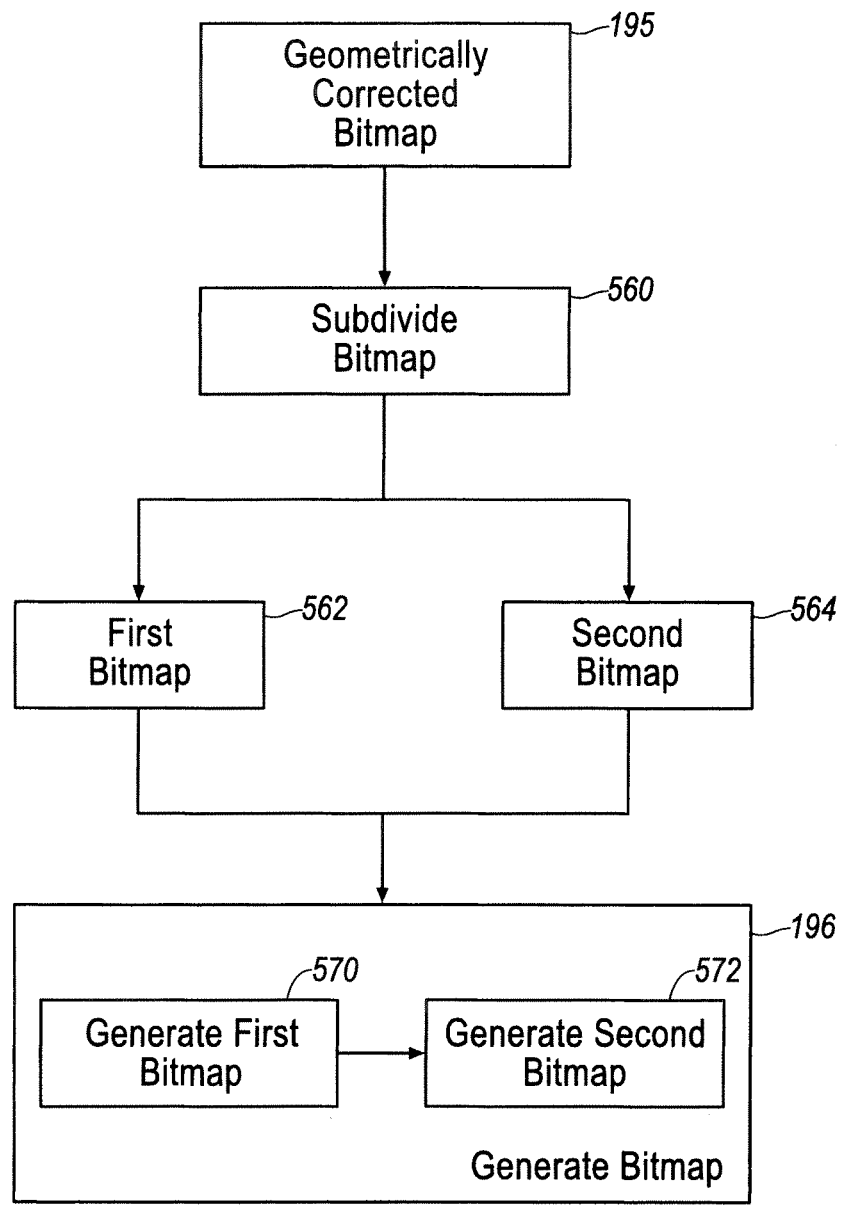
FIG. 1R is an example of subdividing a bitmap for component geometry modification/correction.

FIG. 1R is an example of subdividing a bitmap for component geometry modification/correction. In an example, the bitmap may be received after geometric correction and subdivided into two sub-bitmaps. However, the bitmaps may also be subdivided prior to geometric correction and the sequence may be a design choice. Here, however, the subdivision of the bitmap is shown after geometric correction which may be more efficient than applying geometric correction to each sub-bitmap.

Subdivision of bitmaps may be appropriate in some cases as a method to reduce internal stresses and shrinkage during manufacture. As described below in FIGS. 1TA-1TC, the subdivided bitmaps may be generated at different times to allow for shrinkage prior to fully connecting the portion of the work piece described by the bitmap prior to subdivision.

In step 195, a bitmap may be geometrically corrected as discussed above with respect to FIG. 1N.

In step 560, the geometrically corrected bitmap may be subdivided into a first bitmap 562 and a second bitmap 564. The method for subdividing the bitmap may include, for example, determining the outer border or boundary of the work piece and including this in the first bitmap. Moreover, the first bitmap may include substantial portions of the main body or inner solid body of the work piece, but having unconnected portions that allow for shrinkage.

The second bitmap 564 may include each of the unconnected portions of first bitmap 562 and may also have additional regions beyond the unconnected portions so that the shrunk reactive material determined by first bitmap 562 is connected with. That is to say, second bitmap 564 may have additional regions as being exposed to account for a shrinkage gaps between the ideal bitmaps and the shrunk material.

In step 196, the corrected subdivided bitmaps 562, 564 are projected using the pattern generator. The corrected bitmaps have been adjusted for linear and nonlinear distortion of the pattern generator so that when projected, the ideal pattern is generated on the build surface. Moreover, the subdivided bitmaps allow for construction of work pieces that may otherwise curl or distort due to their shape and shrinkage of reactive material during the construction process.

Figure 1S:
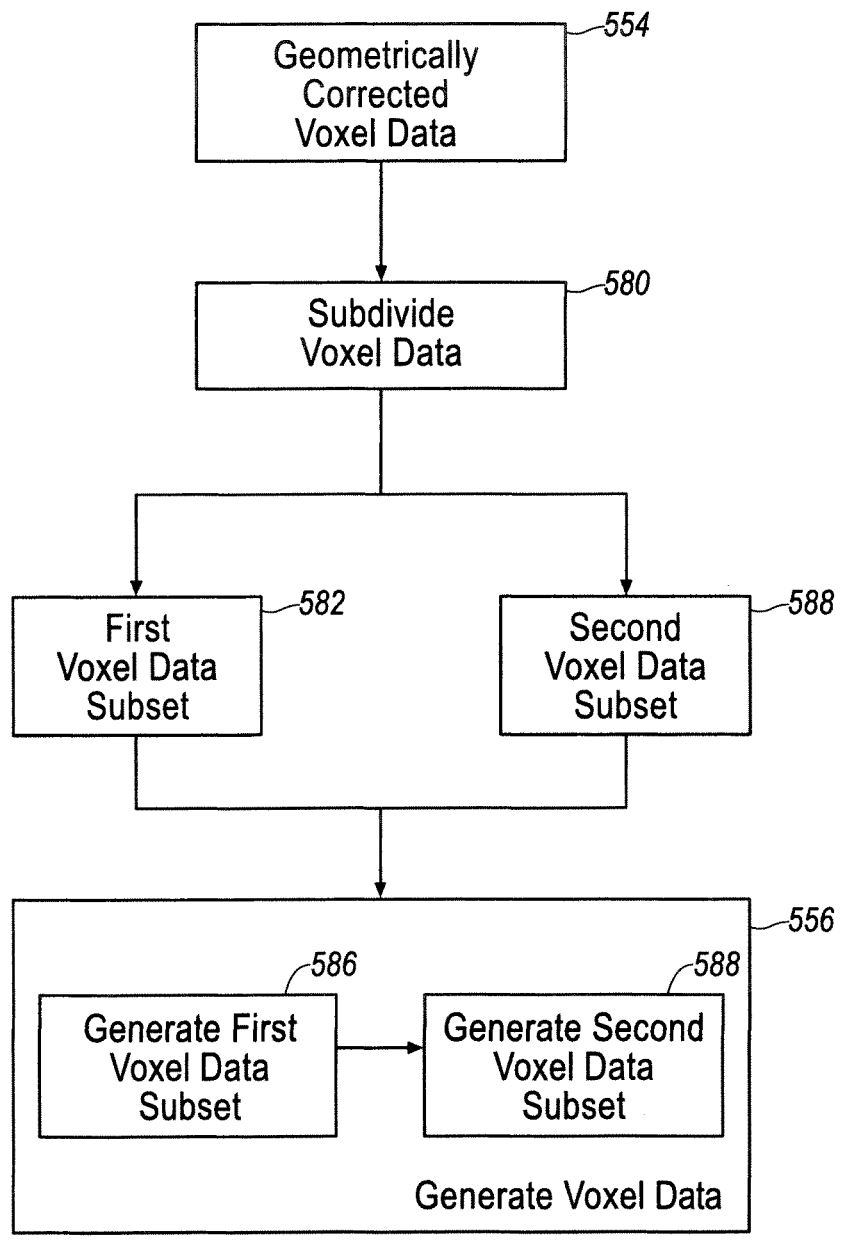
FIG. 1S is an example of subdividing voxel data for component geometry modification/correction.

FIG. 1S is an example of subdividing a voxel data set for component geometry modification/correction. In an example, the voxel data set may be received after geometric correction and subdivided into two sub-voxel data sets. However, the voxel data set may also be subdivided prior to geometric correction and the sequence may be a design choice. Here, however, the subdivision of the voxel data set is shown after geometric correction which may be more efficient than applying geometric correction to each sub-voxel data set.

Subdivision of the voxel data set may be appropriate in some cases as a method to reduce internal stresses and shrinkage during manufacture. As described below in FIGS. 1TA-1TC, the subdivided voxel data sets may be generated at different times to allow for shrinkage prior to fully connecting the portion of the work piece described by the voxel data set prior to subdivision.

In step 554, a voxel data set may be geometrically corrected as discussed above with respect to FIG. 1MA-1MG.

In step 580, the geometrically corrected voxel data set may be subdivided into a first voxel data subset 582 and a second voxel data subset 584. The method for subdividing the voxel data set may include, for example, determining the outer border or boundary of the work piece and including this in first voxel data subset 582. Moreover, first voxel data subset 582 may include substantial portions of the main body or inner solid body of the work piece, but having unconnected portions that allow for shrinkage.

Second voxel data subset 584 may include each of the unconnected portions of first voxel data subset 582 and may also have additional regions beyond the unconnected portions so that the shrunk reactive material determined by first voxel data subset 582 is connected with. E.g., second voxel data subset 584 may have additional regions as being exposed to account for a shrinkage gaps between the ideal bitmaps and the shrunk material.

In step 556, the corrected subdivided voxel data sets 582, 584 are projected using the pattern generator. The corrected voxel data sets have been adjusted for linear and nonlinear distortion of the pattern generator so that when projected, the ideal pattern is generated on the build surface. Moreover, the subdivided voxel data sets allow for construction of work pieces that may otherwise curl or distort due to their shape and shrinkage of reactive material during the construction process.

Figure 1T:
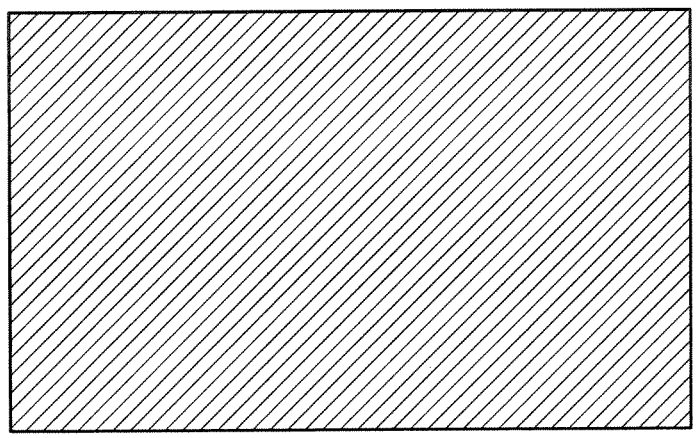
FIG. 1TA is an example of a component prior to geometry modification/correction.
Figure 1T:
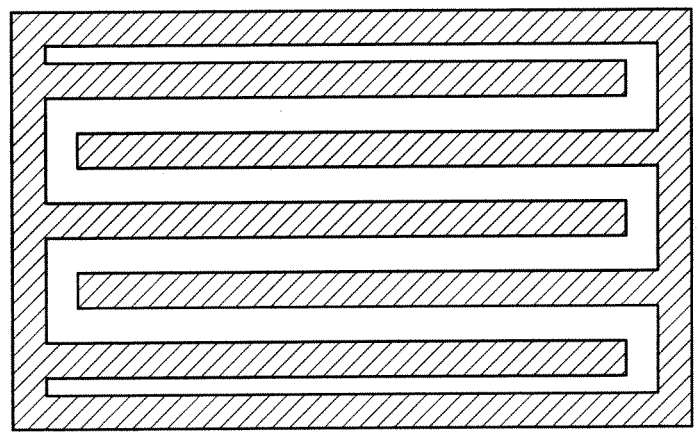
Figure 1T:
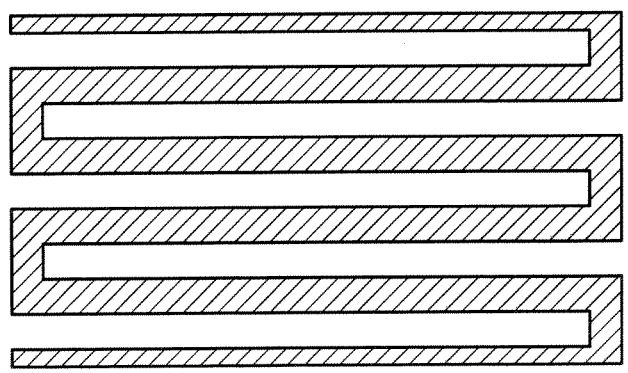

FIG. 1TA is an example of a top view of a bitmap or voxel data set prior to subdivision of the bitmap (discussed above with respect to FIG. 1R) or voxel data set (discussed above with respect to FIG. 1S). The FIG. 1TA-1TC are not intended to analogize bitmaps (typically having a predetermined thickness and binary "on" or "off" values per pixel) and voxel data sets (typically having variable depth of cure based on intensity values), rather the figures provide a broad understanding of how a bitmap or voxel data set, when viewed as a top surface (e.g., for clarity here ignoring the per-voxel depth aspect) may be subdivided.

The main body of the bitmap or voxel data set may be a rectangle, as shown here, if seen in cross-section. Note that the cross-section seen here is not representative of all build processes discussed herein. For example, the voxelized or continuous build processes have various depths associated with each voxel. If the bitmap or voxel data set shown in FIG. 1TA were produced at a single moment in time, the reactive material may shrink, causing the outer boundaries of the bitmap or voxel data set to be smaller than the desired model represented by the bitmap or voxel data set. Thus, subdividing construction of the bitmap or voxel data set may be used to minimize shrinkage.

FIG. 1TB is an example of a first subdivided pattern of the example component of FIG. 1TA. The pattern may include the outer boundary of the bitmap or voxel data set, and a substantial portion of the main body (e.g., the inner solid mass of the bitmap or voxel data set). However, the main body is not fully connected. As shown, the main body of the first subdivided pattern may include fingers, or large portions of the inner body that are allowed to shrink after exposure to electromagnetic radiation. The shrinkage may include a time from, for example, one to five seconds, during and/or after exposure to electromagnetic radiation to allow for solidification or partial solidification, and the resulting shrinkage, if any.

FIG. 1TC is an example of a second subdivided pattern of the example component of FIG. 1TA. The second subdivided pattern may be used to expose the reactive material in the unexposed region of the main body to complete the bitmap or voxel data set. Because the first subdivided pattern has pre-shrunk, the second subdivided pattern fully connects the main body of the bitmap or voxel data set to form a solid and structurally sound bitmap or voxel data set, but with reduced deformation due to shrinkage or the reactive material.

Figure 2A:
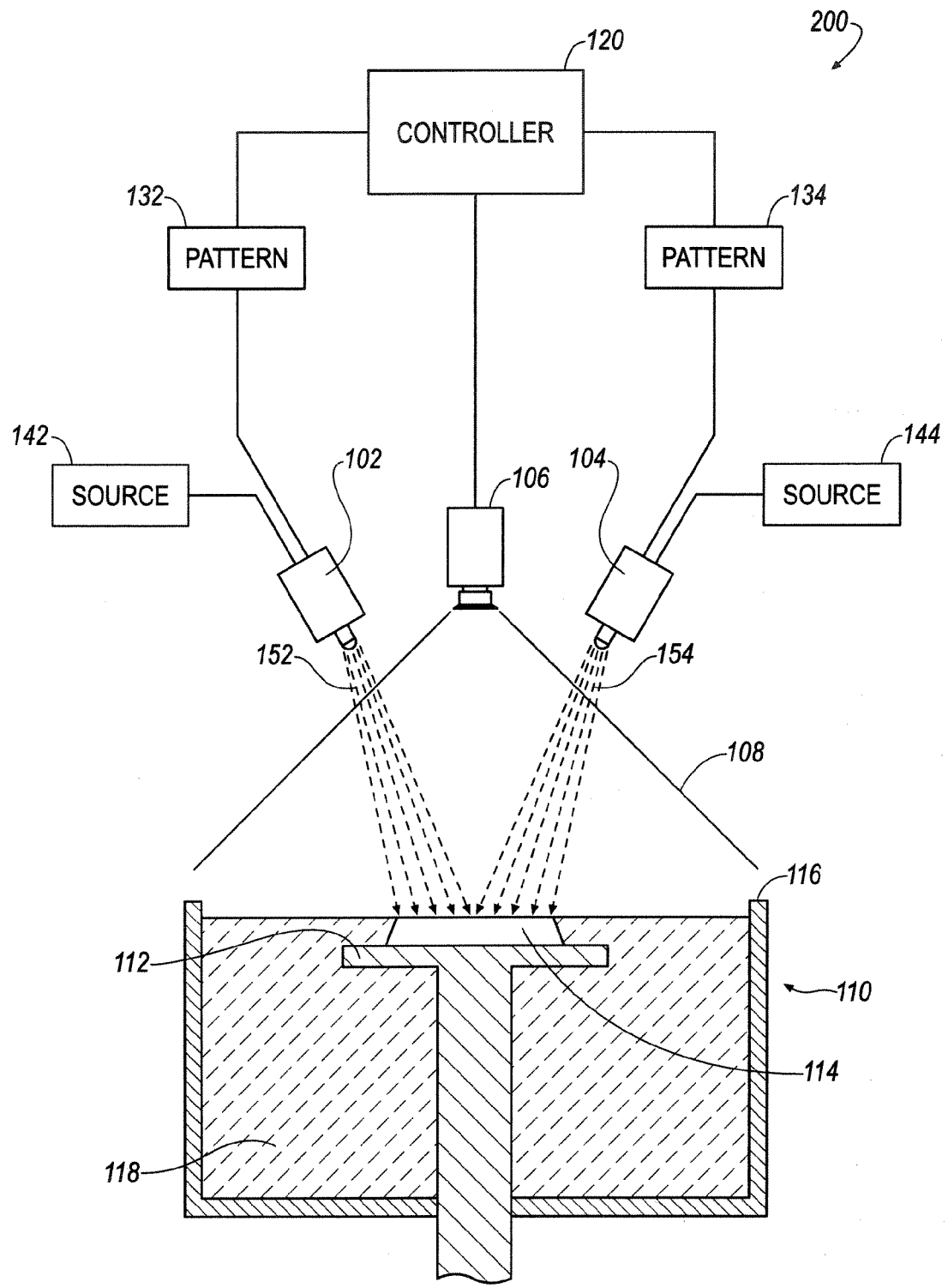
FIGS. 2A-2C are examples of a work piece being constructed at various stages.
Figure 2B:
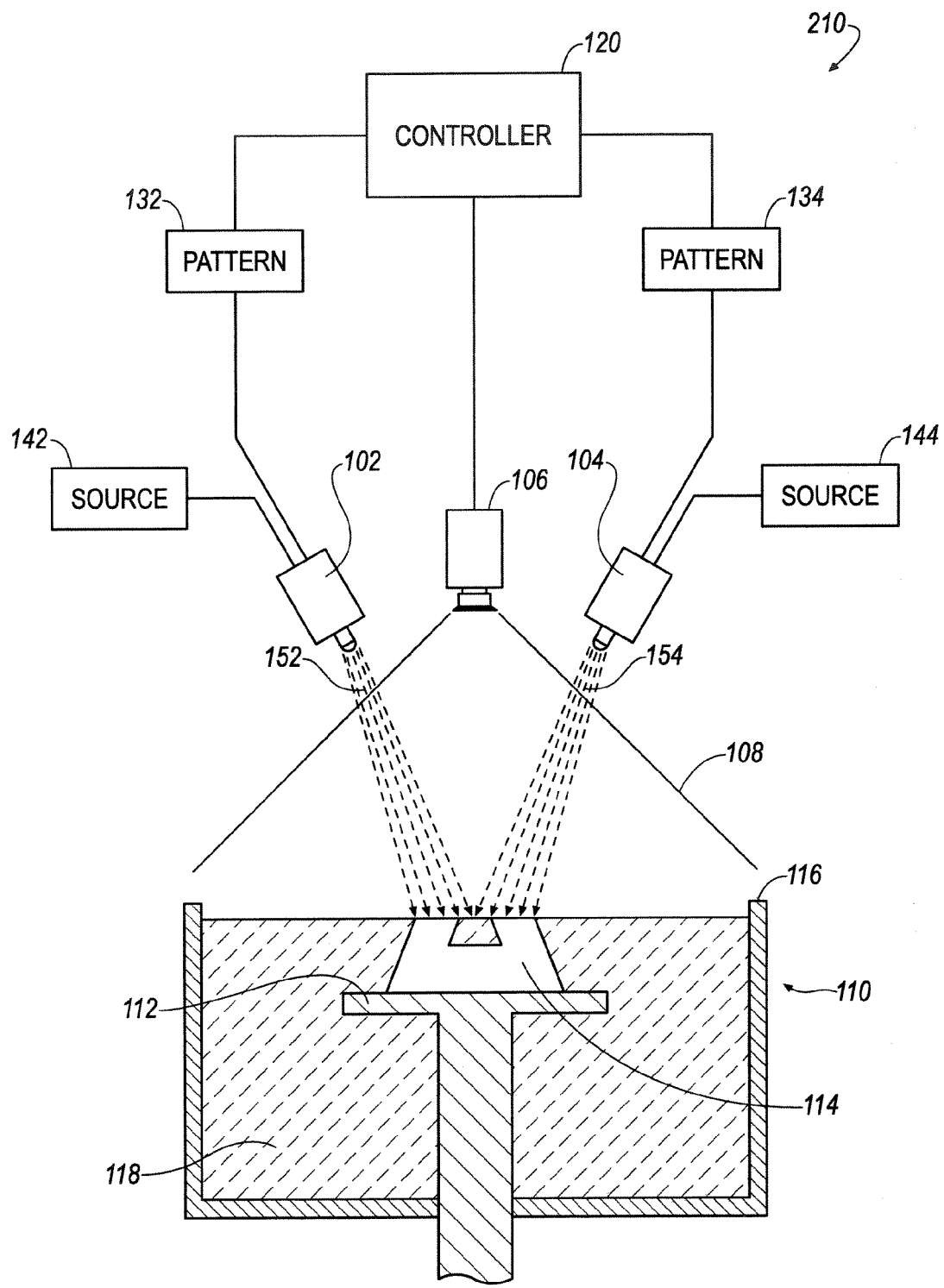
Figure 2C:
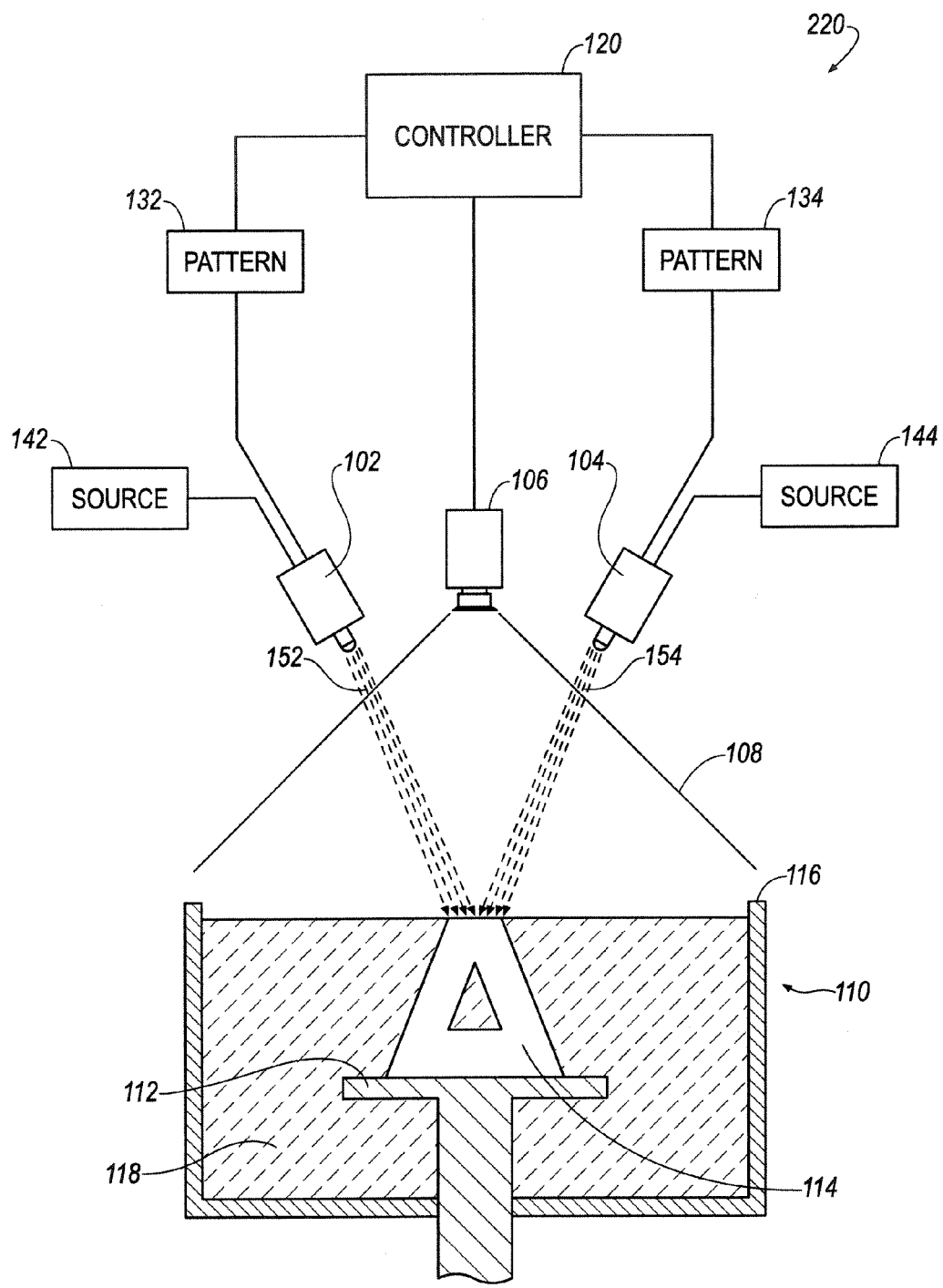

FIGS. 2A-2C are examples of a work piece 114 being constructed. In FIG. 2A a first portion of work piece is created by patterns 132, 134 and pattern generators 102, 104. In FIG. 2B a second portion further completes work piece 114. In FIG. 2C a third portion further completes work piece 114. Although shown in portions, the construction of work piece 114 may be a continuous process where movable support plate 112 is lowered within reactive material 118 and multiple patterns 132, 134 are used to construct a continuous object that becomes work piece 114.

Figure 3:
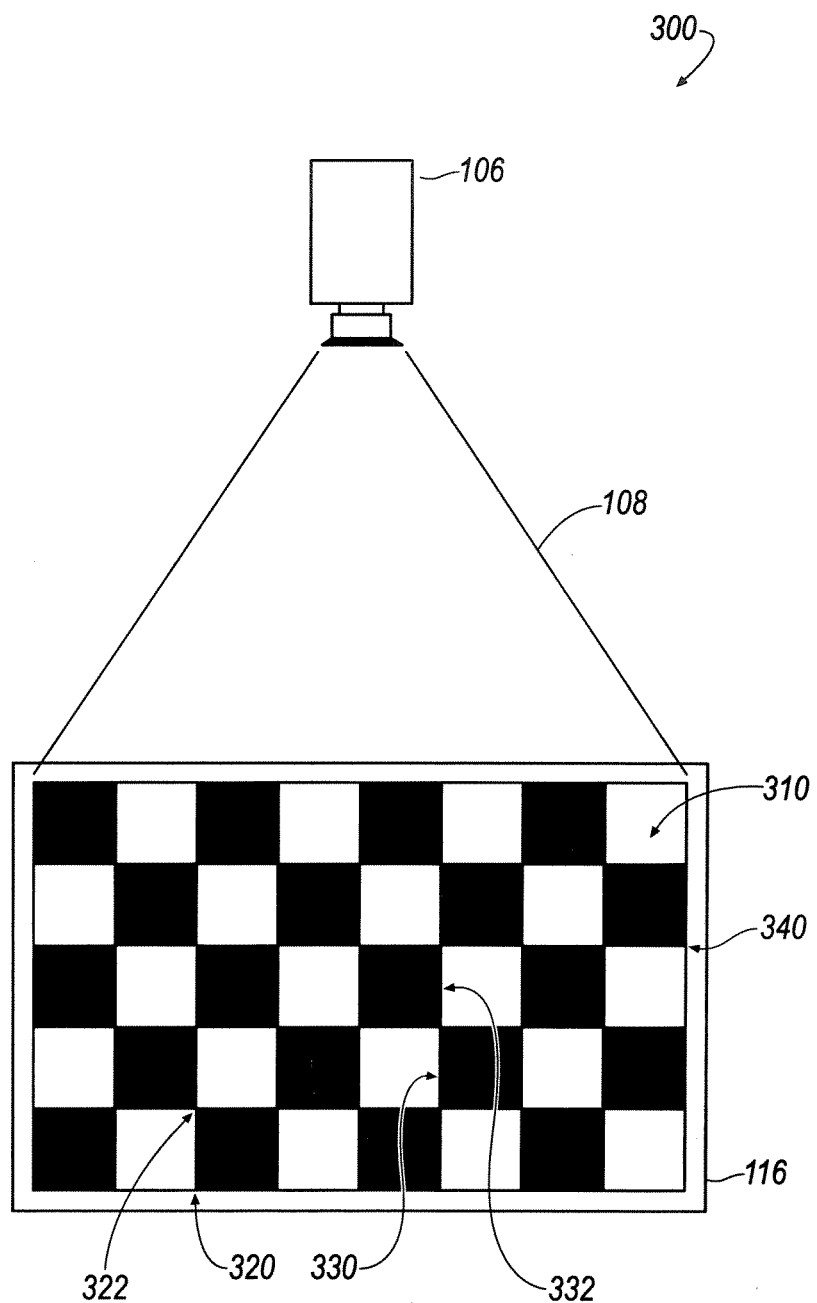
FIG. 3 is an example of an imager calibration/correction setup.

FIG. 3 is an example of an imager calibration/correction setup 300. A calibration template 310 is placed within imager region 108 to be viewed by imager 106. The distance from imager 106 may be fixed at the focal length of imager 106 (e.g., where imager 106 is optically-based technology, the focal length may be accounted for) and the focal lengths of pattern generators 102, 104 (shown in FIG. 1A; where pattern generators 102, 104 use optically-based technology). An imager view 108 shows the optical path between imager 106 and imager region 116. A fixed focal length imager region 116 may be considered the outer perimeter of sensitivity for imager 106, and as shown calibration template 310 lies within imager region 116 so that the entirety of calibration template 310 may be detected. Calibration template 310 may be configured as squares (such as in a checkerboard pattern) or it may configured as a grid, dots, fiducials, or a combination of these or other patterns.

An outer perimeter 340 of calibration template 310 may serve as the outer extent of pattern generators 102, 104 to maintain accuracy. As discussed herein, where pattern generators 102, 104 utilize a region within outer perimeter 340, the entirety of their patterns may be compensated for. If pattern generators 102, 104 utilize any region beyond outer perimeter 340, other methods of compensation may be used (e.g., extrapolation). However, the accuracy may not be positively verified beyond outer perimeter 340.

FIG. 4A shows calibration/correction of pattern generator 104. Pattern generator 104 outputs a pattern generator calibration pattern 414 that may be within outer perimeter 340, and within imager region 116. As discussed above, where outer perimeter 340 is smaller than calibration pattern 414, inaccuracy may result because not all points of calibration pattern 414 may be mapped for calibration/correction. However, to an extent, if a portion of calibration pattern 414 were beyond outer perimeter 340, extrapolation or other methods may be used to calibrate/correction the image.

Figure 4B:
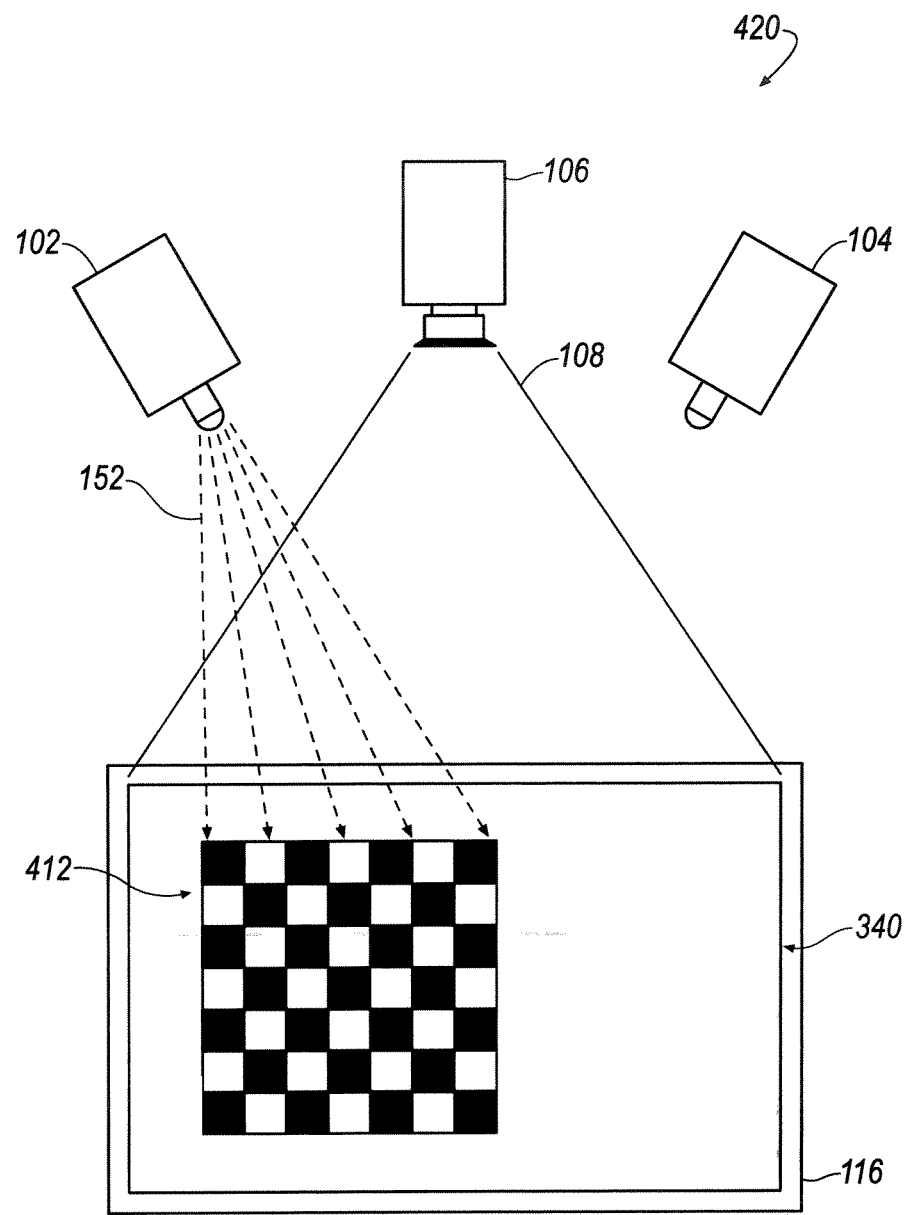
FIG. 4B shows calibration/correction of an alternative pattern generator.

FIG. 4B shows calibration/correction of pattern generator 102. Pattern generator 102 outputs a pattern generator calibration pattern 412 that may be within outer perimeter 340, and within imager region 116. As discussed above, where outer perimeter 340 is smaller than calibration pattern 412, inaccuracy may result because not all points of calibration pattern 412 can be mapped for calibration/correction. However, to an extent, if a portion of calibration pattern 412 were beyond outer perimeter 340, extrapolation or other methods may be used to calibrate/correct the image.

Figure 4C:
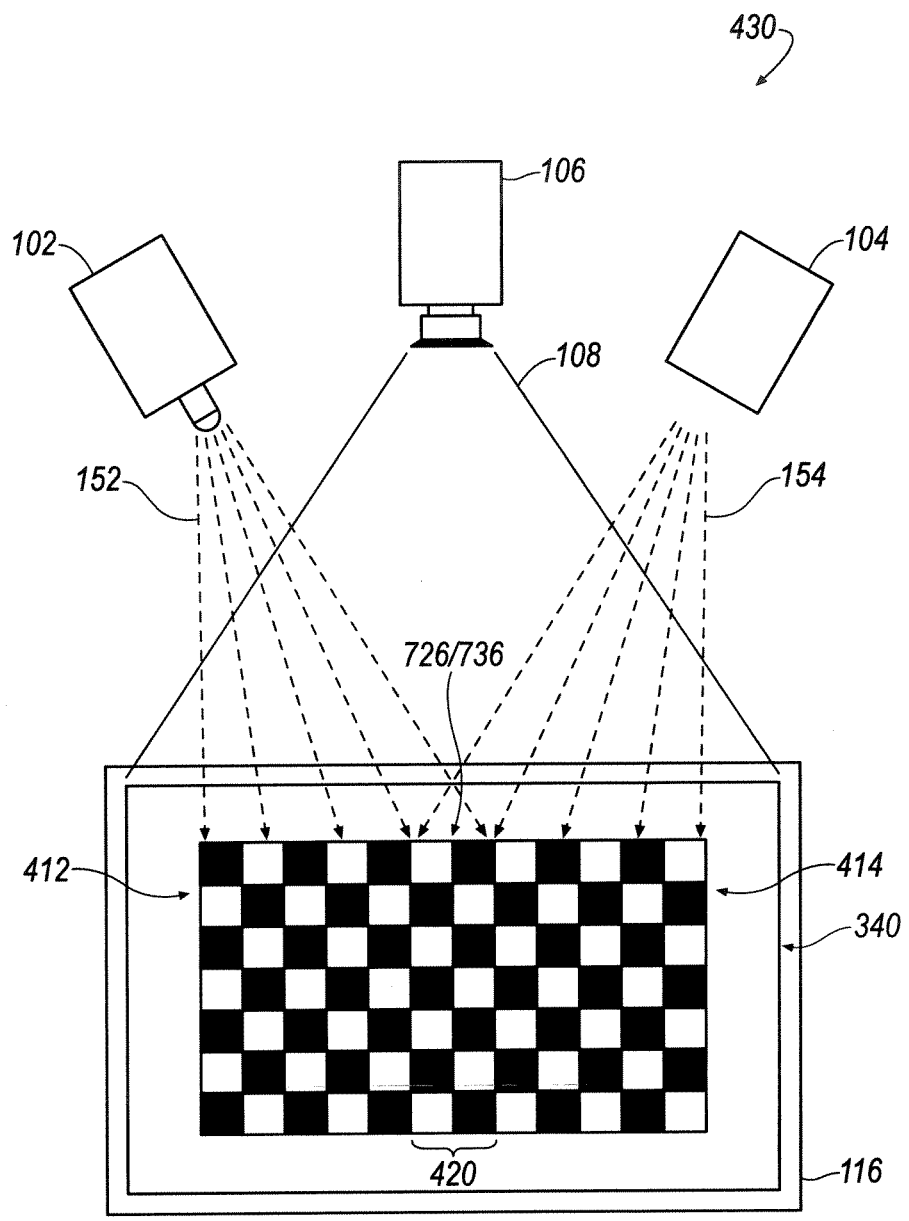
FIG. 4C shows two pattern generators providing their calibration/correction patterns at the same time.

FIG. 4C shows both pattern generators 102, 104 providing their calibration patterns 412, 414 at the same time. While the methods described above primarily contemplate that each pattern generator 102, 104 is calibrated separately, they could be calibrated at the same time where distinctive patterns or different wavelengths of electromagnetic radiation may allow for detection of each of their calibration patterns 412, 414 by imager 106 at the same time.

As an example, where pattern generator 102 projects in red and pattern generator 104 projects in green (assuming both red and green are not wavelengths that cause reactive material 118 to harden), then imager 106 may be able to receive and separate the color regions so that controller 120 may separately calibrate each pattern generator 102, 104 but their calibration patterns 612, 614 are projected at the same time. By calibrating multiple pattern generators simultaneously, the time for calibration is reduced, and the speed of the system is increased. A thin line of shared pixels (e.g., see 726/736 of FIG. 7A below) may be an overlapping region provided by pattern generators 102, 104. A potential overlap region 420 shows where image generators 102, 104 have the capability to image the region depending upon the calibration setup. Potential overlap region 420 is discussed below in detail with respect to FIG. 7A as overlap portions 724, 734, 728, 738.

Figure 5A:
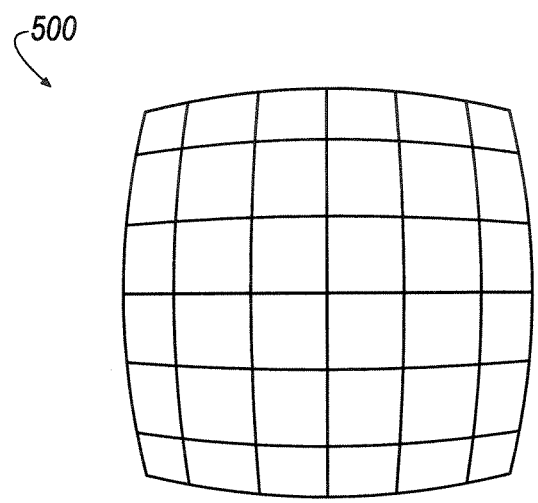
FIG. 5A shows an example of a barrel distortion of a pattern generator.
Figure 5B:
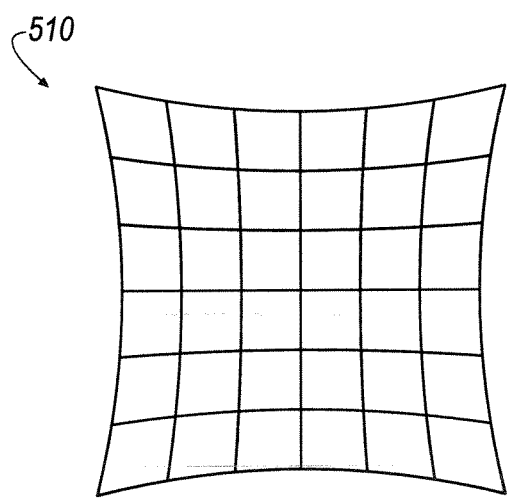
FIG. 5B shows an example of a pincushion distortion of a pattern generator.
Figure 5C:
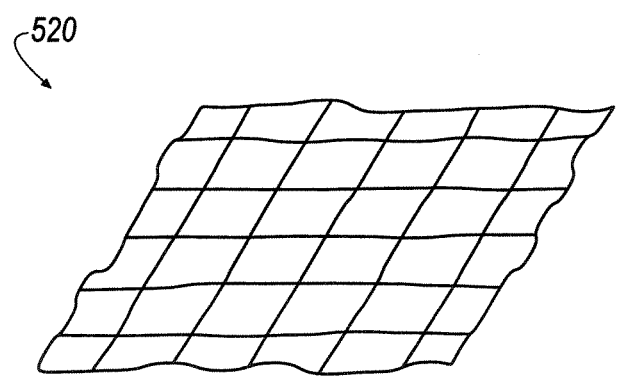
FIG. 5C shows an emphasized example of a nonlinear and skewed distortion of a pattern generator.

FIG. 5A shows an example of a barrel distortion commonly associated with optical systems that may occur with imager 106 and/or pattern generators 102, 104. The above methods may be used to correct for such distortion. FIG. 5B shows an example of a pincushion distortion commonly associated with optical systems that may occur with imager 106 and/or pattern generators 102, 104. Pincushion distortion may also be called, for example "pillow" distortion. The above methods may be used to correct for such distortion. FIG. 5C shows an emphasized example of a nonlinear and skewed distortion commonly associated with optical systems that may occur with imager 106 and/or pattern generators 102, 104. The above methods may be used to correct and/or reduce the influence of such geometric distortions.

Figure 6:
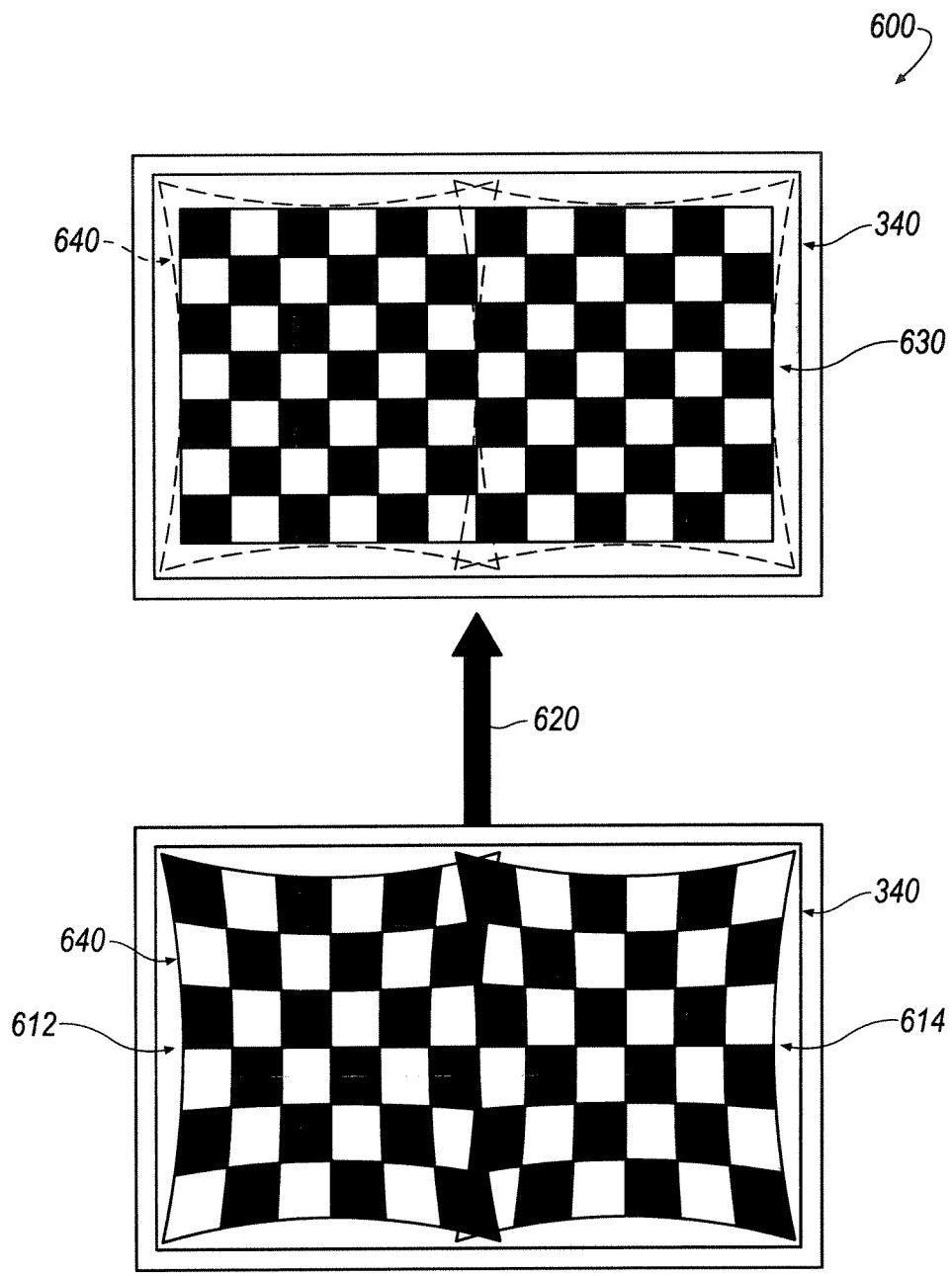
FIG. 6 shows two calibration/correction patterns being compensated.

FIG. 6 shows calibration patterns 612, 614 being generated (e.g., from pattern generators 102, 104) as uncompensated patterns. Using the methods described above for pattern correction 620 (e.g., see method 1300 above in FIG. 1D), for each calibration pattern 612, 614, an adjusted combined image 630 is provided that removes distortion from the system.

In general, pattern generator calibration patterns 612, 614 are located within the extents of outer perimeter 340 (the calibrated region associated with imager 106). Although both calibration patterns 612, 614 are shown here to demonstrate exaggerated pincushion distortion, their imaging regions are overlapping along their common border, and allow for the calibration/correction methods described herein to adjust their patterns accordingly. The outer boundary of each calibration patterns 612, 614 are located within outer perimeter 340 and thus, can be viewed by imager 106. Imager 106, having been calibrated separately (e.g., by imager calibration method 1100; see FIG. 1B) provides precise and compensated information to controller 120 regarding the patterns generated. In order to transform the pincushioned output of pattern generators 102, 104 to a more usable output, pattern correction methods 620 (e.g., see above FIGS. 1C-1G) are used to compensate the patterns 132, 134 prior to generation by pattern generators 102, 104.

The outer extents 640 of calibration patterns 612, 614 may not be physically modified to correct for the distortion (here primarily shown as pincushion distortion). However, the pattern itself may be modified/corrected so that the patterns generated are usable even with distortion in the pattern generator 102, 104 system. A corrected partial image 630 lies within outer extents 640 and shows how a regular (undistorted) pattern may be generated using correction methods 620, even though the pattern generators 102, 104 include distortion features.

Figure 7A:
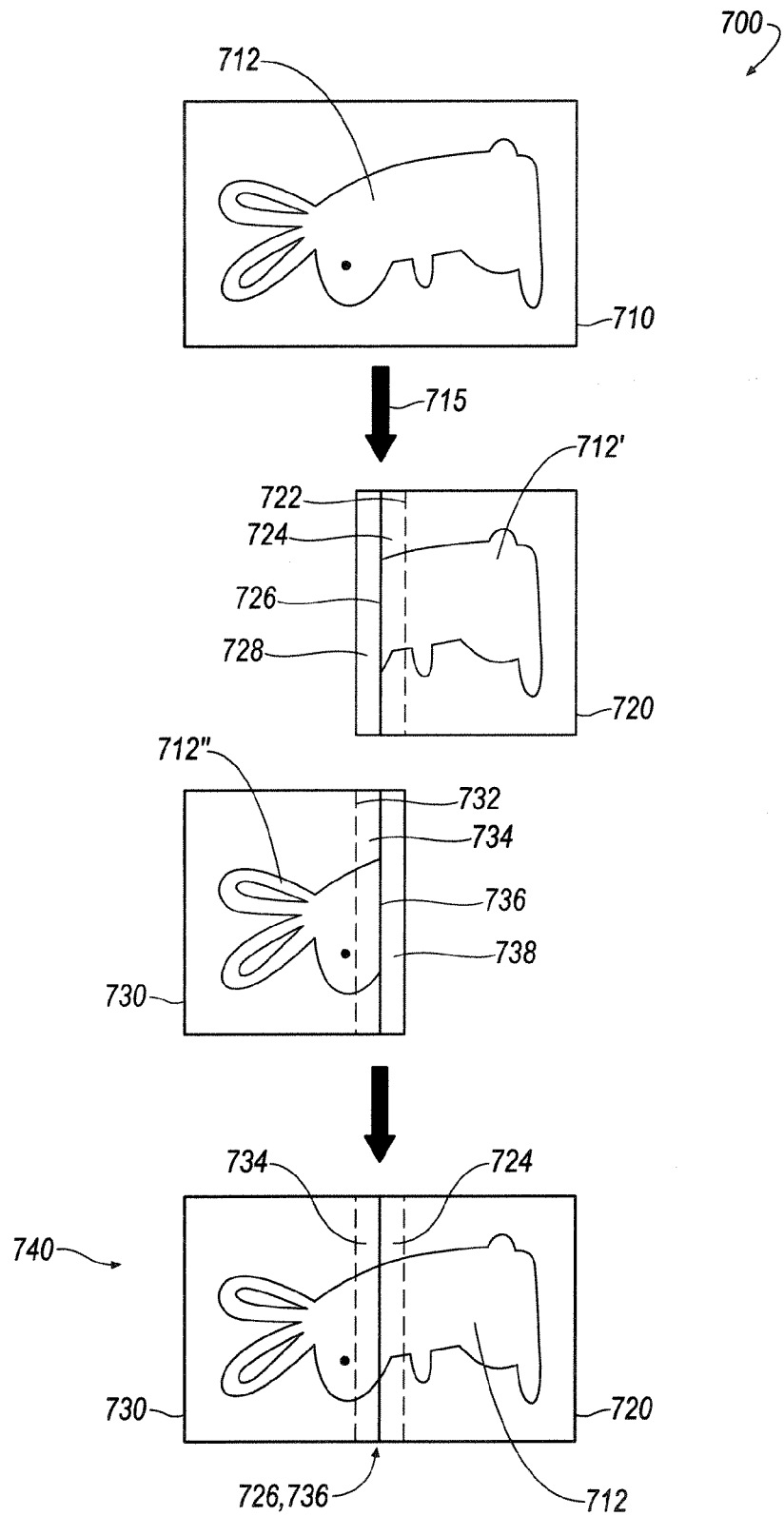
FIG. 7A is a process for separating an image for use with multiple pattern generators.

FIG. 7A is a process for dividing an image for use with multiple pattern generators 102, 104 and the image manipulation to combine the generated images to form an arbitrary work piece (such as work piece 114 in FIG. 1A). A full image 710 may be represented as a bitmap having an image pattern 712 contained therein. Image pattern 712 may be represented by a single "bit", grayscale, or color. In general, image pattern 712 may represent a portion of the three-dimensional object that the machine 100 is intending to form. In providing correction of geometric distortion, and by aligning multiple pattern generators 102, 104 with corrected pattern outputs, components may be formed without defects along boundary regions of each pattern generators 102, 104.

For multiple pattern generator systems (102, 104; see FIG. 1A), image pattern 712 may be broken into two image portions; image pattern 712' (i.e., a first sub-image), image pattern 712" (i.e., a second sub-image), each being provided separately to pattern generators (102, 104). The division of image pattern 712 provides that there are overlap portions 728, 738 between the two patterns to provide for adjustment of the images using the methods described herein to remove distortion. Of note is that typically the entirety of overlap portions 728, 738 are not generated by pattern generators 102, 104. The overlap pixel regions 726, 736 (e.g., a commonly overlapping region of pixels) are used to provide a seamless region between the two patterns. However, overlap pixel regions 726, 736 may be adjusted from one pixel to any number of pixels to generate any width of overlap portions 728, 738. Due to the potential for over-exposure of reactive material 118, a reduced number of pixels for overlap pixel region 726, 736 account for the sensitivity of reactive material 118. Alternatively, the intensity of the pixels from pattern generators 102, 104 that account for overlap pixel region 726, 736 may be reduced in intensity (e.g., 50% from each pattern generator 102, 104) to reduce over-exposure of reactive material 118 at overlap portions 728, 738.

Used overlap regions 724, 734 may be generated by either pattern generator 102, 104, since they cover the same area. However, they are typically only generated by only one of pattern generator 102, 104 to avoid wide scale over exposure. If desired, both pattern generators 102, 104 could generate overlap regions 724, 734 and to avoid over exposure, could each reduce the intensity of output so that the combined intensity is standard. As shown here, overlap region 724 is generated by pattern generator 104 and overlap region 734 is generated by pattern generator 102. Unused overlap portions 728, 738 are available for pattern generation if, for example, correction mapping is changed during manufacture. Thus, overlap portions 728, 738 may be considered as providing adjustability to the system.

Overlap pixel region 726, 736 (shown here as a line of pixels) is shown as the actual row of pixels that overlap between image patterns 712', 712". In general, overlap pixel region 736 may be a single pixel wide overlap between image pattern 712' and image pattern 712", or overlap pixel region 736 may be multiple pixels wide for a guaranteed overlap. Potential overlap regions 728, 738 allow for on-the-fly adjustments to image patterns 712', 712" during use that may be desirable to adjust for heat and other changes to the system that may introduce distortion. If either of pattern generators 102, 104 change alignment during use, the areas of potential overlap regions 728, 738 may be used to further adjust the projected image to maintain alignment. Thus, overlap pixel regions 726, 736 may be moved within potential overlap regions 728, 723 and 724, 734 during operation.

It is also possible to use multiple scan lines (e.g., vertical pixel lines as shown here by overlap pixel regions 726, 736. However, depending on the type of reactive material 118, over-exposure may be reduced by minimizing the overlap.

Figure 7B:
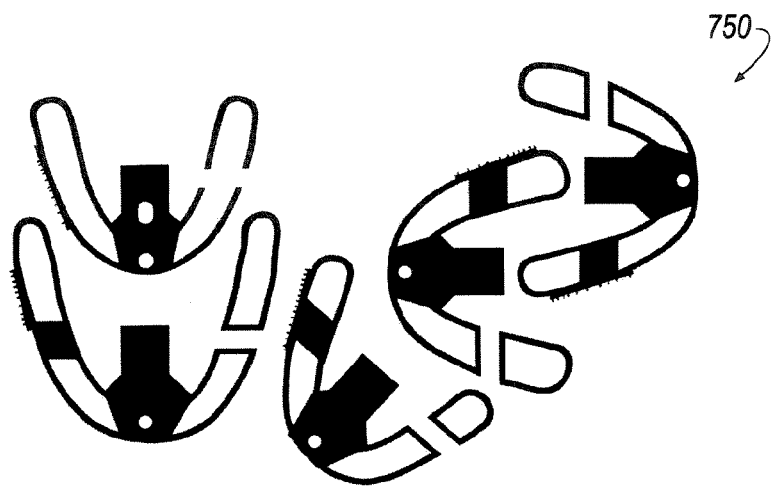
FIG. 7B is an example of a multi-component image prior to separation and alignment for use with multiple pattern generators.

FIG. 7B is an example of a multi-component image 750 prior to separation and alignment for use with multiple pattern generators. The number of components (in this case a number of individual mouth guards) may be produced at a single production run.

Figure 7C:
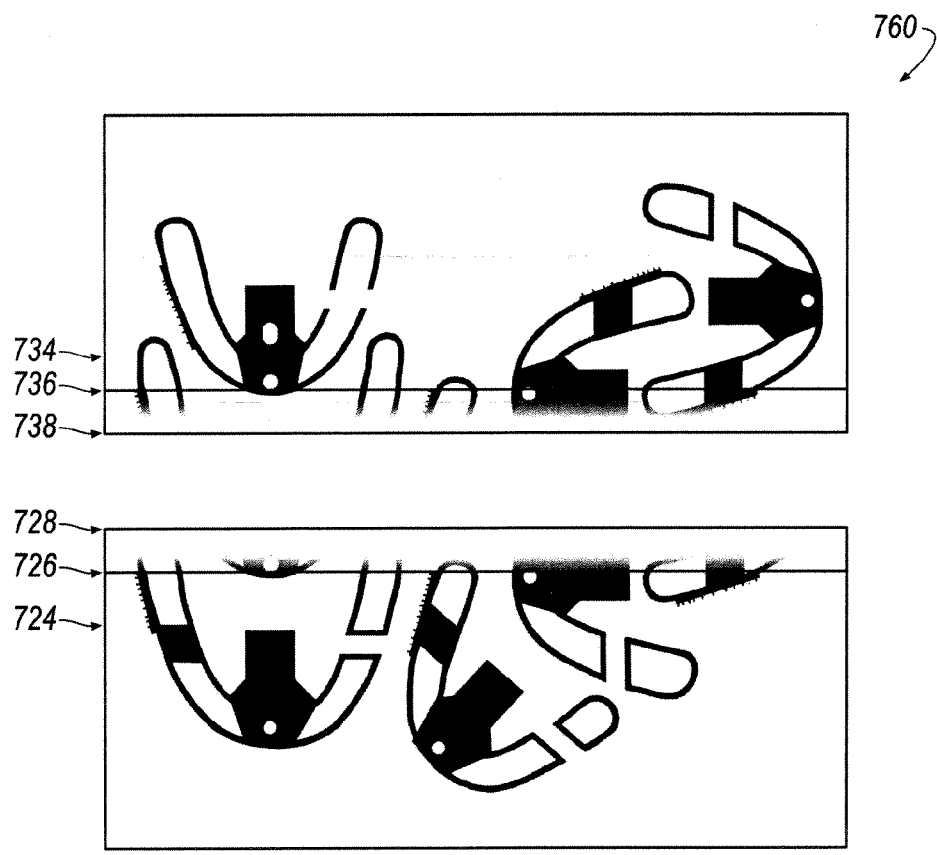
FIG. 7C is an example of a multi-component image after separation and alignment for use with multiple pattern generators.

FIG. 7C is an example of a multi-component image 760 after separation and alignment for use with multiple pattern generators. The image is separated into two parts, each part having portions of each component (e.g., mouth guards) crossing the boundary between the separated images. Here, for example, portions of the separated images are at a full intensity within region 724, 734 up to overlap pixel regions 726, 736 and fade to no intensity toward overlap portions 728, 738. The fading effect (e.g., shown here between 736 and 738; and 726 and 728) use a linear interpolation algorithm to reduce intensity such that when overlapped, the combined intensity is the same as the original image 750.

Figure 7D:
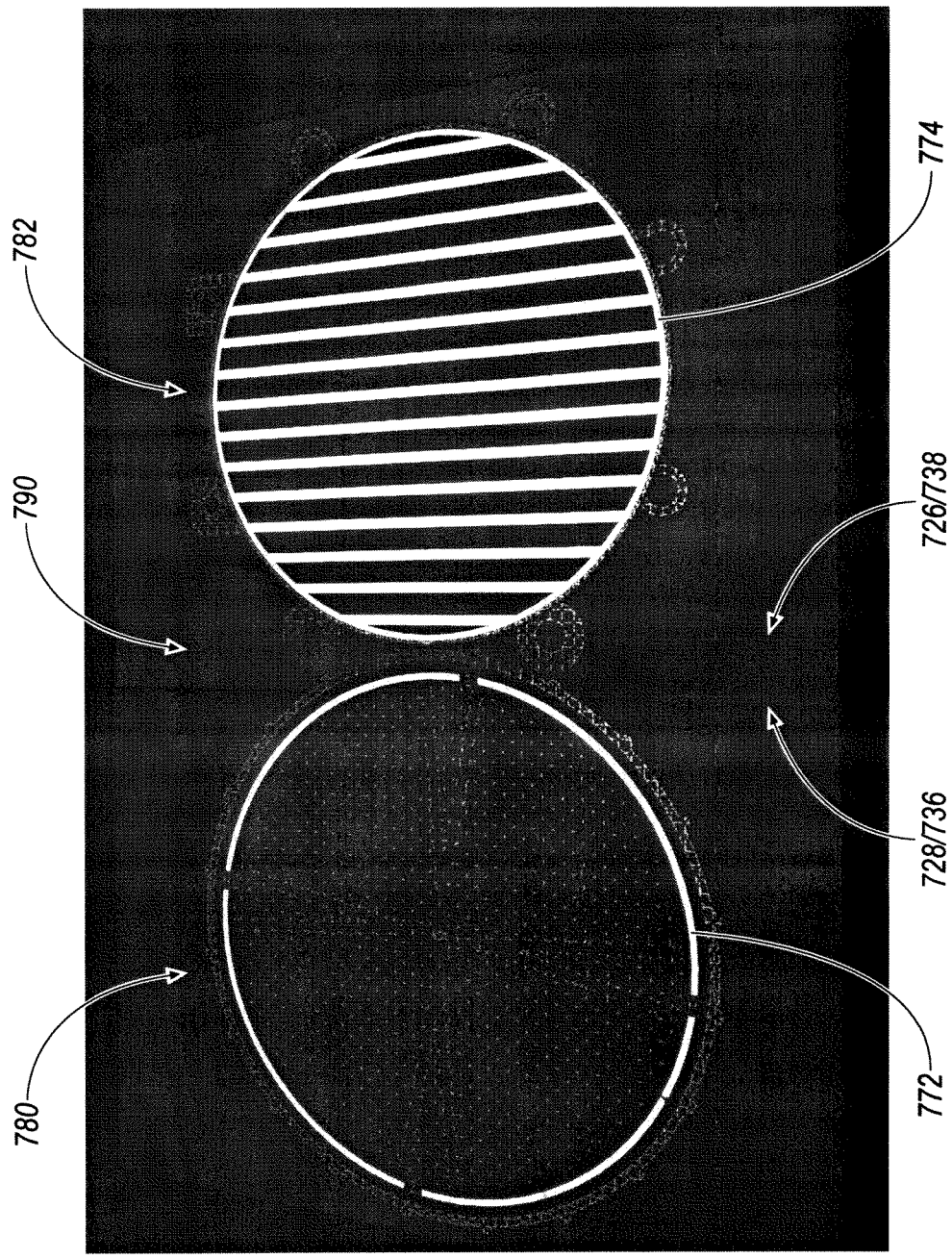
FIG. 7D is an example of a two components being produced using a dual pattern generator system.

FIG. 7D is an example of a two components being produced on a build surface using a dual pattern generator system. A first component 772 is being produced in the field 780 of a first pattern generator but also in part is being produced in an overlapping region 790 (i.e., between 728/736 and 726/728). A second component 774 is being produced in the field 782 of a second pattern generator but also in part is being produced in overlapping region 790.

Figure 8A:
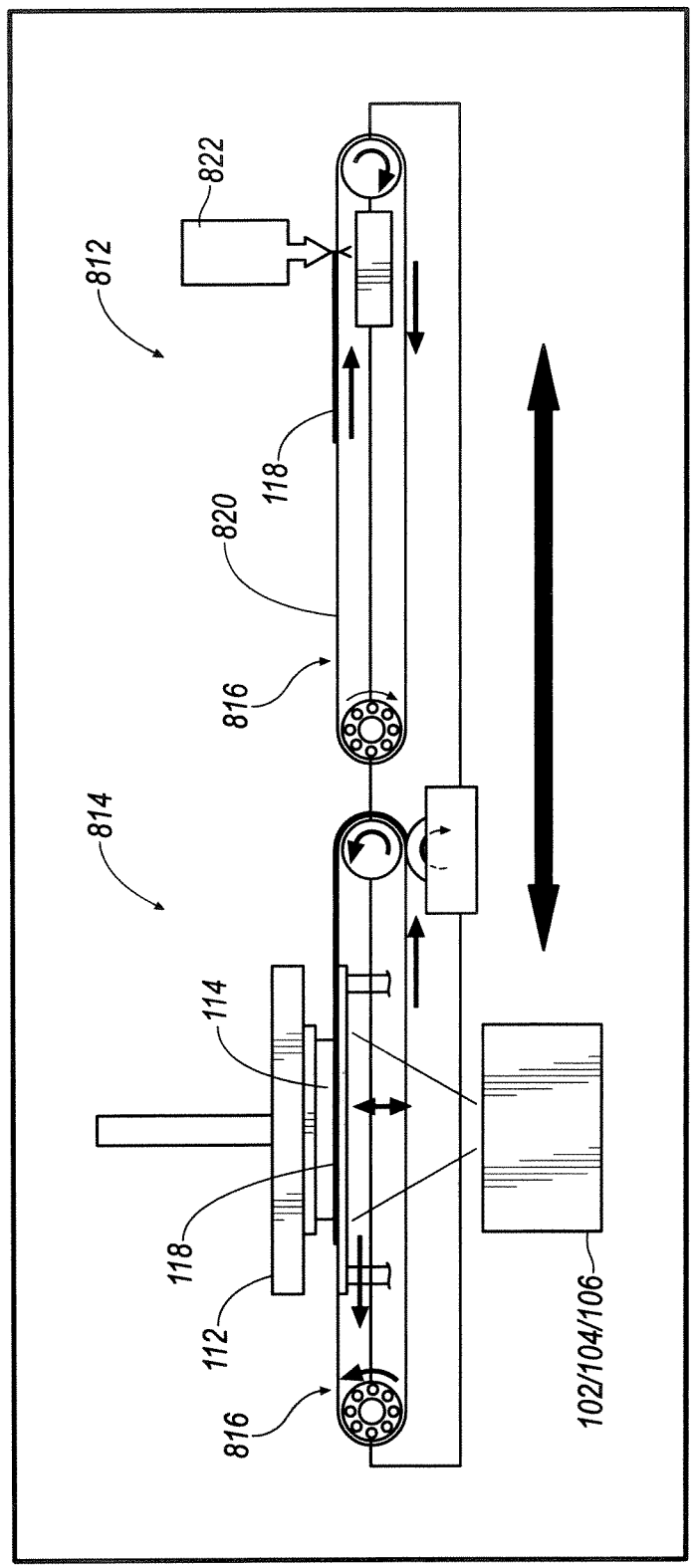
FIG. 8A is an example of an alternative rapid manufacture machine for use with the systems and methods described herein.

As shown in FIG. 8A, an "upwardly" projecting system may use one or more pattern generators 102, 104 and one or more cameras 106. One of skill in the art will appreciate that the systems and methods disclosed herein also apply to a variety of imaging and manufacturing systems. One example is the manufacturing system described in U.S. patent application Ser. No. 11/856,455, the entire contents of which are incorporated by reference in its entirety. Another example may include the V-Flash™ apparatus produced by 3D Systems of Rock Hill, S.C., and/or SLA or selective sintering manufacture processes. Those skilled in the art will also appreciate that the pattern generators may be positioned as direct projection or side projection with 45 degree mirrors to accomplish "upward" projection. Although shown as a single pattern generator system, mirror systems may also be used with multiple pattern generators, where the mirror could be a single mirror for use with multiple pattern generators or each pattern generator may have its own mirror, or a combination thereof. Using mirrors, pattern generators 102, 104 may be mounted at other locations and the mirrors may redirect the electromagnetic radiation finally upwardly.

The system includes a reactive material 118, in liquid, powder, paste, or other form, that may be configured as a photopolymer. The photopolymer may be laid, the thickness normalized, and transported to a moveable platform/support plate 112. Pattern generators 102, 104 then interact with reactive material 118 to form a three-dimensional object or work piece 114. During operation, support plate 112 may move upwardly as work piece 114 is built layer by layer using pattern generators 102, 104 to define the shape of work piece 114.

In general, pattern generators 102, 104 project through a transparent material 810 (e.g., glass) to cure reactive material 118. The reactive material may be transported by a shuttle mechanism 816 (or the equivalent) from a depositing region 812 to a curing region 814. In depositing region 812, shuttle 816 a movable belt 820 (also transparent) may be positioned to clean the surface of the belt 820 to remove excess reactive material 118. Then a deposition mechanism 822 may provide a layer of reactive material 118 onto belt 820. Shuttle 816 may then move to the exposure position 814 where reactive material 118 is moved into contact with the work piece 114 for curing. Pattern generators 102, 104 may then generate the slice-pattern from a bitmap or other descriptive file that is corrected for linear and/or non-linear distortions.

In general, pattern generators 102, 104 may be configured in an "upwardly" direction of exposure to reactive material 118. Moreover, the system may include a single pattern generator 102 that is upwardly projecting, or multiple pattern generators. Additionally, the system may include camera 106, or may not include a camera at all. Where no camera 106 is installed, the system may be calibrated, for example in the factory, or a camera may be attached periodically to perform routine calibration to bring the system back in-line if any geometric correction is necessary. A shown in FIG. 8A, pattern generator 118 projects patterns through transparent material 810 to solidify or partially solidify reactive material 118. Thus, the calibration and correction systems described herein may also take into account inaccuracies or distortions that transparent material 810 may introduce. An example may be a linear or nonlinear distortion due to the transparent material 810, inconsistency of transparent material 810, mounting angle of transparent material 810 or other features of transparent material 810 that may introduce geometric distortion.

Figure 8B:
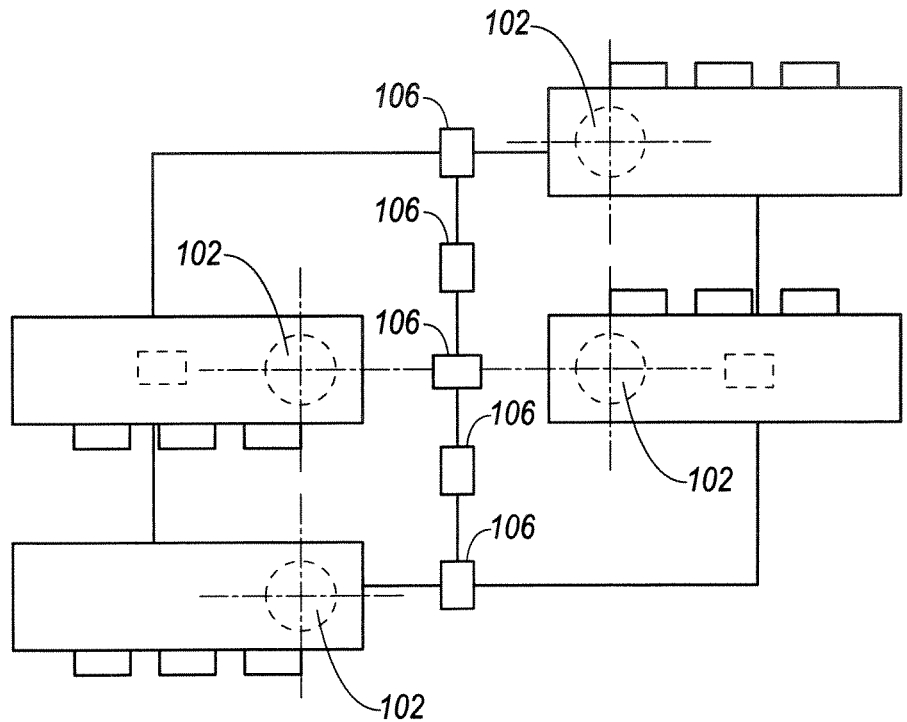
FIG. 8B is an example of an alternative pattern generator and imager configuration for use with the systems and methods described herein.

As shown in FIG. 8B, the system may also include multiple pattern generators 102 (for simplicity all are identified by element number 102). Moreover, multiple cameras 106 may be used to view the output of pattern generators 102 to provide for correction and modification of the patterns to compensate for, minimize, or reduce geometric distortion and reduce potential defects of work piece 114, or to improve the surface smoothness of work piece 114.

Figure 8C:
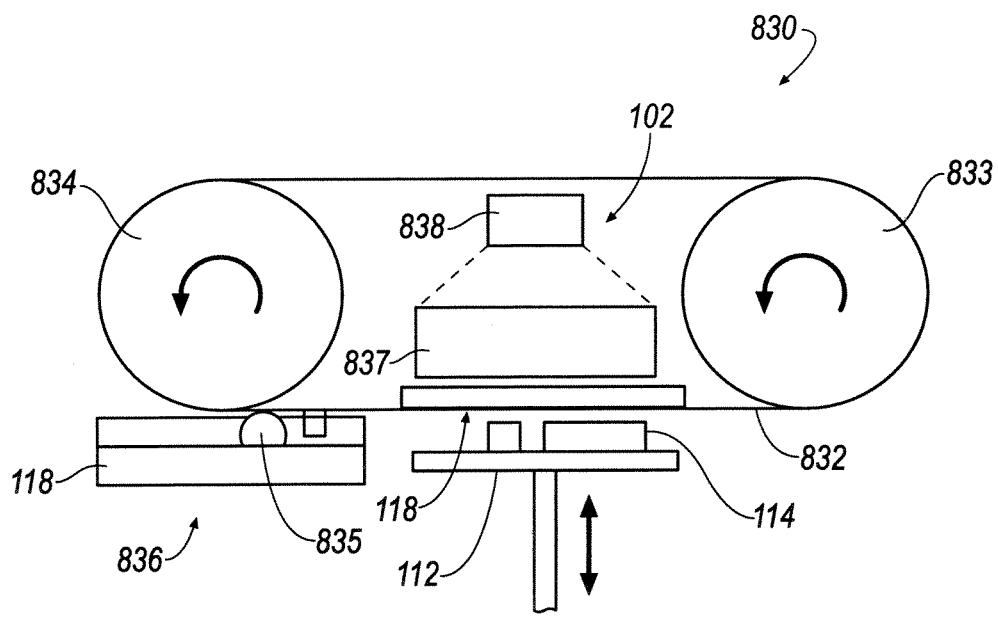
FIG. 8C is an example of an alternative rapid manufacture machine that includes a movable film to provide a reactive material.

FIG. 8C is an example of an alternative rapid manufacture machine that includes a movable film 832 to provide reactive material 118. Rollers 833 may rotate to move film 832 from under pattern generator 102. Here, pattern generator 102 includes a source 838 and an SLM 837 (Spatial light modulator) to determine the pattern. Alternatively, SLM 837 may be configured as a selective collimator. In general, the electromagnetic radiation travels from pattern generator 102 and through film 832 to reach reactive material 118. Film 832 may be configured as a transparent material or semi-transparent material, and as discussed herein, the transparency or semi-transparency is not limited to visible light, but rather typically the electromagnetic radiation produced by the pattern generator.

A roller 835 picks up reactive material 118 from within a cartridge 836 and applies it to film 832. The thickness of reactive material 118 on film 832 may be nearly the same thickness as the slice to be generated (when using a slice-based construction method) or the thickness of reactive material 118 may be thicker than the slice to be generated. One of ordinary skill in the art will appreciate that the thickness of reactive material 118 when applied to film 832 may be a constant predetermined thickness, or it may be variable depending on a number of factors including the thickness of the single slice to be generated.

Figure 8D:
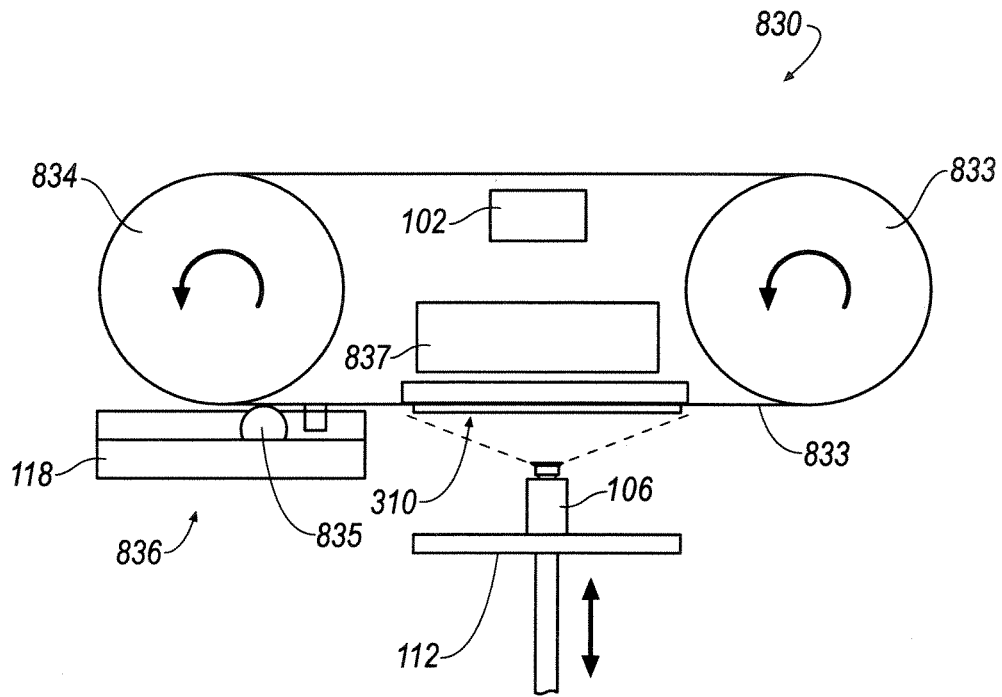
FIG. 8D is an example of calibrating a camera for use with the machine of FIG. 8C.

FIG. 8D is an example of calibrating a camera for use with the machine of FIG. 8C. As discussed herein, imager 106 may be placed on support plate 112 and calibration template 310 may be positioned at the build surface. Imager 106 may then be used with the methods discussed herein to calibrate and correct imager 106 to provide accurate information to controller 120 (not shown). Imager 118 may "see" calibration template 310 by the use of ambient light, or other light sources, which may or may not be the same as electromagnetic radiation provided by pattern generator 102.

Figure 8E:
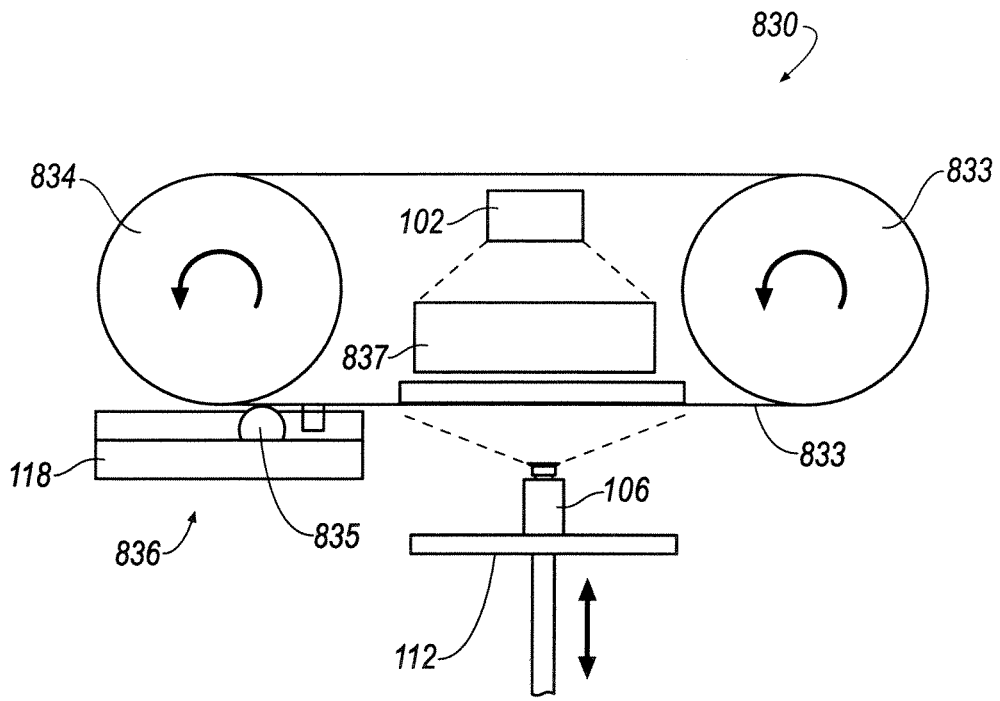
FIG. 8E is an example of calibrating a pattern generator for use with the machine of FIG. 8C.

FIG. 8E is an example of calibrating a pattern generator for use with the machine of FIG. 8C. Maintaining imager 106 at support plate 112, pattern generator 102 may be used to provide a calibration pattern. The calibration pattern may then be captured by imager 106 and the geometric correction methods discussed herein may be applied.

FIG. 8F is another example of an alternative rapid manufacture machine that includes a movable film to provide a reactive material. A film 832, which may be transparent or semi-transparent to the type of electromagnetic radiation provided by pattern generator 102, may be pulled in and out of a cassette that holds reactive material 118 in a container 867. Rollers 864, 866 within the cassette may be used to provide tension for film 832 while it is moved in and out. When film 832 is pulled out of the cassette (as is shown in FIG. 8F), a puller 868 provides tension to film 832 so that it is dimensionally stable. Puller 868 may also be attached to the machine generally, and detachable from film 832. When a cassette is loaded, puller 868 may be moved to the cassette and grab film 832 and extend it outwardly for use, in addition to placing film 832 under tension to locate reactive material 118 properly when applied to film 832.

When pulled in to the cassette, e.g., by roller 866 which may be controlled by controller 120, the reactive material may be removed from the film. Then, when pulled out of the cassette by puller 868, the film is applied at container 867 and the thickness may be determined by adjuster 869. Reactive material 118 may be provided as a liquid, paste, etc. as discussed herein. Adjuster 869 may be controlled by controller 120 to provide a constant thickness (e.g., useful when using a slice-based construction method with constant thickness slices) or the thickness may be adjusted based on the desired thickness of the next slice to be constructed. However, the typical thickness of reactive material 118 on film 832 is about a minimum of the same thickness a the next slice to be constructed, or alternatively, a the thickness of reactive material 118 may be greater than the thickness of the next slice to be constructed.

In this example, support plate 112 may be configured as a reusable build platform or a disposable build platform. Support plate 112 may attach to a movable structure 1222 by mechanical attachment or by vacuum. Other methods of attachment may also be used that allow for the convenient attachment and detachment by the user to remove work piece 114 when the build process is complete.

Figure 8G:
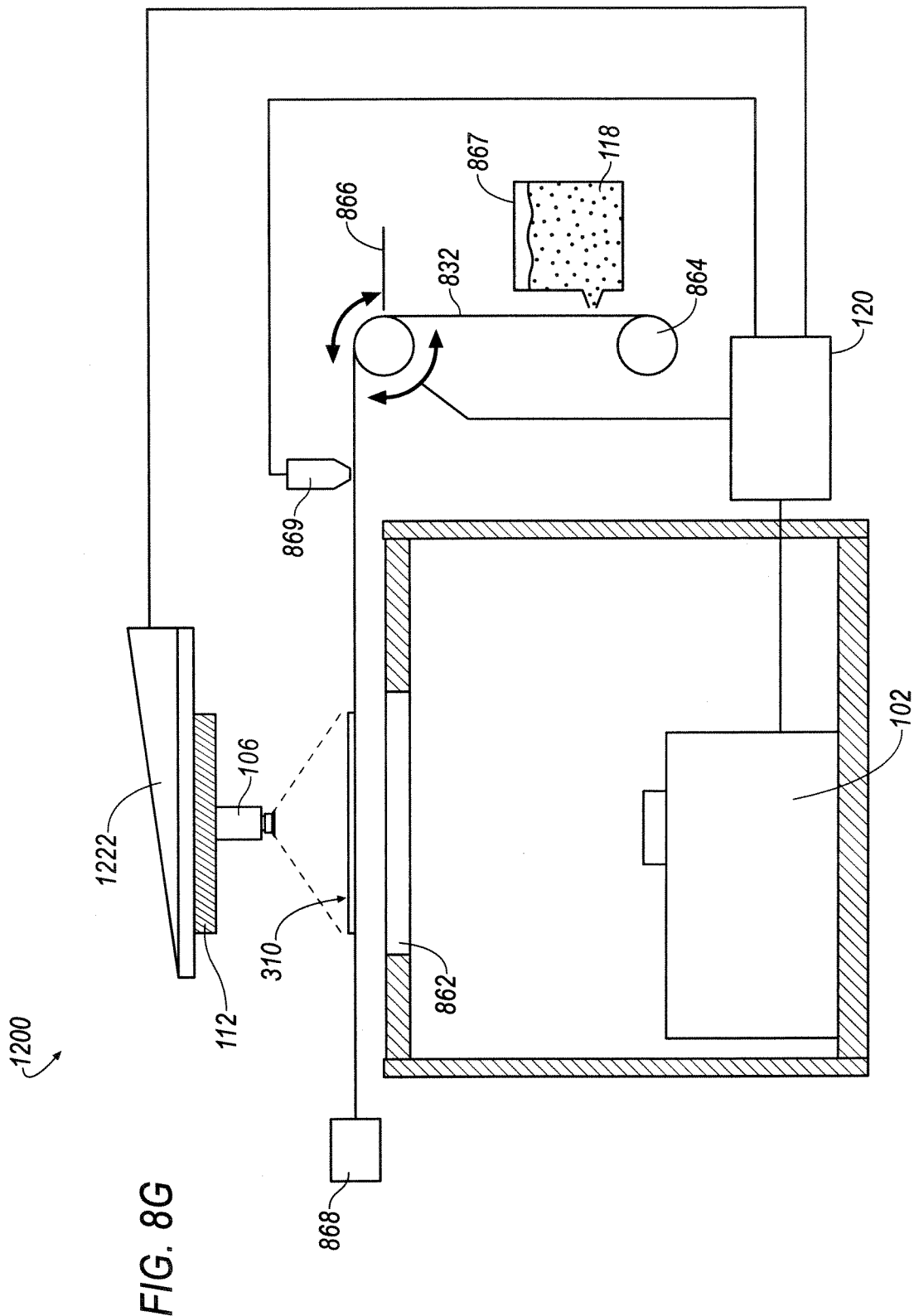
FIG. 8G is an example of calibrating a camera for use with the machine of FIG. 8F.

FIG. 8G is an example of calibrating a camera for use with the machine of FIG. 8F. As discussed herein, imager 106 may be placed on support plate 112 and calibration template 310 may be positioned at the build surface. Imager 106 may then be used with the methods discussed herein to calibrate and correct imager 106 to provide accurate information to controller 120.

Figure 8H:
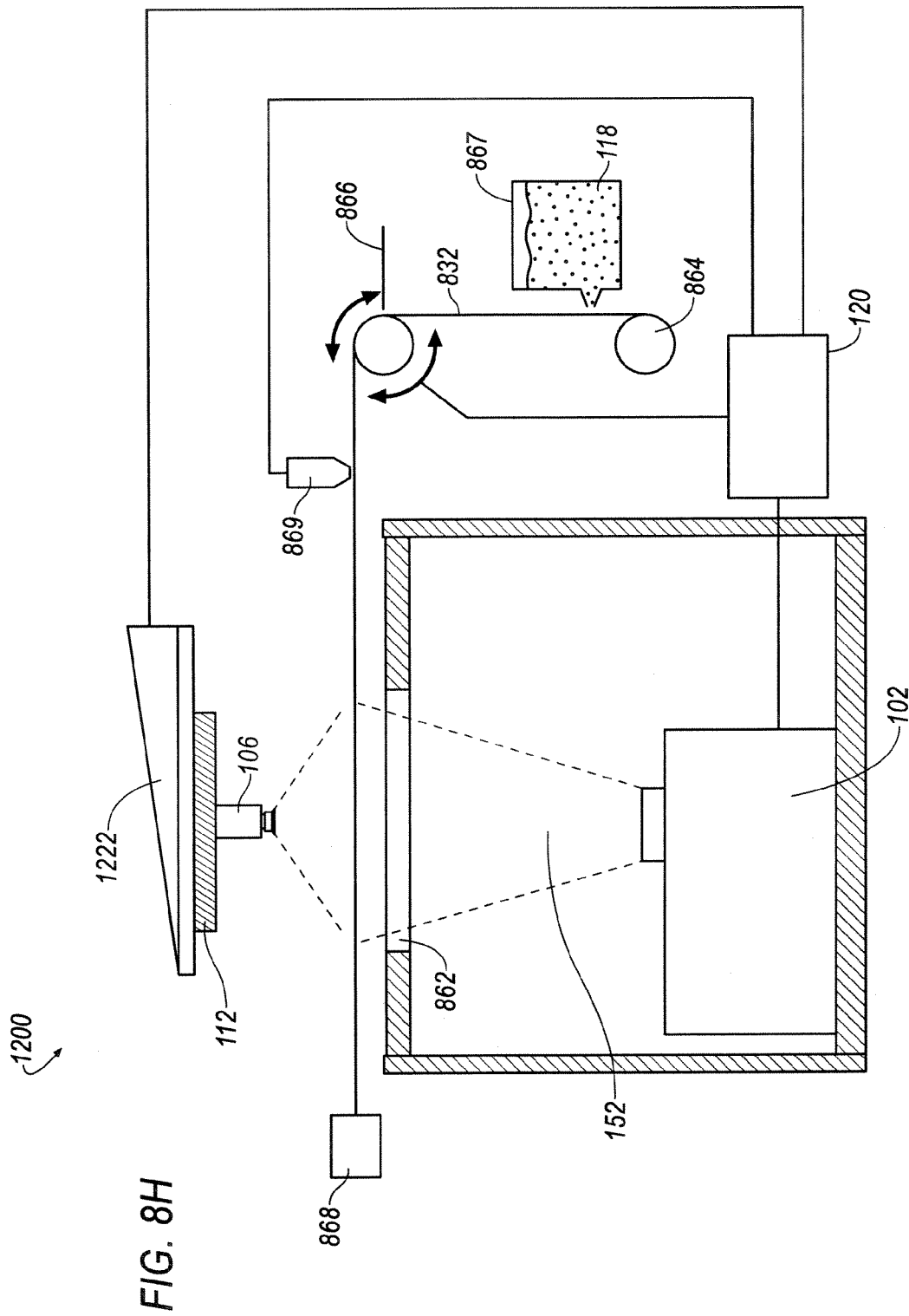
FIG. 8H is an example of calibrating a pattern generator for use with the machine of FIG. 8F.

FIG. 8H is an example of calibrating a pattern generator for use with the machine of FIG. 8F. Maintaining imager 106 at support plate 112, pattern generator 102 may be used to provide a calibration pattern. The calibration pattern may then be captured by imager 106 and the geometric correction methods discussed herein may be applied.

Figure 9A:
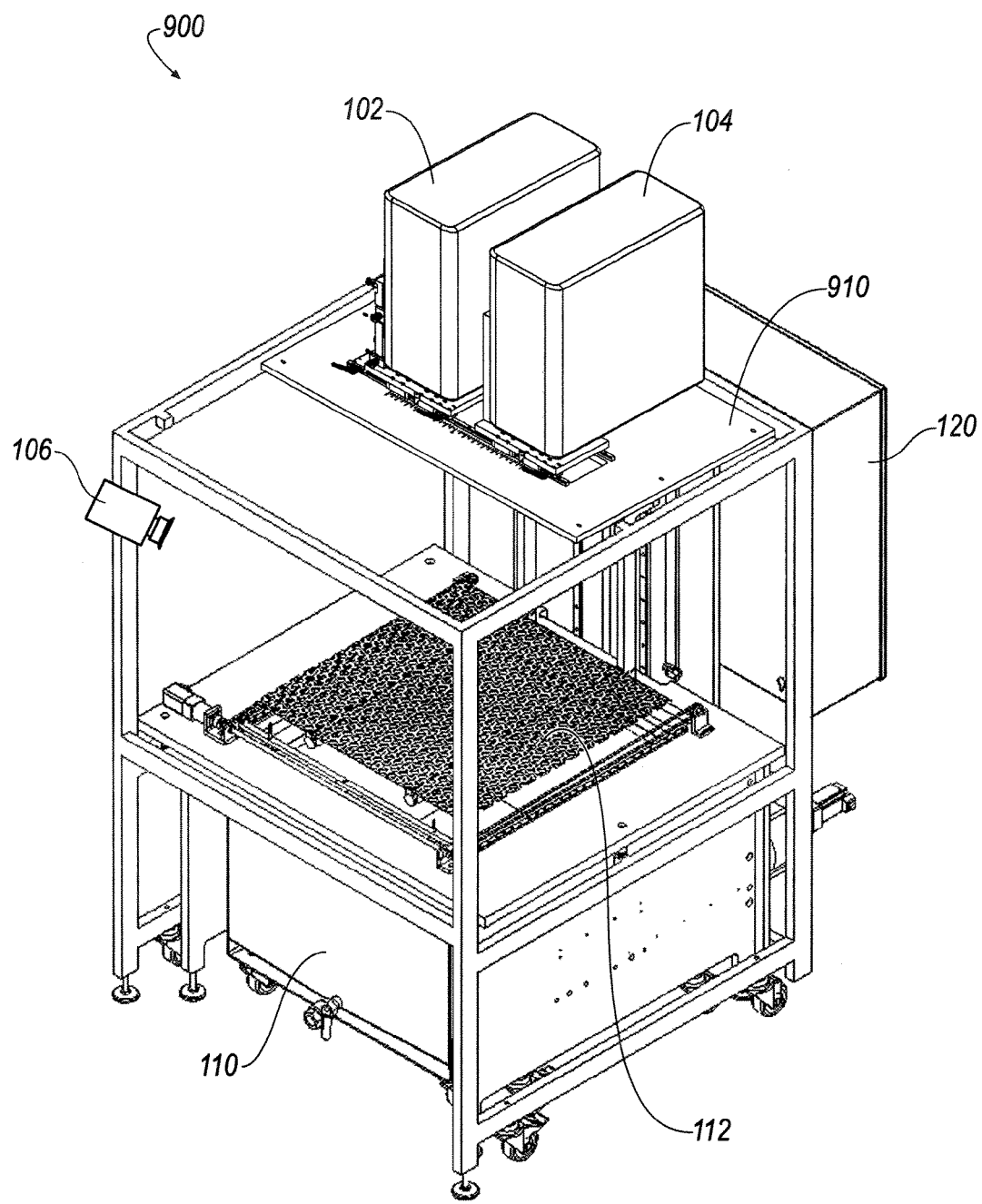
FIG. 9A is an example of a dual pattern generator system.

FIG. 9A is an example of a dual pattern generator system 900. First pattern generator 102 and second pattern generator 104 are attached to a mounting plate 910 which is above the support plate 112. Controller 120 may be mounted to the back side of system 900 to control the system in whole or in part. Container 110 may be carried on wheels to allow easy removal and access. Imager 106 may be mounted to any region of system 900 so that the build surface is with view and given that the location does not block the output of first pattern generator 102 and second pattern generator 104 to support plate 112.

Figure 9B:
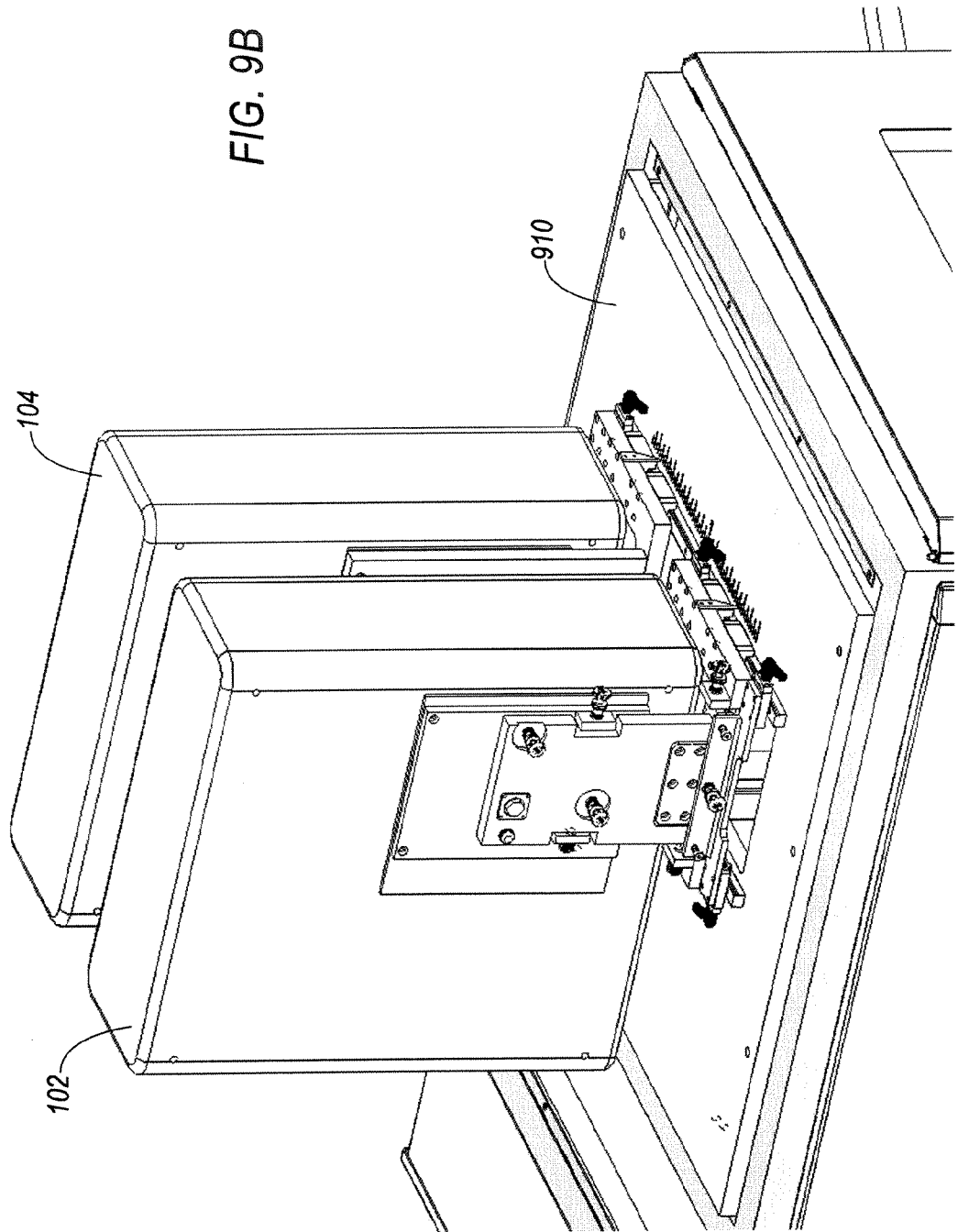
FIG. 9B is an example of a mounting configuration for dual pattern generators for use with the example of FIG. 9A.

FIG. 9B is an example of a mounting configuration for dual pattern generators for use with the example of FIG. 9A. First pattern generator 102 and second pattern generator 104 may be mounted in a side-by-side configuration on mounting plate 910. Where first pattern generator 102 and second pattern generator 104 have a fixed focal distance, the general overlapping area of their projected images may be determined by their spacing relative to mounting plate 910. In general, the build surface (discussed above with respect to FIG. 1A) is at the focal distance of first pattern generator 102 and second pattern generator 104.

Figure 10A:
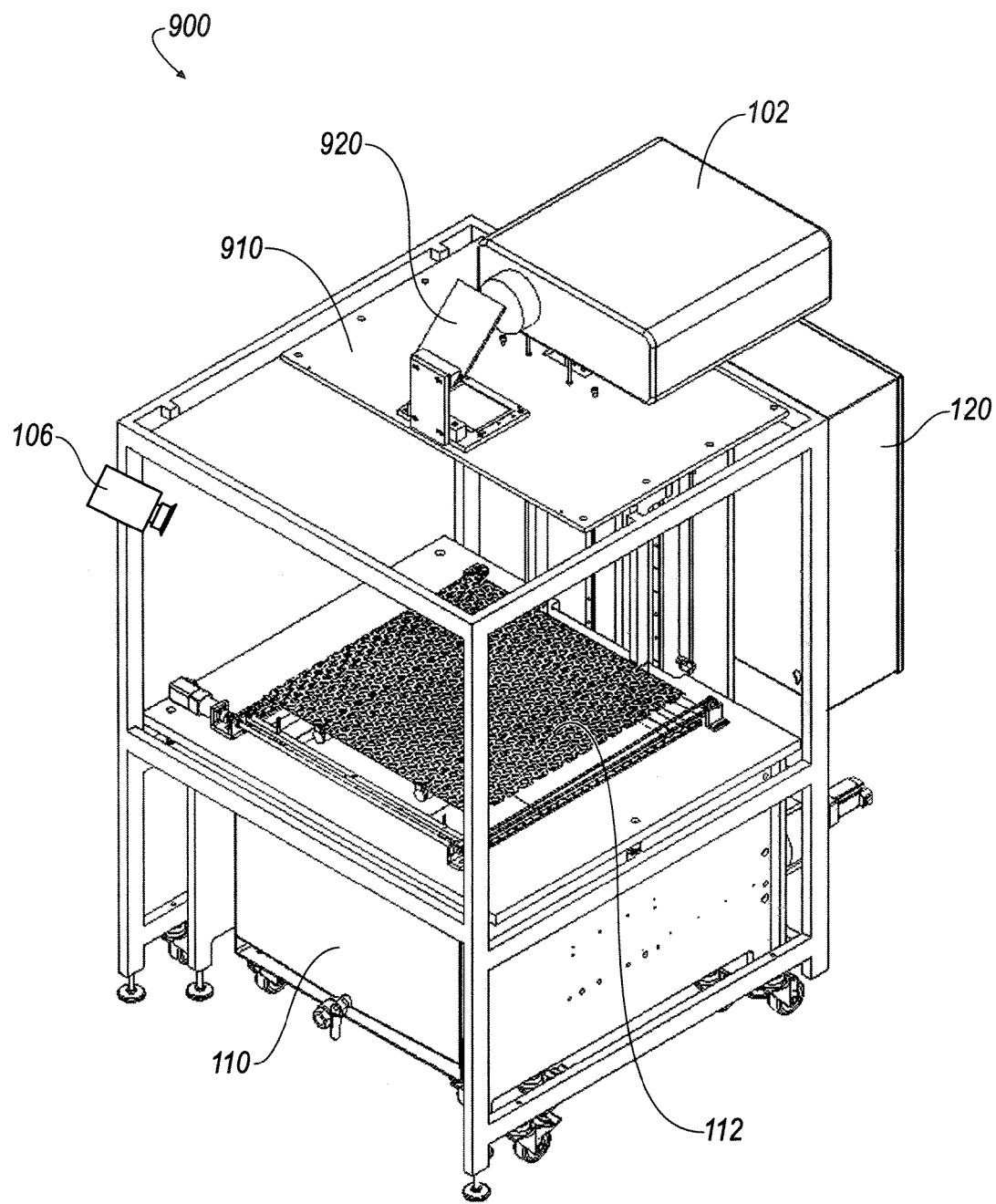
Figure 10B:
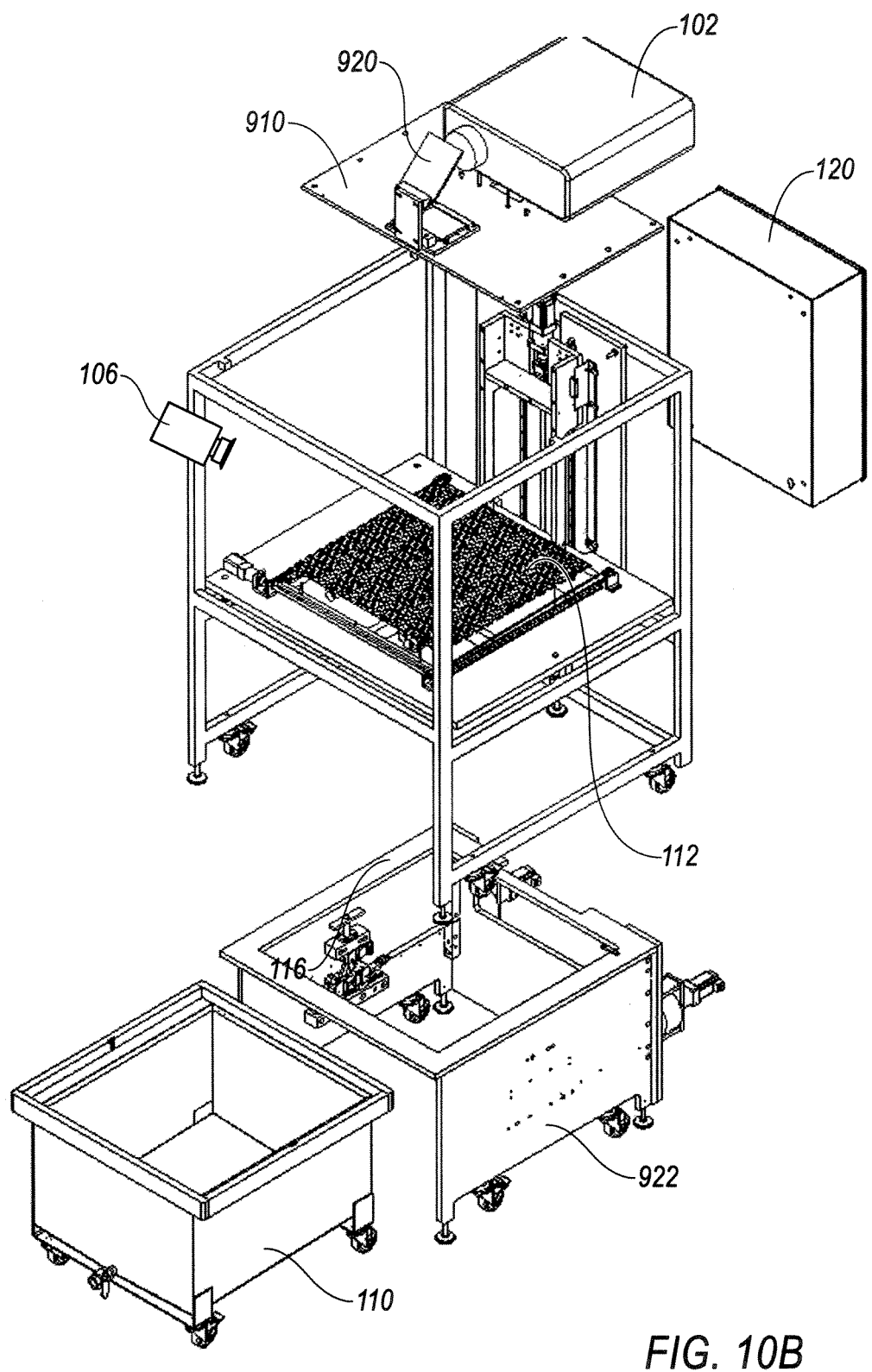

FIGS. 10A and 10B are an example of a single pattern generator system having a mirror 920. First pattern generator 102 projects horizontally and mirror 920 is in the image path to redirect the projection downward to the build surface. Imager 106 may be mounted to any region of the system so that the build surface is with view and given that the location does not block the output of first pattern generator 102. Container 110 (which may also be called a vat) may be mounted on wheels for easy user access to the reactive material. A lifting mechanism 992 lifts container 110 such that the top surface of the reactive material is at the proper build surface distance from imager 102, where the typical distance is the focal distance of imager 102. Lifting mechanism 992 and container 110 may further include a reactive material volume compensation system that provides that the level of the reactive material is located at the ideal or near-ideal distance from pattern generator 102 which may be accomplished by volume compensation and/or the lifting mechanism. Sensors may be used to detect the position of the build surface, or the displacement of the build surface, where the sensor technology may include laser, optical, and/or ultrasound.

Although shown as a single pattern generator system, mirror systems may also be used with multiple pattern generators, where the mirror could be a single mirror for use with multiple pattern generators or each pattern generator may have its own mirror, or a combination thereof.

Figure 10C:
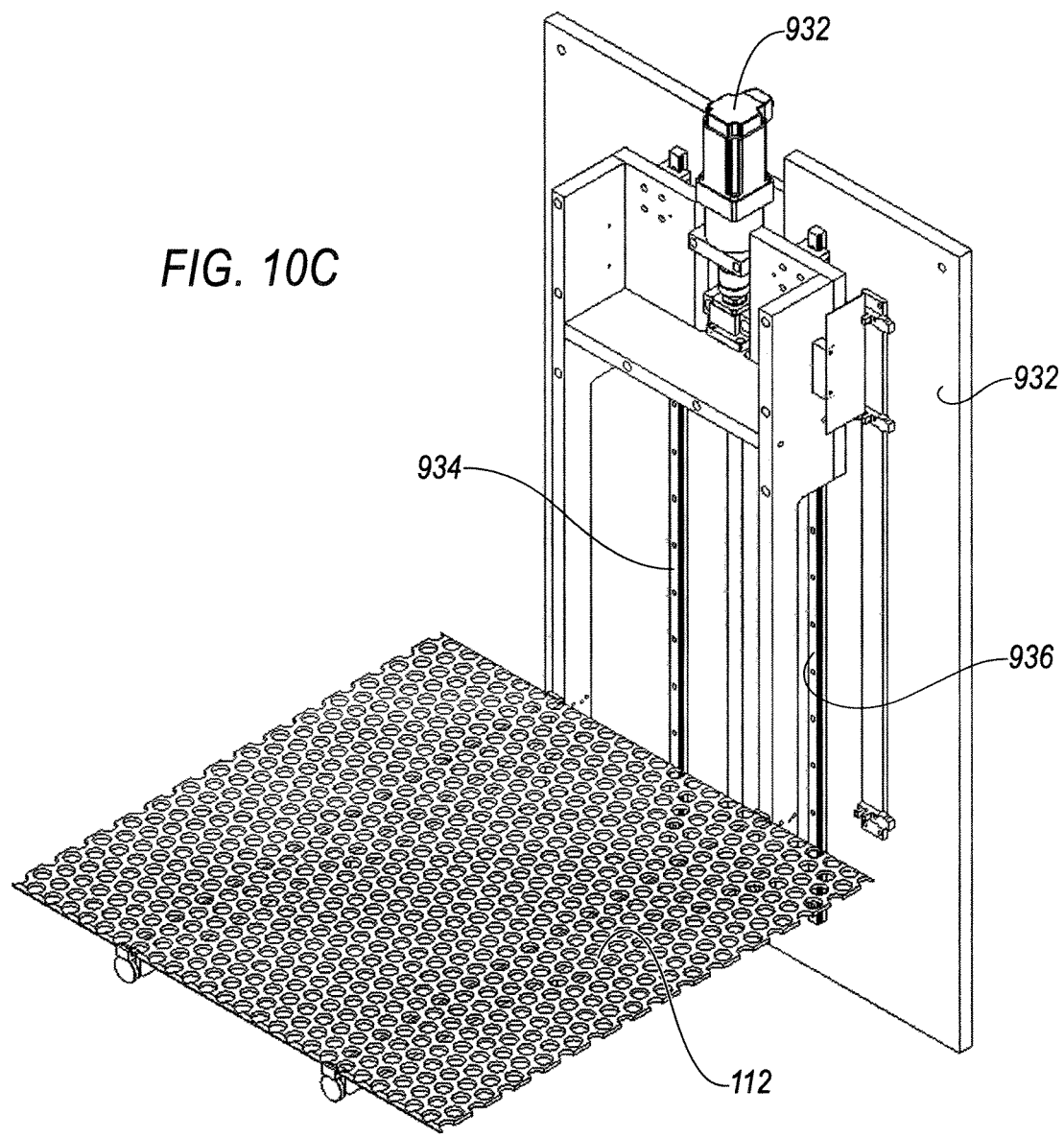
Figure 10C:
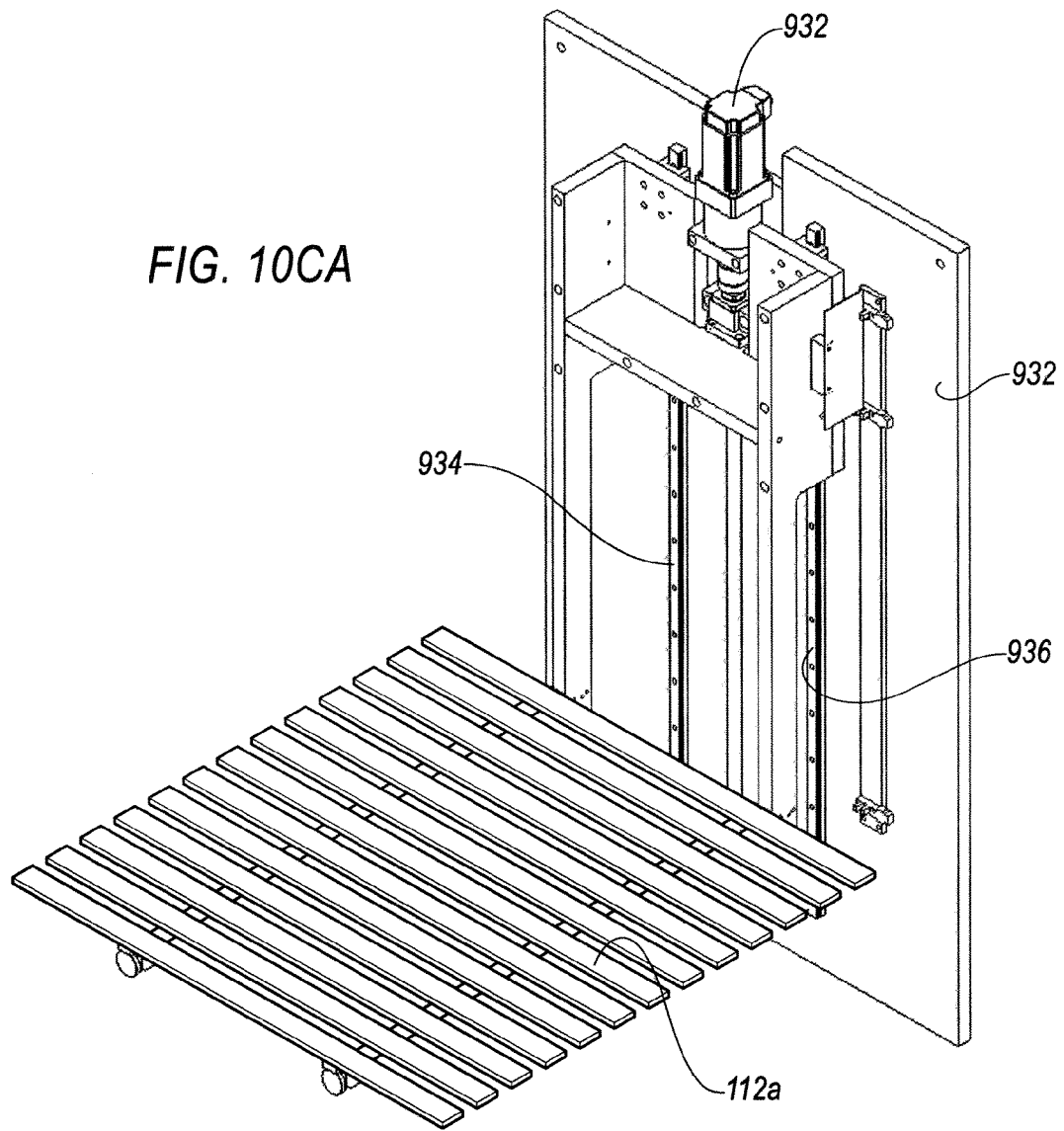
Figure 10C:
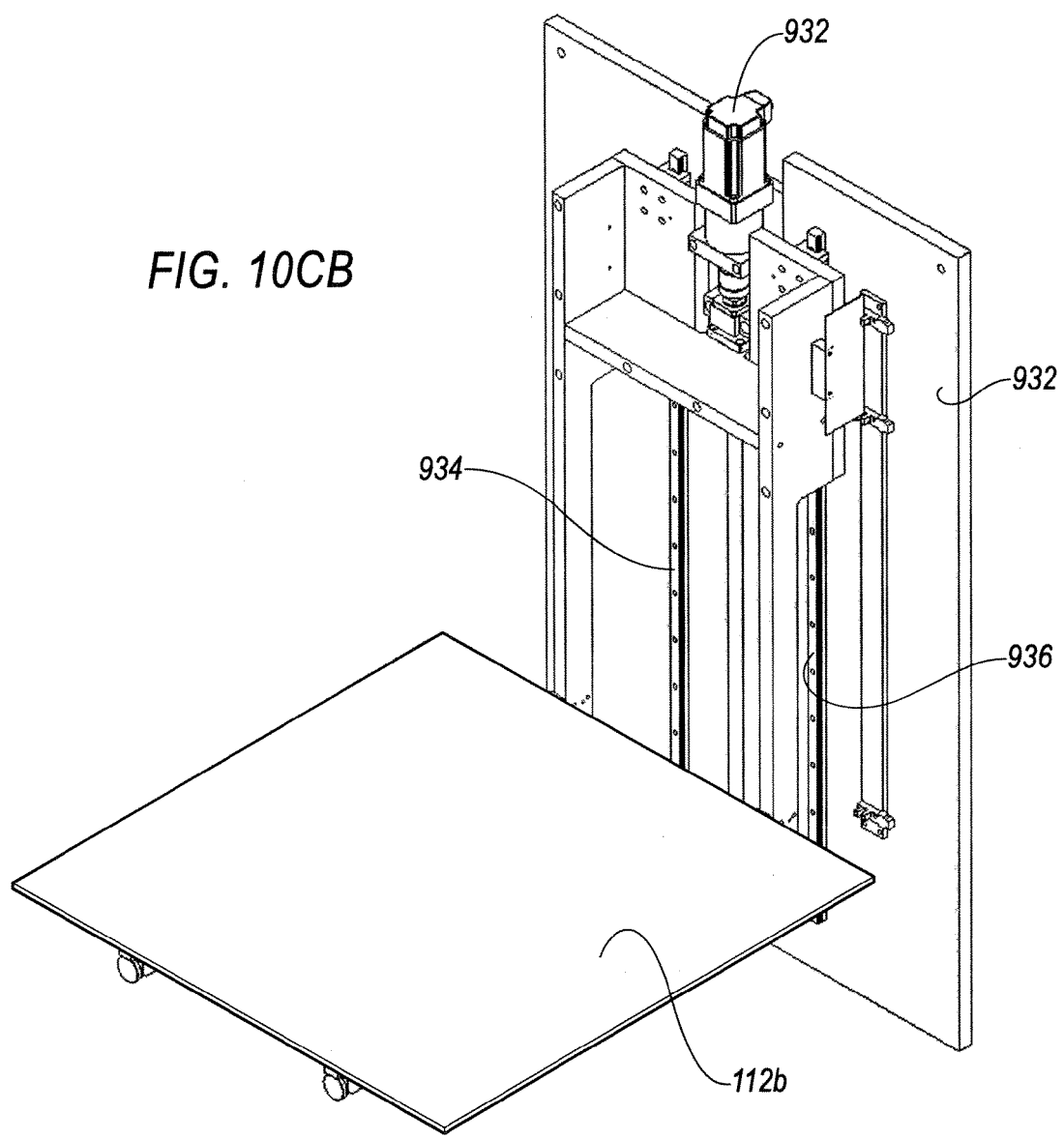

FIG. 10C is an example of a support plate system for use with the pattern generator systems described herein. FIG. 10C also relates to the other examples as shown herein, including but not limited to, FIGS. 1A, 1H-1J, 9A, 10A, 10B, and FIGS. 11-15A. A servo motor 932 rotates a lead screw and support plate 112 may include a nut engaging the lead screw. The nut may further be configured as a precision nut having pre-loaded balls to maintain precision throughout the range of movement. Typical systems may sometimes be called "ball screw assemblies", "roller screws", "lead screw assemblies", "worm gear screw jacks", etc. An encoder may be used to determine the rotational position of the lead screw so as to send position feedback to controller 120. It is important to note that while a servo-motor configuration is shown, other systems may also be used to impart constant motion to support plate 112. For example, stepper motors (which may use full-stepping, micro-stepping, etc.) may be used, and also linear drive motors, or other motion devices capable of moving support plate 112 in a controlled fashion. Guide rails 934, 936 allow support plate 112 to move in the Z direction with minimal twist or wobble. Support plate 112 may be configured as a "perforated" platform as shown in FIG. 10C that includes holes therethrough. The holes may allow for reactive material 118 to freely flow through support plate 112 when it is lowered and raised. However, support plate 112 may be configured to have slats as shown as support plate 112a of FIG. 10CA that allow for the flow of reactive material. Alternatively, support plate 112 may be configured as having a substantially unbroken surface as shown in support plate 112b of FIG. 10CB. However, other configurations for support plate 112 may also be used, such as where support plate 112 includes a pattern of holes or other geometry therethrough to allow the flow of reactive material 118.

Figure 11:
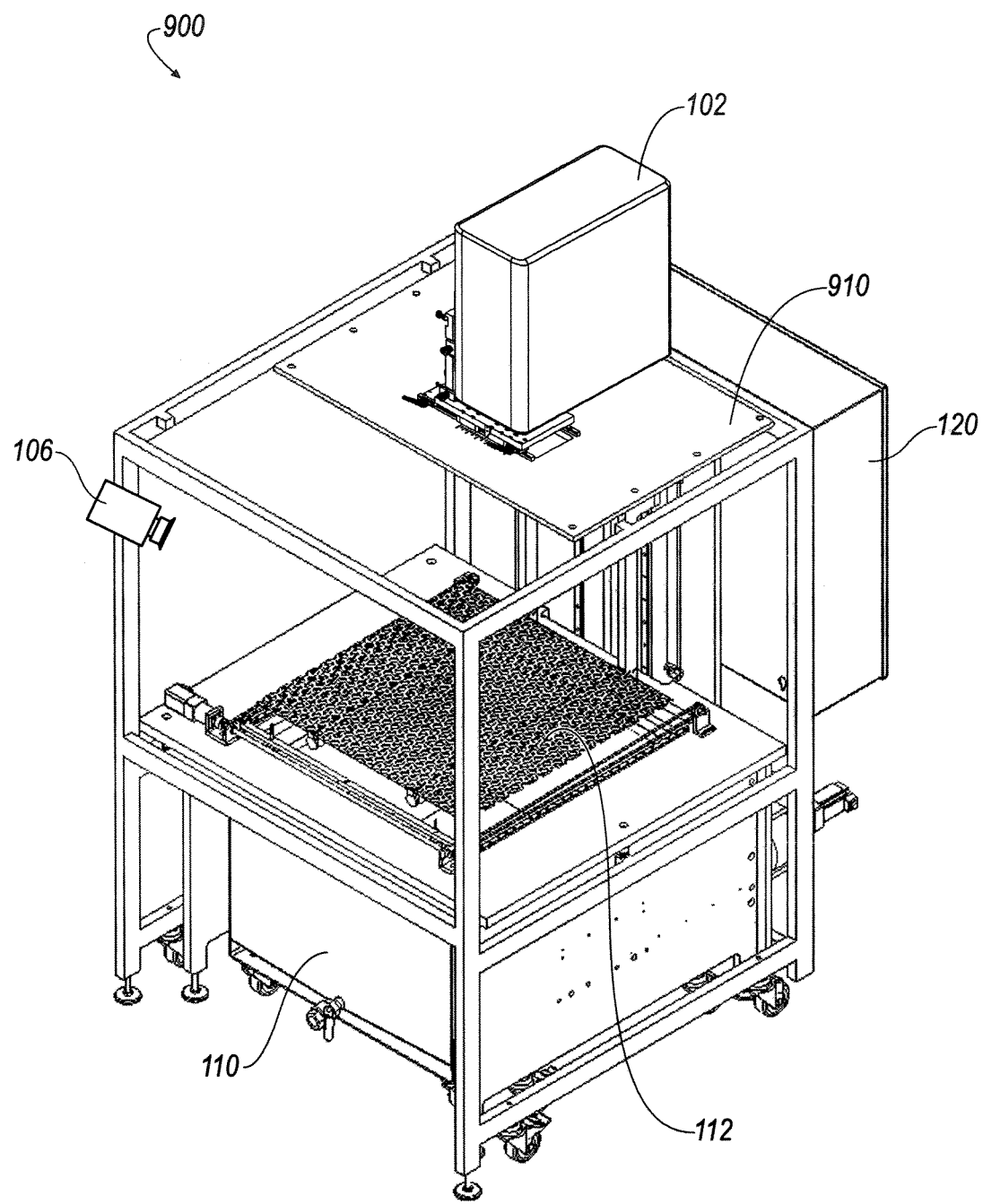
FIG. 11 is an alternative example of a single pattern generator system having a direct output.

FIG. 11 is an alternative example of a single pattern generator system having a direct output. Here, first pattern generator 102 is mounted so as to provide direct projection onto the building surface and imager 106 is mounted to view the building surface, while not interfering with the generated images.

Figure 12:
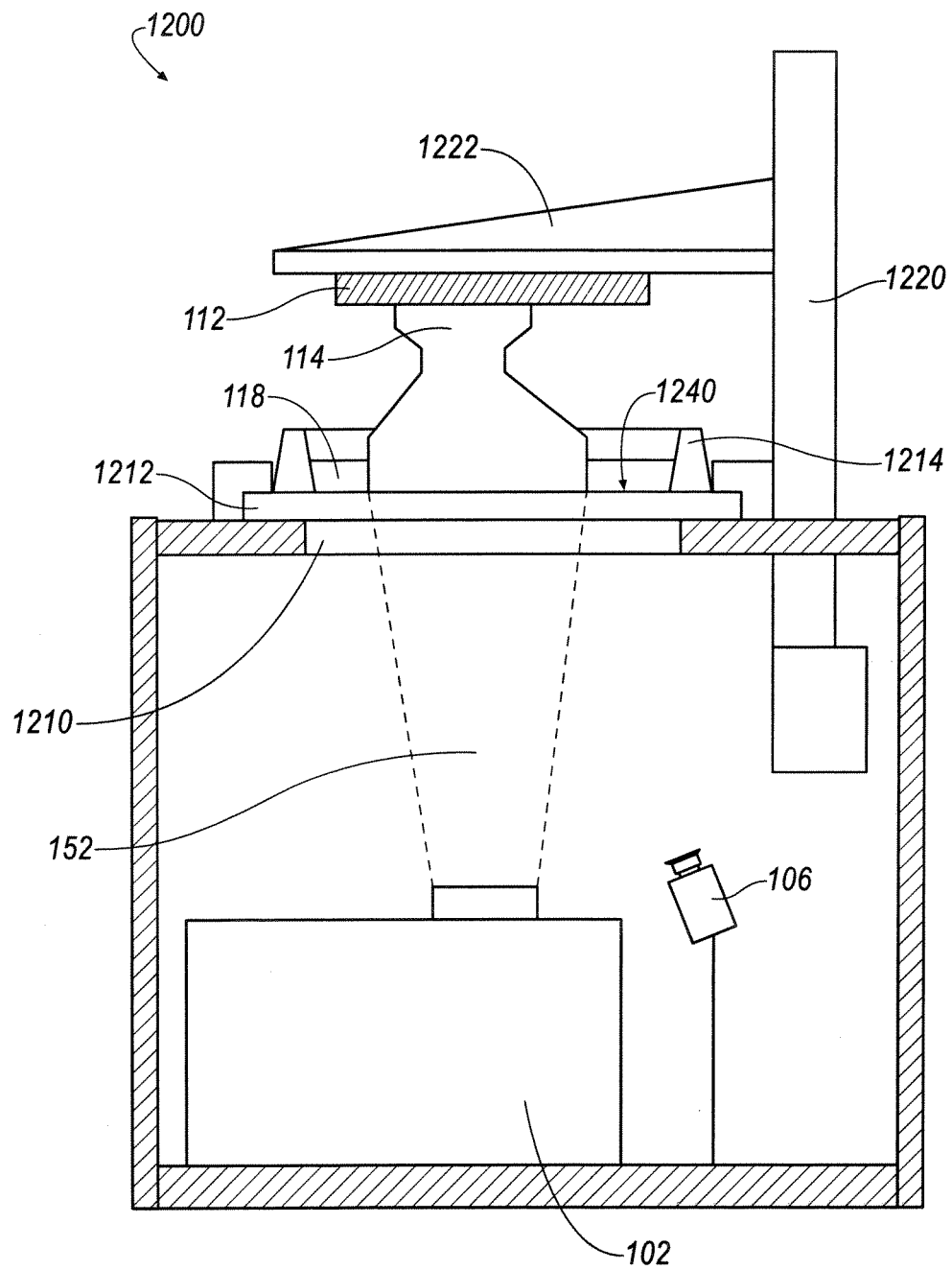
FIG. 12 is an example of a system having an upward projecting single-pattern generator.
Figure 13:
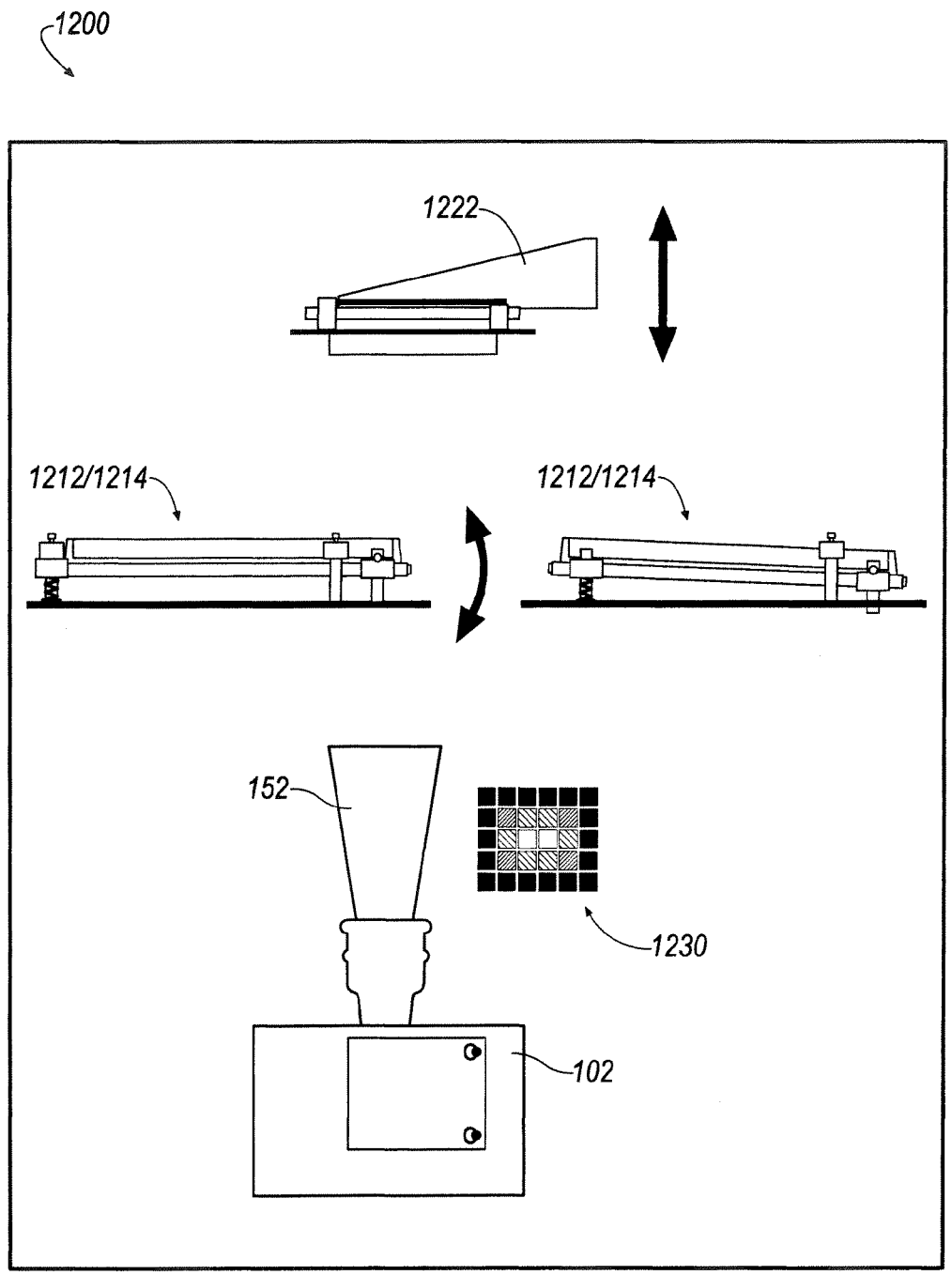
FIG. 13 shows the build process of the system of FIG. 12.

FIGS. 12 and 13 are an example of a system 1200 having an upward projecting single-pattern generator 102. System 1200 includes a liquid or semi-liquid bath of reactive material 118. The "upward" projecting nature of system 1200 is similar to that described above in FIG. 8A, in that the pattern 152 output from pattern generator 102 may be directed from below the reactive material 118 for curing. The pattern 152 may be projected through a transparent plate 1210 attached to the machine body (which protects the machine's inner mechanism and/or optics), and may further be projected through a bottom transparent plate 1212 that is adjacent to the building surface 1240. Building surface 1240 is at the upper surface of bottom transparent plate 1212 which holds reactive material 118 along with surrounding walls 1214 as a "bath". A Z-axis motion system 1220 moves support plate support plate 112 upwards during the build process and may be similar to the system of FIG. 10C in operation, but with the direction of travel during build being reversed.

FIG. 13 shows the build process of the system of FIG. 12 where pattern generator 102 projects pattern 152, the pattern at build surface 1240 being shown as pattern 1230. Pattern 1230 may include gray scaling for each voxel, shown here where the outer voxels are of maximum depth (e.g., the depth being determined by the intensity as expressed by a grayscale value) and the inner voxels having a less than maximum grayscale value, which relates a less than maximum depth of the voxel.

During the build process, bottom transparent plate 1212 and surrounding walls 1214 (which may also be called a polymerization tray) may tilt to allow separation of the work piece 114 (shown in FIG. 12) from bottom transparent plate 1212 (which may also be coated with a material that prevents or reduces sticking of cured reactive material). During the construction process, support plate 112 (e.g., the build platform) may be moved upwardly to a distance determined by the next voxel data set's maximum voxel depth (e.g., the distance of upward movement will be the distance of the deepest voxel in the next voxel data set to be generated). The tiling process also allows fresh reactive material 118 (e.g., un-cured or non-polymerized reactive material) to flow under work piece 114 before the next voxel data set is formed (e.g., forming may be where reactive material 118 is solidified or partially solidified when exposed to electromagnetic radiation). The process repeats until the work piece(s) are completed.

Imager 106 may be mounted under transparent plate 1210 so that the pattern may be visible when projected to build surface 1240. Using imager 106, the calibration and correction systems and methods described herein may also be applied to the "upward" projecting system 1200. The calibration and correction methods may also include correction for pattern generator 102, as well as other elements such as transparent plate 1210 and bottom transparent plate 1212, which may be compensated for. The pattern 152 may be viewed by imager 106 as it is being projected onto build surface 1240 with a reactive material in place (e.g., for real-time or near real-time correction), or imager 106 may view a calibration pattern as reflected from a paper or other material placed at build surface 1240. Moreover, imager 106 may be calibrated by placing a calibration template 310 at build surface 1240 and performing the method 1100 as described in FIG. 1B. Note that when placing imager 106 below the build plane, as is shown in FIG. 12, distortion from transparent plate 1210 and bottom transparent plate 1212 may not provide ideal results when calibrating imager 106, or pattern generator 102 because additional distortion may be imparted by transparent plate 1210 and bottom transparent plate 1212 on the return path of the pattern to imager 106. Thus, an alternative calibration method and system is shown below in FIGS. 14A-14B.

Figure 14A:
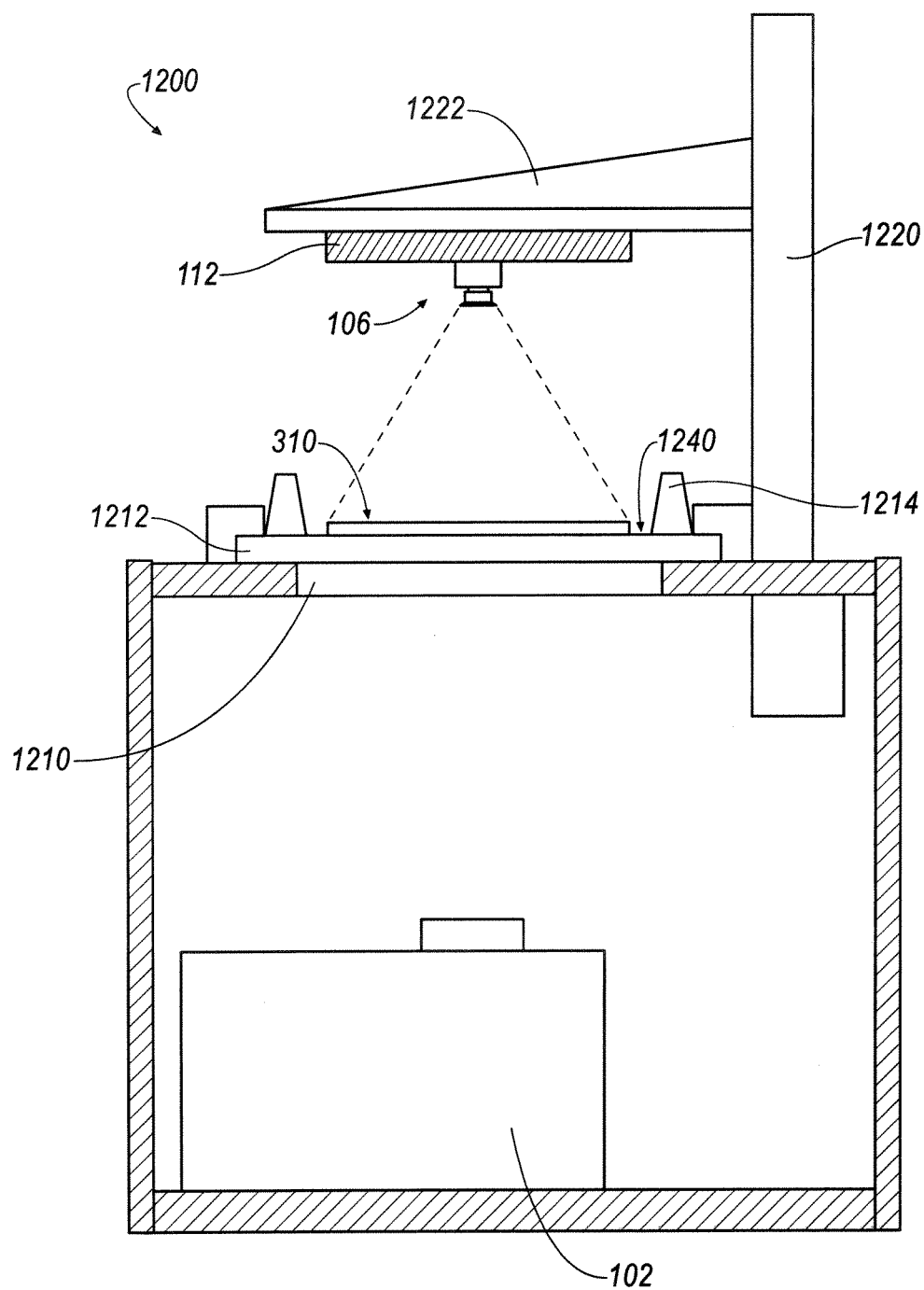
FIG. 14A is an example of a removable imager being calibrated for use with an upward projecting single pattern generator system.

FIG. 14A is an example of a removable imager 106 being calibrated for use with an upward projecting single pattern generator system 102. Imager 106 may be mounted to support plate 112 in a removable manner, such as using a clip. When calibrating imager 106, calibration template 310 may be placed on top of transparent plate 1212 with the calibration image "up" so that it is visible to imager 106. Support plate 112 may be moved to a position where the distance from calibrating imager 106 to calibration template 310 is the same as the focal distance of calibrating imager 106, which may also be same distance (or substantially the distance) to build surface 1240. The thickness of calibration template 310 may be configured as a thin material (e.g., paper). Alternatively, if a thicker material is used, the thickness may be taken into account because the captured image may not be precisely at build surface 1240, but may be shifted upward by the thickness of calibration template 310. One method to adjust for the thickness of calibration template 310 is though calculations when determining the calibration map. Another method may be to adjust support plate 112 downward by the thickness of calibration template when calibrating pattern generator 112. Using the methods and systems discussed herein (e.g., FIG. 1B) may then be used to generate an imager calibration map.

Figure 14B:
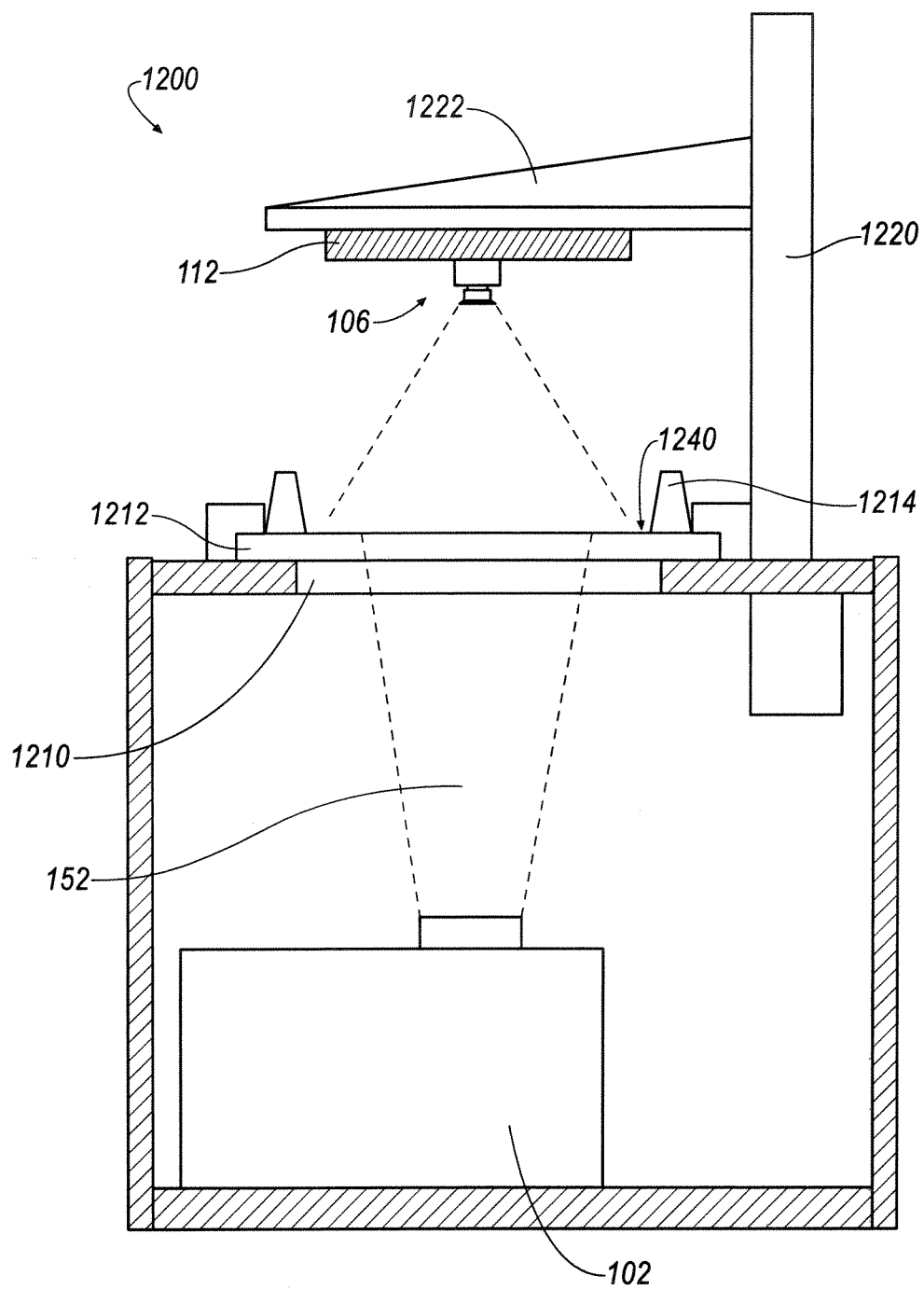
FIG. 14B is an example of a removable imager being used to calibrate an upward projecting single pattern generator system.

FIG. 14B is an example of a removable imager being used to calibrate an upward projecting single pattern generator system. The calibration pattern (e.g., similar to pattern 412 of FIG. 4B) may be generated from pattern generator 102 through transparent plate 1210 and bottom transparent plate 1212. Imager 106 may then view the calibration pattern at build surface 1240. The methods and systems discussed herein (e.g., FIG. 1C) may then be used to generate a pattern generator calibration map.

Figure 15:
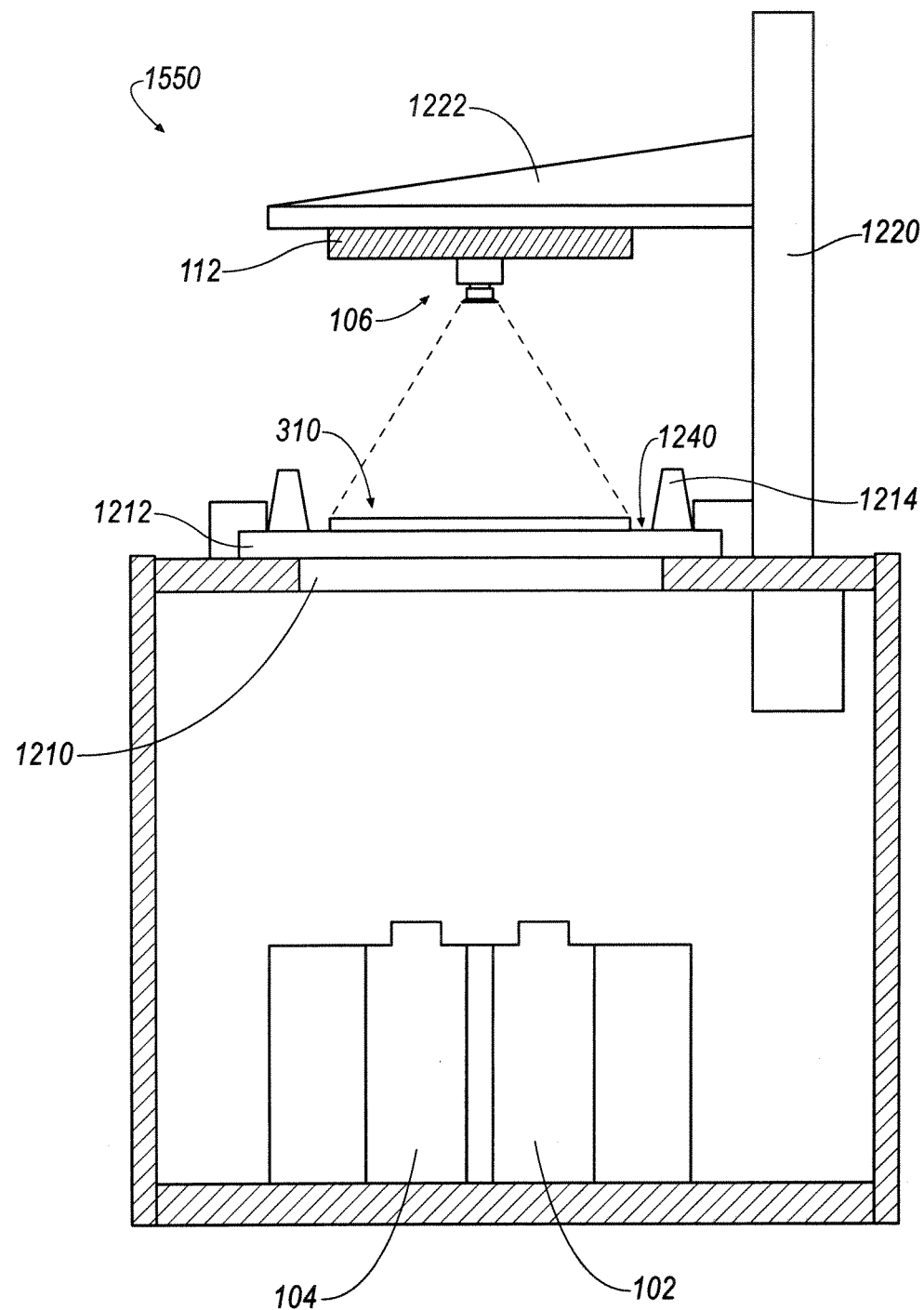
FIG. 15 is an example of an upward projecting multiple pattern generator system, where an imager is being calibrated.

FIG. 15 is an example of an upward projecting multiple pattern generator system 1550, where imager 106 is being calibrated. Imager 106 may be mounted to support plate 112 in a removable manner, such as using a clip. When calibrating imager 106, calibration template 310 may be placed on top of transparent plate 1212 with the calibration image "up" so that it is visible to imager 106. Support plate 112 may be moved to a position where the distance from calibrating imager 106 to calibration template 310 is the same as the focal distance of calibrating imager 106, which may also be same distance (or substantially the distance) to build surface 1240. The thickness of calibration template 310 may be configured as a thin material (e.g., paper). Alternatively, if a thicker material is used, the thickness may be taken into account because the captured image may not be precisely at build surface 1240, but may be shifted upward by the thickness of calibration template 310. One method to adjust for the thickness of calibration template 310 is though calculations when determining the calibration map. Another method may be to adjust support plate 112 downward by the thickness of calibration template when calibrating pattern generator 112. Using the methods and systems discussed herein (e.g., FIG. 1B) may then be used to generate an imager calibration map.

Figure 15A:
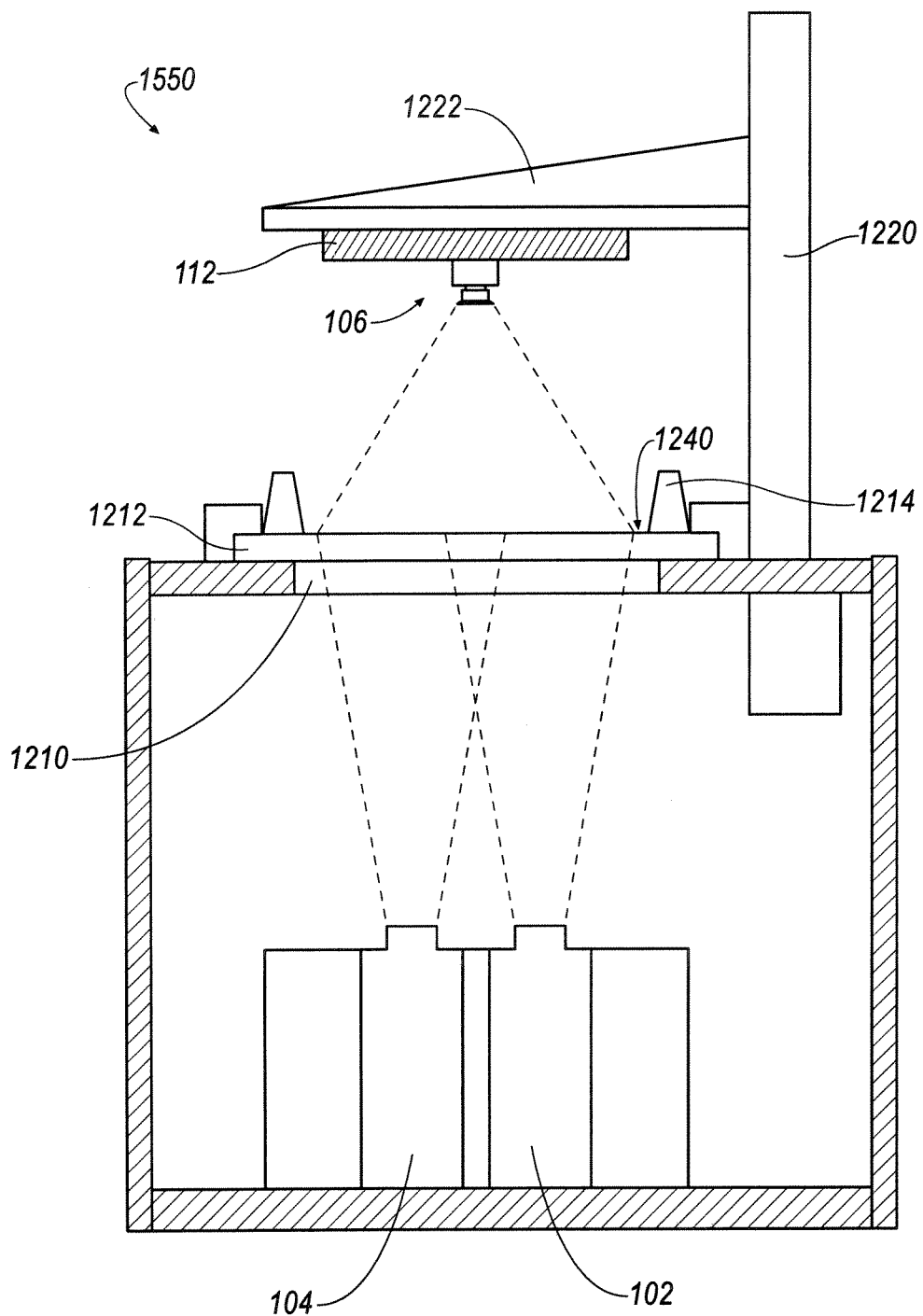
FIG. 15A is an example of the upward projecting multiple pattern generator system of FIG. 15, where dual pattern generators are being calibrated.

FIG. 15A is an example of upward projecting multiple pattern generator system 1550 of FIG. 15, where dual pattern generators 102, 104 are being calibrated. Similar to system 1200 discussed above in FIGS. 12-14B, multiple pattern generator system 1550 may include pattern generators 102, 104 and project directly upwardly, or pattern generators 102, 104 may project horizontally and include a mirror to allow the electromagnetic radiation to project upwardly (not shown but similar to the mirror system 920 shown in FIG. 10A). One of skill in the art will appreciate that any of the examples shown herein with a single pattern generator 102, or multiple pattern generators 102, 104 (or more) may include additional elements (e.g., a mirror) in the path of the electromagnetic radiation that may change the direction of the electromagnetic radiation and allow for the mounting of pattern generators as direct projection devices or non-direct projection devices.

As shown, pattern generators 102, 104 are projecting calibration patterns to be viewed by imager 106. The calibration patterns from generators 102, 104 may be projected at the same time (e.g., where imager 106 can distinguish between them) or they may be projected separately. The calibration patterns (e.g., similar to pattern 414 of FIG. 4A and pattern 412 of FIG. 4B) may be generated from pattern generators 102, 104 through transparent plate 1210 and bottom transparent plate 1212. Imager 106 may then view the calibration patterns at build surface 1240. The methods and systems discussed herein (e.g., FIG. 1C) may then be used to generate a pattern generator calibration maps for each of pattern generators 102, 104.

Figure 16:
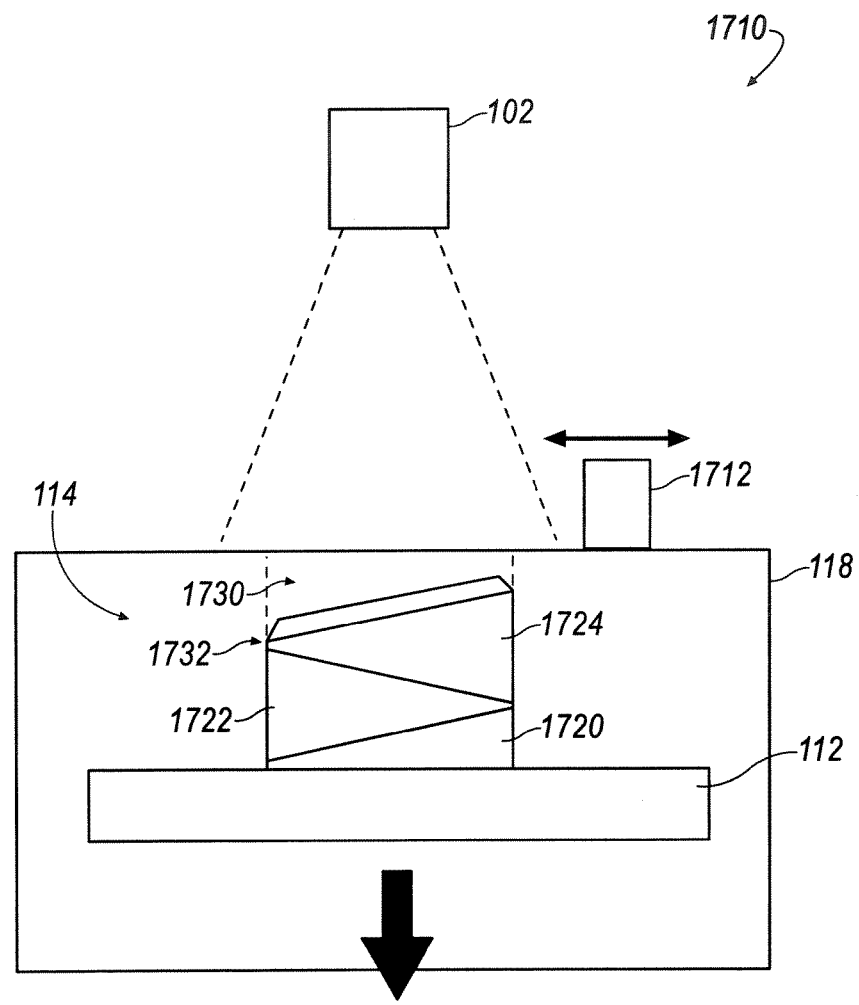
FIG. 16 is an example of voxelized construction process for use, in an example, with the systems of FIGS. 1A, 1H-1J, 2A-2C, and 9A-11.
Figure 16:
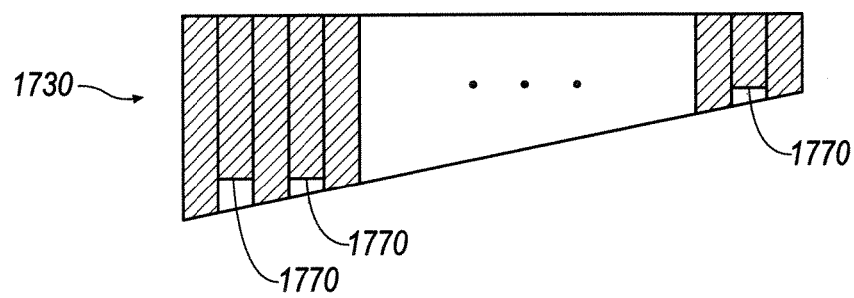

FIG. 16 is an example of voxelized construction process for use, in an example, with the "downward" projecting systems of FIGS. 1A, 1H-1J, 2A-2C, and 9A-11. A cooling element 1712 (with or without an attached vacuum pump) may be moved over the reactive material 118 at predetermined times to displace the reactive material that has expanded due to heating (e.g., when the electromagnetic radiation provided by the pattern generator heats up the reactive material). The motion of cooling element 1712 may be controlled by controller 120 (see FIG. 1A) and may, for example, be moved after a predetermined number of exposures have been generated, an amount of electromagnetic radiation has been provided by pattern generator 102, or other factors. In any event, cooling element 1712 does not need to be moved with every sequence of voxel generation (e.g., using pattern generator 102) and may not need to be moved until multiple sequences of voxels has been generated, if at all.

During the movement of cooling element 1712, support plate 112 continues to move downwardly, creating wedge-shaped regions of reactive material. When pattern generator 102 is used to create the voxels in reactive material 118, the maximum voxel depth may be determined by the maximum depth of reactive material (e.g., determined by the lower portion 1732 of the wedge). Controller 120 (not shown) may control or communicate with controllers that command pattern generator 102, cooling element 1712, and movement of support plate 112. Thus, controller 120 (or other controllers) may have the ability to dynamically determine the maximum voxel depth and build envelope based on the shape of the reactive material (e.g., a wedge shape) and adjust each voxel's depth of cure appropriately (e.g., using intensity values and/or exposure time).

As shown, the continuous build process allows for non-planar construction of work piece 114. The speed of downward movement of support plate 112 may be controlled by controller 120 to speed-up or slow-down during movement of cooling element 1712, or the speed of support plate 112 may remain constant. In general, the speed of support plate 112 may be controlled to remain in constant motion while patterns are generated (e.g., by pattern generator 102) and during movement of cooling element 1712.

As shown, three wedge shaped voxel data sets (1720, 1722, 1724) have already been generated and portions of reactive material 118 have been cured or polymerized to create work piece 114. The current portion 1730 of reactive material waiting to be cured is shown in additional detail. As shown, current portion 1730 may include a staggered pattern of generated voxels where some voxels have an increased depth of cure, which in this instance would contact the prior generated portion 1724. The voxels that are generated short of the prior generated portion 1724 may include gaps (1770 (exaggerated)) beneath them to provide for internal stress relief of work piece 114. Moreover, as shown, the voxel depth may be adjusted individually for each voxel to compensate for the wedge-shape of reactive material.

Figure 17:
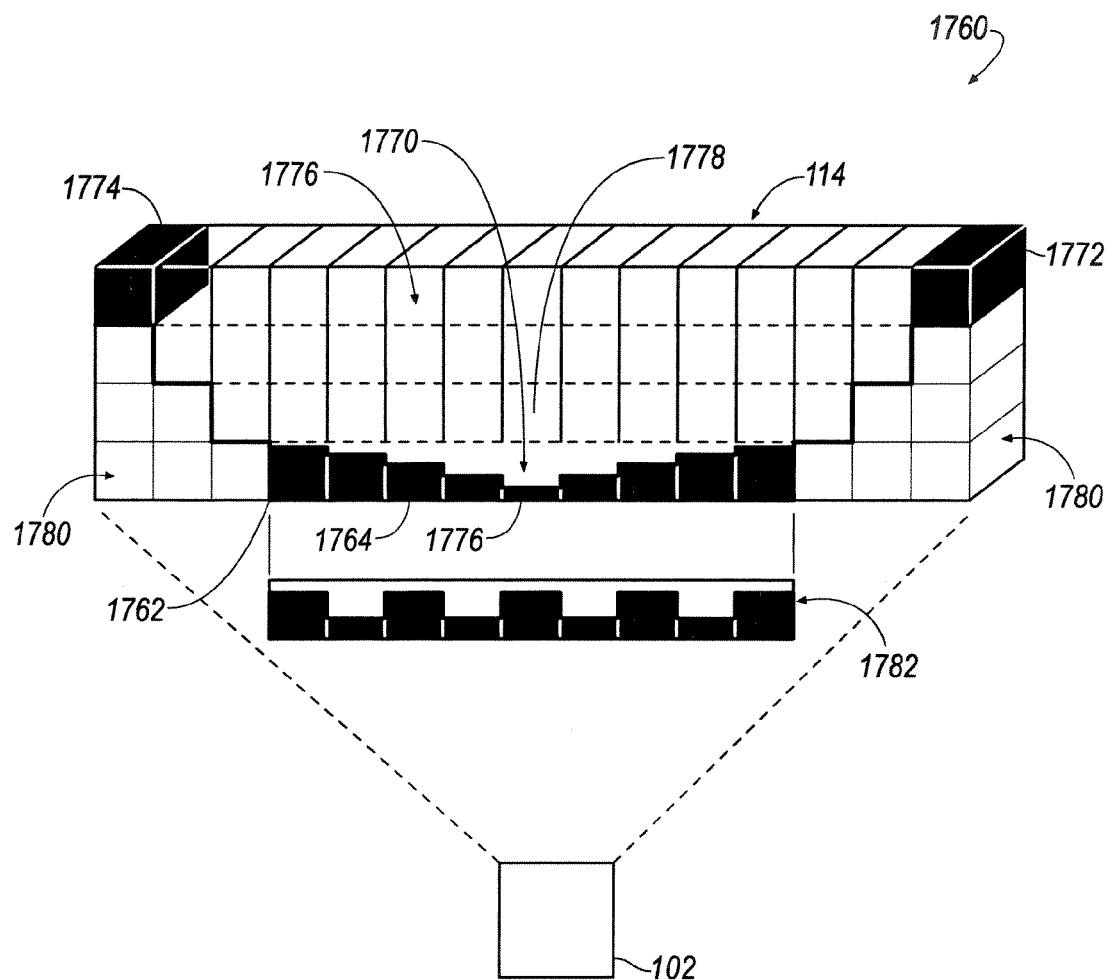
FIG. 17 is an example of voxelized construction process for use, in an example, with the systems of FIGS. 8A-8H, 12-15A.

FIG. 17 is an example of voxelized construction process 1760 for use, in an example, with the "upwardly" projecting systems of FIGS. 8A-8H, 12-15A. Showing the result of multiple voxel exposures to construct work piece 114, voxels 1772, 1774 may have a full depth of cure are show at an outer feature of work piece 114. Voxels comprising the main body 1776 (e.g., inner portions of the work piece) may include voxels having a full depth of cure, or it may include voxels having less than a full depth of cure, as desired. For example, some voxels in main boxy 1776 may have less than a full depth of cure to allow for reduced internal stresses and/or curl (e.g., due to shrinkage of the reactive material).

Pattern generator 102 may be considered an "upward" projecting pattern generator wherein the reactive material 118 is positioned under work piece 114 (e.g., as a powder, a paste, or a composite). When work piece 114 moves upwardly, fresh reactive material (e.g., un-cured or non-polymerized reactive material) may be positioned under work piece 114. This may be by flowing (e.g., when a liquid reactive material is used in a bath—see FIGS. 12-15A) or this may be by positioning a liquid, or for example the film-type positioning of a paste, powder, or liquid (e.g., see FIGS. 8A-8H).

Each voxel may then be created by curing or polymerizing the reactive material at selective locations and at selective depths (e.g., voxel depth). In a method to reduce "curling" or relieving internal stresses of work piece 114, each voxel may be controlled independently for its depth of cure (e.g., a voxel-by-voxel depth of cure method). For example, a first voxel 1762 may be exposed to generate a voxel having maximum voxel depth (e.g., where the intensity may be 255 on a 0-255 intensity scale). A second voxel 1764 may be exposed having a less than maximum voxel depth (e.g., the intensity may be 200). A third voxel 1766 may have an even less voxel depth (e.g., the intensity may be 100) which is less than the depth of second voxel 1764. As another example, a collection of voxels 1782 is shown having an alternating voxel depth pattern that may be used to reduce internal stresses.

The process repeats after work piece 114 is moved upward again and fresh reactive material is located under work piece 114 for the next voxelized construction process cycle. A gap 1770 (exaggerated) left between the prior voxel 1778 and voxel 1766 may allow the reactive material to shrink without distorting work piece 114. Some reactive material 1780 may not have been exposed to the minimum electromagnetic radiation necessary to cause curing or polymerization.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method, comprising:
   generating a predetermined pattern generator calibration pattern;
   receiving an image of said generated predetermined pattern generator calibration pattern;
   determining the difference of said predetermined pattern generator calibration pattern and said image;
   generating a pattern correction map for said pattern generator based on said difference;
   receiving a predetermined object pattern representing a portion of a three-dimensional object;

modifying said predetermined object pattern to correct for geometric distortion of a pattern generator; and generating the modified pattern using said pattern generator, said generated pattern interacting with a reactive material to form said portion of said three-dimensional object defined by said predetermined object pattern, wherein the step of modifying said pattern utilizes said correction map.

2. The method of claim 1, further comprising: storing said pattern correction map.

3. A method comprising:

receiving an imager calibration image of a predetermined imager calibration pattern;

determining the difference of said predetermined imager calibration pattern and said imager calibration image;

generating an imager correction map for said imager based on said imager difference;

receiving a predetermined object pattern representing a portion of a three-dimensional object;

modifying said predetermined object pattern to correct for geometric distortion of a pattern generator utilizing said correction map; and generating the modified pattern using said pattern generator, said generated pattern interacting with a reactive material to form said portion of said three-dimensional object defined by said predetermined object pattern.

4. The method of claim 3, further comprising:

storing said imager correction map.

5. A method comprising:

receiving a predetermined object pattern representing a portion of a three-dimensional object;

modifying said predetermined object pattern to correct for geometric distortion of a pattern generator;

generating the modified pattern using said pattern generator, said generated pattern interacting with a reactive material to form said portion of said three-dimensional object defined by said predetermined object pattern;

generating a first plurality of modified patterns defining a first plurality of portions of said three-dimensional object;

generating a predetermined pattern generation calibration pattern of a form substantially non-interacting with said reactive material;

receiving an image of said generated predetermined pattern generator calibration pattern;

determining the difference of said predetermined pattern generator calibration pattern and said image;

generating a pattern correction map for said pattern generator based on said difference, wherein the step of modifying said pattern utilizes said correction map; and generating a second plurality of modified patterns defining a second plurality of portions of said three-dimensional object.

6. The method of claim 1, further comprising:

performing the steps of receiving, modifying, and generating for a plurality of pattern generators.

7. The method of claim 1, wherein the predetermined object pattern comprises a voxelized bitmap pattern.

8. The method of claim 7, wherein the voxelized bitmap pattern corresponds to a plurality of voxels, and the step of modifying said predetermined object pattern comprises modifying both a location along a build surface and a gray scale value for at least a portion of the voxels comprising the voxelized bitmap pattern.

9. The method of claim 7, wherein the voxelized bitmap pattern comprises a plurality of gray scale values corresponding to respective voxel locations on a build surface.

10. The method of claim 1, wherein the reactive material is a solidifiable material that solidifies in response to stimulating energy, and the generated pattern comprises the stimulating energy.

11. The method of claim 1, wherein the generated pattern corresponds to a plurality of gray scale values.

12. A method, comprising:

providing a predetermined set of voxel data representing a portion of a three-dimensional object;

modifying the predetermined set of voxel data to correct for geometric distortion of a pattern generator; and generating a pattern using a pattern generator based on the modified set of voxel data, said generated pattern interacting with a reactive material at a build surface to form said portion of a three-dimensional object.

13. The method of claim 12, wherein the predetermined set of voxel data comprises a plurality of voxels, each voxel corresponding to a location along the build surface and a gray scale value, and the modified set of voxel data comprises a plurality of voxels, each voxel corresponding to a location along the build surface and a gray scale value.

14. The method of claim 12, further comprising:

generating a predetermined pattern generator calibration pattern;

receiving an image of said generated predetermined pattern generator calibration pattern;

determining the difference of said predetermined pattern generator calibration pattern and said image; and generating a pattern correction map for said pattern generator based on said difference, wherein the step of modifying said pattern utilizes said correction map.

* * * * *